US007272230B2

(12) United States Patent
Sasaki

(10) Patent No.: US 7,272,230 B2
(45) Date of Patent: *Sep. 18, 2007

(54) ENCRYPTION SYSTEM AND CONTROL METHOD THEREOF

(75) Inventor: Minoru Sasaki, Tokyo (JP)

(73) Assignee: Pumpkin House Incorporated, Tokyo (JP)

( * ) Notice: Subject to any disclaimer, the term of this patent is extended or adjusted under 35 U.S.C. 154(b) by 824 days.

This patent is subject to a terminal disclaimer.

(21) Appl. No.: 10/475,105

(22) PCT Filed: Mar. 5, 2002

(86) PCT No.: PCT/JP02/01996

§ 371 (c)(1),
(2), (4) Date: Oct. 17, 2003

(87) PCT Pub. No.: WO02/087146

PCT Pub. Date: Oct. 31, 2002

(65) Prior Publication Data

US 2004/0086124 A1    May 6, 2004

(30) Foreign Application Priority Data

Apr. 18, 2001   (JP)   ............................. 2001-120327

(51) Int. Cl.
*H04L 9/00*   (2006.01)

(52) U.S. Cl. ...................... 380/278; 380/277; 713/150; 713/168

(58) Field of Classification Search ...................... None
See application file for complete search history.

(56) References Cited

U.S. PATENT DOCUMENTS

| 5,832,092 A | * | 11/1998 | Okuda et al. ................ 380/279 |
| 6,125,185 A | * | 9/2000 | Boesch ........................ 380/285 |
| 6,169,803 B1 | * | 1/2001 | Sako et al. ................... 380/44 |

FOREIGN PATENT DOCUMENTS

| JP | 9-179768 | 7/1997 |
| JP | 10-260903 | 9/1998 |
| WO | WO95/09410 | 4/1995 |
| WO | WO99/14652 | 3/1999 |

* cited by examiner

*Primary Examiner*—Nasser Moazzami
*Assistant Examiner*—Pramila Parthasarathy
(74) *Attorney, Agent, or Firm*—McGinn IP Law Group PLLC

(57) ABSTRACT

To provide a cryptographic system capable of flexibly changing decryption authorization and preventing the action of a third person impersonating a user having the decryption authorization to improperly utilize the system.

When an enciphered file is accepted in a client, a decryptor ID, a creator ID, and a first enciphered session key are transmitted to a key management server 10 (step 141). It is judged whether or not the creator ID is stored as a decryption object ID in a management database in correspondence with the decryptor ID (step 147). When the creator ID is stored, the first enciphered session key is deciphered with an inherent key corresponding to the creator ID in the management database (step 148), and the obtained session key is enciphered with a public key corresponding to the decryptor ID (step 149). A secret key is used in a client which has received a second enciphered session key so that deciphering processing is performed, to obtain a session key. Enciphered data is deciphered with the session key.

24 Claims, 51 Drawing Sheets

*Fig. 4*

MANEGEMENT DATABASE 15

| ID | INVALID FLAG | PUBLIC KEY | INHERENT KEY | DECRYPTION OBJECT ID1 | DECRYPTION OBJECT ID2 | DECRYPTION OBJECT ID3 | DECRYPTION OBJECT ID4 | ... |
|---|---|---|---|---|---|---|---|---|
| 001 | — | OP1 | SK1 | 001 | 002 | 003 | 004 | ... |
| 002 | — | OP2 | SK2 | 002 | 004 | — | — | ... |
| 003 | — | OP3 | SK3 | 003 | 004 | — | — | ... |
| 004 | — | OP4 | SK4 | 004 | — | — | — | ... |
| ..... | ..... | ..... | ..... | ..... | ..... | ..... | ..... | ... |

Fig. 17

MANAGEMENT DATABASE 15A

| ID | INVALID FLAG | SECOND PUBLIC KEY | INHERENT KEY | DECRYPTION OBJECT ID1 | DECRYPTION OBJECT ID2 | DECRYPTION OBJECT ID3 | DECRYPTION OBJECT ID4 | ... |
|---|---|---|---|---|---|---|---|---|
| 001 | — | OP2-1 | SK1 | 001 | 002 | 003 | 004 | ... |
| 002 | — | OP2-2 | SK2 | 002 | 004 | — | — | ... |
| 003 | — | OP2-3 | SK3 | 003 | 004 | — | — | ... |
| 004 | — | OP2-4 | SK4 | 004 | — | — | — | ... |
| .... | .... | .... | .... | .... | .... | .... | .... | .... |

FIRST PUBLIC KEY / FIRST SECRET KEY
S 1
OP1

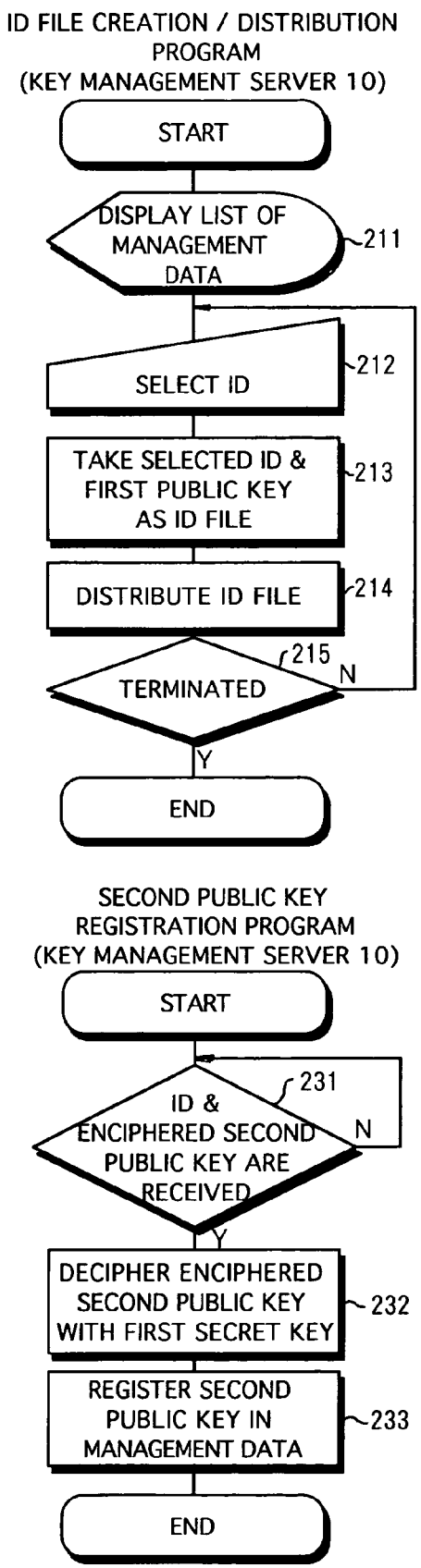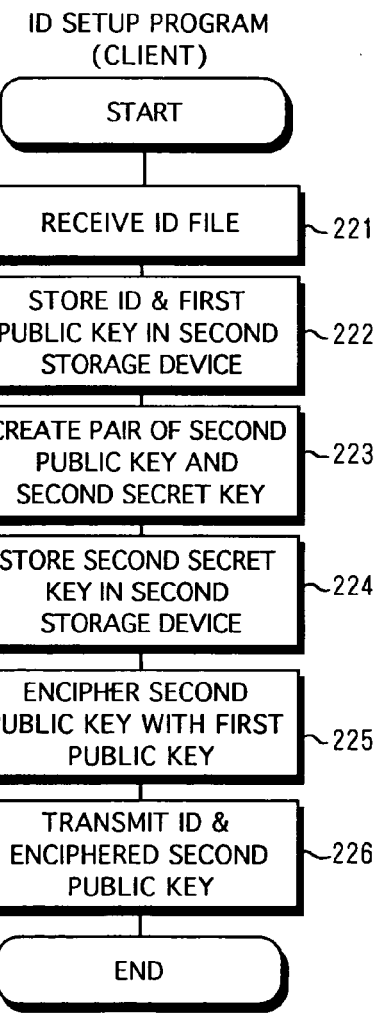
Fig. 19

Fig. 31

FIRST MANAGEMENT DATABASE 15B

| ID | INVALID FLAG | SECOND PUBLIC KEY | INHERENT KEY | DECRYPTION OBJECT ID1 | DECRYPTION OBJECT ID2 | DECRYPTION OBJECT ID3 | DECRYPTION OBJECT ID4 | ... | REGISTRATION GROUP 1 | REGISTRATION GROUP 2 | REGISTRATION GROUP 3 | ... |
|---|---|---|---|---|---|---|---|---|---|---|---|---|
| 001 | — | OP2-1 | SK1 | 001 | 002 | 003 | 004 | ... | G1 | G2 | G3 | ... |
| 002 | — | OP2-2 | SK2 | 002 | 004 | — | — | ... | G2 | — | — | ... |
| 003 | — | OP2-3 | SK3 | 003 | 004 | — | — | ... | G2 | G3 | — | ... |
| 004 | — | OP2-4 | SK4 | 004 | — | — | — | ... | — | — | — | ... |
| ... | ... | ... | ... | ... | ... | ... | ... | ... | ... | ... | ... | ... |

SECOND MANAGEMENT DATABASE 16

| GROUP ID | GROUP KEY |
|---|---|
| G1 | GSK1 |
| G2 | GSK2 |
| G3 | GSK3 |
| ... | ... |

*Fig. 43*

FIRST MANAGEMENT DATABASE  ⎯15C

| ID | INVALID FLAG | SECOND PUBLIC KEY | FIRST INHERENT KEY | SECOND INHERENT KEY | DECRYPTION OBJECT ID1 | DECRYPTION OBJECT ID2 | DECRYPTION OBJECT ID3 | DECRYPTION OBJECT ID4 | ... | REGISTRATION GROUP 1 | REGISTRATION GROUP 2 | REGISTRATION GROUP 3 | ... |
|---|---|---|---|---|---|---|---|---|---|---|---|---|---|
| 001 | — | OP2-1 | SK1-1 | SK2-1 | 001 | 002 | 003 | 004 | ... | G1 | G2 | G3 | ... |
| 002 | — | OP2-2 | SK1-2 | SK2-2 | 002 | 004 | — | — | ... | G2 | — | — | ... |
| 003 | — | OP2-3 | SK1-3 | SK2-3 | 003 | 004 | — | — | ... | G2 | G3 | — | ... |
| 004 | — | OP2-4 | SK1-4 | SK2-4 | 004 | — | — | — | ... | — | — | — | ... |
| .... | .... | .... | .... | .... | .... | .... | .... | .... | .... | .... | .... | .... | .... |

FIRST PUBLIC KEY / FIRST SECRET KEY
OP1                    S1

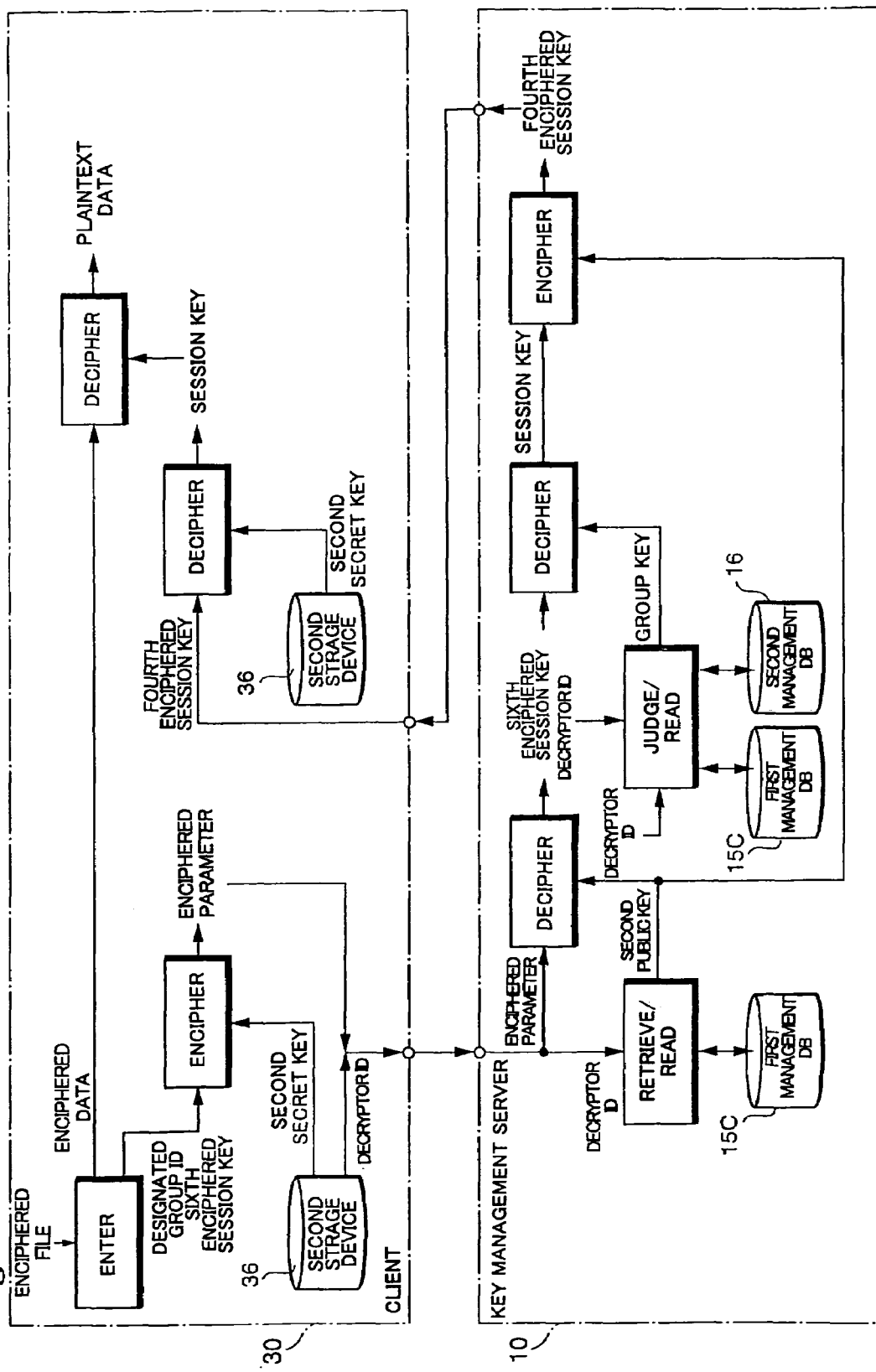

ENCRYPTION SYSTEM AND CONTROL METHOD THEREOF

TECHNICAL FIELD

The present invention relates to a cryptographic system and a method of controlling the same.

BACKGROUND ART

In a cryptographic system that provides to a user processing for enciphering (encrypting) plaintext and processing for deciphering (decrypting) ciphertext using a computer, a particular user may, in some cases, be given authorization to decipher ciphertext (decryption authorization) created by another user. In this case, in such a manner that the other user merely distributes a key used for enciphering/deciphering processing to the particular user, the change in the contents of the authorization cannot be quickly coped with. Further, in a cryptographic system utilizing a network, measures to prevent the action of impersonating a user having decryption authorization to improperly decipher ciphertext created by another user are also required.

DISCLOSURE OF INVENTION

An object of the present invention is to provide a cryptographic system that makes it easy to change decryption authorization and makes it impossible for a person having no decryption authorization to easily impersonate a person having decryption authorization to improperly decipher ciphertext and a method of controlling the same.

A cryptographic system according to a first invention comprises a key management server and a client which are connected to each other through a network. The key management server comprises a management database for storing, with respect to each of users, an inherent ID, an inherent key, and an inherent public key which are inherent in the user, and a decryption object ID which is an inherent ID of a creator of an enciphered file decipherable by the user. The client comprises inherent data storing means for storing the inherent ID and an inherent secret key paired with the inherent public key, and session key generating means. The inherent data storing means may be a medium (e.g., a floppy disk) attachable or detachable to or from the client or a storage device (e.g., a hard disk) fixed to the client.

The client accepts the entry of plaintext data. As described later, the enciphered file created in the cryptographic system according to the first invention includes enciphered data obtained by enciphering the accepted plaintext data and has a data structure suitable for deciphering processing in the cryptographic system. The enciphered file is created in the following manner.

The client transmits to the key management server the inherent ID stored in the inherent data storing means when the plaintext data is accepted. The inherent ID is an ID which differs for each client, that is, for each user who utilizes the cryptographic system.

The management database in the key management server stores the inherent public key and the inherent key in correspondence with the inherent ID, as described above. The key management server receives the inherent ID transmitted from the client, and enciphers with the inherent public key stored in the management database in correspondence with the received inherent ID the inherent key stored in the management database in correspondence with the inherent ID, to generate an enciphered inherent key. The generated enciphered inherent key is transmitted to the client.

The client receives the enciphered inherent key. In the client which has received the enciphered inherent key, a session key is generated by the session key generating means, and the accepted plaintext data is enciphered with the generated session key, to create enciphered data. The enciphered inherent key transmitted from the key management server is deciphered with the inherent secret key stored in the inherent data storing means, to obtain an inherent key. The inherent secret key is an inherent secret key paired with the inherent public key used for enciphering the inherent key in the key management server. Accordingly, the enciphered inherent key obtained by the encryption with the inherent public key is deciphered with the inherent secret key (an inherent key is obtained). The pair of the inherent public key and the inherent secret key differs for each user who utilizes the cryptographic system.

In the client, the session key is enciphered with the obtained inherent key, to generate a first enciphered session key. The inherent ID stored in the inherent data storing means is used as a creator ID, to add the creator ID and the generated first enciphered session key to the enciphered data, to create an enciphered file. Thus, the enciphered file created in the cryptographic system according to the first invention has the creator ID and the first enciphered session key (obtained by enciphering the session key used for generating the enciphered data with an inherent key for the creator of the enciphered file) added to the enciphered data obtained by enciphering the plaintext data. The created enciphered file is stored in a storage device (a hard disk, a floppy disk, etc.) in the client used for creating the enciphered file or a storage device in another computer.

Processing for deciphering the enciphered file created in the above-mentioned manner is performed in the following manner.

The entry of the enciphered file is accepted in the client. When the enciphered file is accepted, the client uses the inherent ID stored in the inherent data storing means as a decryptor ID, to transmit to the key management server the decryptor ID, and the creator ID and the first enciphered session key in the accepted enciphered file.

The key management server judges whether or not the received creator ID is stored as the decryption object ID in the management database in correspondence with the decryptor ID transmitted from the client.

When it is judged that the received creator ID is stored as the decryption object ID in the management database, the first enciphered session key is deciphered with the inherent key stored in the management database in correspondence with the creator ID, to obtain a session key, and the obtained session key is enciphered with the inherent public key stored in the management database in correspondence with the decryptor ID, to generate a second enciphered session key.

In a case where a creator of an entered enciphered file is a deciphering person who will decipher the enciphered file (a case where an enciphered file is entered into a client in such a user) (which is a case where an enciphered file created by the user is deciphered by the same user himself or herself), the creator ID added to the enciphered file is the same as a decryptor ID. In a case where the creator of the entered enciphered file differs from the deciphering person who will decipher the enciphered file (a case where an enciphered file created by another user is deciphered), the creator ID differs from the decryptor ID. In either case, it is judged whether or not the enciphered file is allowed to be deciphered depending on whether or not the creator ID is stored (registered) as a decryption object ID in the management database in correspondence with the decryptor ID.

The first enciphered session key is obtained by enciphering the session key with the inherent key for the creator of the enciphered file. When the first enciphered session key is deciphered with the inherent key for the creator of the enciphered file, therefore, a session key is obtained. Further, the obtained session key is enciphered with an inherent public key for a deciphering person (decryptor) (this is a second enciphered session key). The second enciphered session key is transmitted to the client.

In the client, the second enciphered session key transmitted from the key management server is deciphered with the inherent secret key stored in the inherent data storing means, to obtain a session key, and the enciphered data in the accepted enciphered file is deciphered with the obtained session key, to obtain plaintext data.

According to the present invention, the decryption object ID is stored in correspondence with the inherent ID for each user in the management database in the key management server. Accordingly, determination on which user is given authorization to decipher the enciphered file created by a user and which user creates the enciphered file can be intensively managed in the key management server. In the key management server, the decryption authorization can be easily changed if the decryption object ID in the management database is added, replaced, or deleted.

Furthermore, according to the present invention, the key management server judges whether or not the user who will decipher the enciphered file has the decryption authorization every time the processing for deciphering the enciphered file is performed in the client. Every time the enciphered file is to be deciphered, it is judged whether or not the user who will decipher the enciphered file is a person who can decipher the enciphered file to be deciphered (whether or not the user has the decryption authorization). Therefore, a cryptographic system high in safety and reliability is constructed.

According to the present invention, the essential requirement for deciphering the enciphered file is that the second enciphered session key can be deciphered. The second enciphered session key can be deciphered by only a user who has the inherent secret key paired with the inherent public key used for generating the second enciphered session key. Even if an unauthorized third person (a person having no decryption authorization) obtains the enciphered file, and obtains the second enciphered session key using an inherent ID of the other person as a decryptor ID, the third person who does not have the inherent secret key paired with the inherent public key used for generating the second enciphered session key cannot obtain a session key from the second enciphered session key. The enciphered file (enciphered data) cannot be eventually deciphered. It is possible to prevent the action of impersonating a user having decryption authorization to improperly decipher the enciphered file.

In a preferred mode, the key management server transmits data indicating that decryption is impossible to the client when the received creator ID is not stored as the decryption object ID in the management database in correspondence with the received decryptor ID. The client which has received the data indicating that decryption is impossible terminates the processing without performing processing for deciphering the enciphered data. That is, the user having no decryption authorization cannot decipher the enciphered file. The presence or absence of the decryption authorization is judged in the key management server.

In still another mode, the client comprises first public key/secret key generating means, a pair of an inherent public key and an inherent secret key is generated by the first public key/secret key generating means, the generated inherent secret key is stored in the inherent data storing means, and the generated inherent public key and the inherent ID stored in the inherent data storing means are transmitted to the key management server. The key management server which has received the inherent public key and the inherent ID stores the received inherent public key in the management database in correspondence with the received inherent ID. That is, the inherent public key out of the inherent public key and the inherent secret key which are generated by the first public key/secret key generating means in the client is managed in the management database in the key management server. The inherent public key, together with the inherent ID, is transmitted to the key management server. Even if a lot of clients (users who utilize the cryptographic system) are included in the cryptographic system, therefore, the inherent public key can be managed for each inherent ID (for each user) in the management database. The inherent secret key is generated in the client, and is stored in the inherent data storing means in the client. Accordingly, the possibility that the inherent secret key leaks is low.

In still another mode, the key management server comprises second public key/secret key generating means, a pair of a common public key and a common secret key is generated by the second public key/secret key generating means, and the common public key is transmitted (distributed) to the client. The client comprises first public key/secret key generating means, a pair of an inherent public key and an inherent secret key is generated by the first public key/secret key generating means, and the generated inherent secret key is stored in the inherent data storing means. The client which has received the common public key enciphers the inherent public key with the received common public key, to generate an enciphered inherent public key, and transmits to the key management server the generated enciphered inherent public key and the inherent ID stored in the inherent data storing means. The key management server which has received the enciphered inherent public key and the inherent ID deciphers the enciphered inherent public key with the common secret key, to obtain an inherent public key, and stores the obtained inherent public key in the management database in correspondence with the received inherent ID. The inherent public key for each user which is generated in the client and is stored in the management database in the key management server is transmitted in an enciphered state to the key management server from the client, thereby making it possible to prevent the inherent public key from leaking. The pair of the common public key which is generated in the key management server and is transmitted to the client and the common secret key may be the same for all clients, or may differ for each client.

A cryptographic system according to a second invention comprises a key management server and a client which are connected to each other through a network. The key management server comprises a management database for storing, with respect to each of users, an inherent ID, an inherent key, and an inherent public key which are inherent in the user, and a decryption object ID which is an inherent ID of a creator of an enciphered file decipherable by the user. The client comprises inherent data storing means for storing the inherent ID and an inherent secret key paired with the inherent public key, and session key generating means.

The client accepts the entry of plaintext data or an enciphered file.

When the plaintext data is accepted, a session key is generated by the session key generating means, and the entered plaintext data is enciphered with the generated session key, to create enciphered data. Further, the session key is enciphered with the inherent secret key stored in the inherent data storing means, to generate a first enciphered session key. The inherent ID stored in the inherent data storing means is used as a creator ID, to transmit to the key management server the creator ID and the generated first enciphered session key.

In the key management server, the first enciphered session key transmitted from the client is deciphered with the inherent public key stored in the management database in correspondence with the creator ID, to obtain a session key, and the obtained session key is enciphered with the inherent key stored in the management database in correspondence with the creator ID, to generate a second enciphered session key. The generated second enciphered session key is transmitted to the client.

In the client, the creator ID stored in the inherent data storing means and the second enciphered session key transmitted from the key management server are added to the enciphered data, to create an enciphered file. Thus, the enciphered file created in the cryptographic system in the second invention has the creator ID and the second enciphered session key (obtained by enciphering the session key used for generating the enciphered data with an inherent key for the creator of the enciphered file) added to the enciphered data obtained by enciphering the plaintext data.

Processing for deciphering the enciphered file created in the above-mentioned manner is performed in the following manner.

When the enciphered file is accepted in the client, the client uses the inherent ID stored in the inherent data storing means as a decryptor ID, to transmit to the key management server the decryptor ID, and the creator ID and the second enciphered session key in the accepted enciphered file.

The key management server judges whether or not the received creator ID is stored as a decryption object ID in the management database in correspondence with the decryptor ID transmitted from the client. When the creator ID is stored as the decryption object ID in the management database, the second enciphered session key is deciphered with the inherent key stored in the management database in correspondence with the creator ID, to obtain a session key, and the obtained session key is enciphered with the inherent public key stored in the management database in correspondence with the decryptor ID, to generate a third enciphered session key. The generated third enciphered session key is transmitted to the client.

In the client, the third enciphered session key transmitted from the key management server is deciphered with the inherent secret key stored in the inherent data storing means, to obtain a session key, and the enciphered data in the accepted enciphered file is deciphered with the obtained session key, to obtain plaintext data.

In the cryptographic system according to the second invention, in both the processing for creating the enciphered file and the processing for deciphering the enciphered file, the inherent key for each user stored in the management database in the key management server and the enciphered inherent key obtained by enciphering the inherent key are not transmitted and received between the key management server and the client. Therefore, the secrecy of the inherent key is significantly high. Also in the second invention, the decryption object ID is stored in correspondence with the inherent ID for each user in the management database in the key management server. Accordingly, determination on which user is given authorization to decipher the enciphered file created by a user and which user creates the enciphered file can be intensively managed in the key management server. Further, the essential requirement for deciphering the enciphered file is that the third enciphered session key can be deciphered. The third enciphered session key can be deciphered by only a user having the inherent secret key paired with the inherent public key used for generating the third enciphered session key. Therefore, it is possible to prevent the action of impersonating a user having decryption authorization to improperly decipher the enciphered file.

In one mode, the key management server enciphers, in the step of processing for creating the enciphered file, the generated second enciphered session key with the inherent public key stored in the management database in correspondence with the creator ID, to generate an enciphered second enciphered session key, and transmits the generated enciphered second enciphered session key to the client. The client which has received the enciphered second enciphered session key deciphers the received enciphered second enciphered session key with the inherent secret key stored in the inherent data storing means, to obtain a second enciphered session key. Since the second enciphered session key transmitted to the client from the key management server is transmitted in an enciphered state, the safety of the second enciphered session key is enhanced.

In another mode, the client enciphers, in the step of processing for deciphering the enciphered file, the creator ID and the second enciphered session key in the enciphered file with the inherent secret key stored in the inherent data storing means, to generate an enciphered parameter, and transmits to the key management server the decryptor ID and the generated enciphered parameter. The key management server which has received the decryptor ID and the enciphered parameter deciphers the received enciphered parameter with the inherent public key stored in the management database in correspondence with the received decryptor ID, to obtain the creator ID and the second enciphered session key. Since the second enciphered session key transmitted to the key management server from the client is transmitted in an enciphered state, the safety of the second enciphered session key is enhanced.

In a cryptographic system according to a third invention, a key management server comprises a management database for storing, with respect to each of users, an inherent ID, an inherent key, and an inherent public key which are inherent in the user, and a decryption object ID which is an inherent ID of a creator of an enciphered file decipherable by the user, and common key storing means for storing a pair of a common public key and a common secret key. A client comprises inherent data storing means for storing the inherent ID and an inherent secret key paired with the inherent public key, common public key storing means for storing the common public key, and session key generating means.

The client accepts the entry of plaintext data, generates, when the plaintext data is accepted, a session key by the session key generating means, and enciphers the entered plaintext data with the generated session key, to create enciphered data. The session key is enciphered with the common public key stored in the common public key storing means, to generate a first enciphered session key, and the inherent ID stored in the inherent data storing means is used as a creator ID, to transmit to the key management server the creator ID and the generated first enciphered session key.

The key management server deciphers the first enciphered session key transmitted from the client with the common secret key stored in the common key storing means, to obtain a session key, enciphers the obtained session key with the inherent key stored in the management database in correspondence with the creator ID, to generate a second enciphered session key, and transmits the generated second enciphered session key to the client.

The client adds to the enciphered data the creator ID stored in the inherent data storing means and the second enciphered session key transmitted from the key management server, to create an enciphered file.

When the enciphered file created in the above-mentioned manner is accepted, the client uses the inherent ID stored in the inherent data storing means as a decryptor ID, to transmit to the key management server the decryptor ID, and the creator ID and the second enciphered session key in the accepted enciphered file.

The key management server judges whether or not the received creator ID is stored as a decryption object ID in the management database in correspondence with the decryptor ID transmitted from the client. When the creator ID is stored as the decryption object ID in the management database, the second enciphered session key is deciphered with the inherent key stored in the management database in correspondence with the creator ID, to obtain a session key, the obtained session key is enciphered with the inherent public key stored in the management database in correspondence with the decryptor ID, to generate a third enciphered session key, and the generated third enciphered session key is transmitted to the client.

The client deciphers the third enciphered session key transmitted from the key management server with the inherent secret key stored in the inherent data storing means, to obtain a session key, and deciphers the enciphered data in the accepted enciphered file with the obtained session key, to obtain plaintext data.

In the cryptographic system according to the third invention, the session key is enciphered with the common public key in the client, to generate the first enciphered session key, and the common secret key is used in the key management server so that the first enciphered session key is deciphered, to obtain the session key. Also in the cryptographic system according to the third invention, the secrecy of the inherent key is high, and authorization to decipher the enciphered file can be intensively managed in the key management server, as in the cryptographic system according to the second invention. Further, it is possible to prevent the action of a person having no decryption authorization impersonating a user having decryption authorization to improperly decipher the enciphered file.

A cryptographic system according to a fourth invention comprises a key management server and a client which are connected to each other through a network. The key management server comprises a first management database for storing, with respect to each of users, an inherent ID and an inherent public key which are inherent in the user, and a group ID of a group to which the user belongs, and a second management database for storing, with respect to each of groups, a group ID and a group key which are inherent in the group. The client comprises inherent data storing means for storing the inherent ID and an inherent secret key paired with the inherent public key, and session key generating means. Of course, the first management database and the second management database can be constructed as one management database.

The client accepts the entry of plaintext data, generates a session key by the session key generating means, enciphers the entered plaintext data with the generated session key, to create enciphered data. The session key is enciphered with the inherent secret key stored in the inherent data storing means, to generate a first enciphered session key, and the inherent ID stored in the inherent data storing means is used as a creator ID, to transmit to the key management server the creator ID and the generated first enciphered session key.

The key management server deciphers the first enciphered session key transmitted from the client with the inherent public key stored in the first management database in correspondence with the creator ID, to obtain a session key, enciphers the obtained session key with the group key stored in the second management database in correspondence with the group ID stored in the first management database in correspondence with the creator ID, to generate a group enciphered session key. The group ID and the generated group enciphered session key are transmitted to the client.

In the client, the group ID and the group enciphered session key which have been transmitted from the key management server are added to the enciphered data, to create an enciphered file. The enciphered file has a group ID of a group to which a creator of the enciphered file belongs and the group enciphered session key (obtained by enciphering the session key with the group key stored in the second management database in correspondence with the group ID) added to the enciphered data created by enciphering the plaintext data with the session key. When the creator of the enciphered file belongs to a plurality of groups, a group key for each of the groups (group IDs) is used, so that a plurality of group enciphered session keys are generated and are added to the enciphered data.

The client uses, when it accepts the entry of the enciphered file, the inherent ID stored in the inherent data storing means as a decryptor ID, to transmit to the key management server the decryptor ID, and the group ID and the group enciphered session key in the accepted enciphered file.

The key management server judges whether or not the received group ID is registered in the first management database in correspondence with the decryptor ID transmitted from the client. When the received group ID is registered in the first management database, the group enciphered session key is deciphered with the group key stored in the second management database in correspondence with the group ID, to obtain a session key, the obtained session key is enciphered with the inherent public key stored in the first management database in correspondence with the decryptor ID, to generate a second enciphered session key, and the generated second enciphered session key is transmitted to the client.

In the client, the second enciphered session key transmitted from the key management server is deciphered with the inherent secret key stored in the inherent data storing means, to obtain a session key, and the enciphered data in the accepted enciphered file is deciphered with the obtained session key, to obtain plaintext data.

In the fourth invention, a user belonging to the same group as the group to which the creator of the enciphered file belongs is given authorization to decipher the enciphered file. The group ID of the group to which the user of the cryptographic system belongs is stored in the first management database in the key management server. Accordingly, the decryption authorization can be intensively managed by managing the group to which the user belongs in the key management server.

When the creator of the enciphered file creates the enciphered file, a user who is authorized to decipher the created enciphered file may be designated, and the designated user may be given authorization to decipher the enciphered file. In a cryptographic system according to a fifth invention, a key management server comprises a management database for storing, with respect to each of users, an inherent ID, an inherent key, and an inherent public key which are inherent in the user. A client comprises inherent data storing means for storing the inherent ID and an inherent secret key paired with the inherent public key, and session key generating means.

The client generates, when it accepts the entry of plaintext data, a session key by the session key generating means, and enciphers the entered plaintext data with the generated session key, to create enciphered data, and further accepts the designation of a decryption authorized user (authorizer). The session key is enciphered with the inherent secret key stored in the inherent data storing means, to generate a first enciphered session key. An inherent ID of the designated decryption authorized user is used as a designated decryption authorized user ID, and the inherent ID stored in the inherent data storing means is used as a creator ID, to transmit to the key management server the designated decryption authorized user ID, the creator ID, and the generated first enciphered session key.

The key management server deciphers the first enciphered session key transmitted from the client with the inherent public key stored in the management database in correspondence with the creator ID, to obtain a session key, and the obtained session key is enciphered with the inherent key stored in the management database in correspondence with the designated decryption authorized user ID, to generate a second enciphered session key. The generated second enciphered session key is transmitted to the client.

The client further adds to the enciphered data the designated decryption authorized user ID and the second enciphered session key transmitted from the key management server, to create an enciphered file.

When the entry of the enciphered file created in the above-mentioned manner is accepted in the client, the client uses the inherent ID stored in the inherent data storing means as a decryptor ID, to transmit to the key management server the decryptor ID, and the designated decryption authorized user ID and the second enciphered session key in the accepted enciphered file.

The key management saver judges whether or not the decryptor ID transmitted from the client is the same as the designated decryption authorized user ID, deciphers, when the decryptor ID is the same as the designated decryption authorized user ID, the second enciphered session key with the inherent key stored in the management database in correspondence with the decryptor ID, to obtain a session key, and enciphers the obtained session key with the inherent public key stored in the management database in correspondence with the decryptor ID, to generate a third enciphered session key. The generated third enciphered session key is transmitted to the client.

In the client, the third enciphered session key transmitted from the key management server is deciphered with the inherent secret key stored in the inherent data storing means, to obtain a session key, and the enciphered data in the accepted enciphered file is deciphered with the obtained session key, to obtain plaintext data.

When a creator of the enciphered file creates the enciphered file, a group which is authorized to decipher the created enciphered file may be designated, and a user belonging to the designated group may be given authorization to decipher the enciphered file. A cryptographic system according to a sixth invention includes a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, and a client comprising inherent data storing means for storing the inherent ID and an inherent secret key paired with the inherent public key, and session key generating means.

When the entry of plaintext data is accepted, the client generates a session key by the session key generating means, and enciphers the entered plaintext data with the generated session key, to create enciphered data. The designation of a decryption authorized group is accepted. Further, the session key is enciphered with the inherent secret key stored in the inherent data storing means, to generate a first enciphered session key. A group ID of the designated decryption authorized group is used as a designated decryption authorized group ID, and an inherent ID stored in the inherent data storing means is used as a creator ID, to transmit to the key management server the designated decryption authorized group ID, the creator ID, and the generated first enciphered session key.

The key management server deciphers the first enciphered session key transmitted from the client with the inherent public key stored in the first management database in correspondence with the creator ID, to obtain a session key, and enciphers the obtained session key with the group key stored in the second management database in correspondence with the designated decryption authorized group ID, to generate a group enciphered session key. The generated group enciphered session key is transmitted to the client.

In the client, the designated decryption authorized group ID and the group enciphered session key transmitted from the key management server are added to the enciphered data, to create an enciphered file.

The client uses, when it accepts the entry of the enciphered file created in the above-mentioned manner, the inherent ID stored in the inherent data storing means as a decryptor ID, to transmit to the key management server the decryptor ID, and the designated decryption authorized group ID and the group enciphered session key in the accepted enciphered file.

The key management server judges whether or not the same group ID as the designated decryption authorized group ID transmitted from the client is stored in the first management database in correspondence with the received decryptor ID. When the same group ID as the designated decryption authorized group ID is stored in the first management database in correspondence with the received decryptor ID, the group enciphered session key is deciphered with the group key stored in the second management database in correspondence with the group ID, to obtain a session key, and the obtained session key is enciphered with the inherent public key stored in the first management database in correspondence with the decryptor ID, to generate a second enciphered session key. The generated second enciphered session key is transmitted to the client.

In the client, the second enciphered session key transmitted from the key management server is deciphered with the inherent secret key stored in the inherent data storing means, to obtain a session key, and the enciphered data in the accepted enciphered file is deciphered with the obtained session key, to obtain plaintext data.

The present invention also provides a deciphering device suitable for utilization in the above-mentioned cryptographic systems according to the first to sixth inventions, its control program, and a recording medium having the control program recorded thereon and an enciphered file.

For example, a deciphering device suitable for utilization of the first to third cryptographic systems is connected through a network to a key management server comprising a management database for storing, with respect to each of users, an inherent ID, an inherent key, and an inherent public key which are inherent in the user, and a decryption object ID which is an inherent ID of a creator of an enciphered file decipherable by the user. The deciphering device comprises inherent data storing means for storing the inherent ID and an inherent secret key paired with the inherent public key, enciphered file entering means for accepting the entry of an enciphered file obtained by adding, to enciphered data obtained by enciphering plaintext data with a session key generated every time the plaintext data is enciphered, a creator ID which is an inherent ID of a creator of the enciphered data, and a first enciphered session key obtained by enciphering the session key with an inherent key for the creator of the enciphered data, transmitting means for transmitting to the key management server a decryptor ID which is the inherent ID stored in the inherent data storing means in the deciphering device, and the creator ID and the first enciphered session key in the accepted enciphered file, receiving means for receiving, from the key management server which has received the decryptor ID, and the creator ID and the first enciphered session key, a second enciphered session key obtained by enciphering a session key obtained by deciphering the first enciphered session key with the inherent key stored in the management database in correspondence with the creator ID with the inherent public key stored in the management database in correspondence with the decryptor ID, and deciphering means for deciphering the received second enciphered session key with the inherent secret key stored in the inherent data storing means, to obtain a session key, and deciphering the enciphered data in the accepted enciphered file with the obtained session key, to obtain plaintext data.

The inherent ID stored in the inherent data storing means in the deciphering device is handled as the decryptor ID. When the decryptor ID is stored as a decryption object ID in the management database in correspondence with the creator ID of the creator of the enciphered file, the first enciphered session key is deciphered with the inherent key corresponding to the creator ID, to obtain a session key in the key management server. The second enciphered session key obtained by enciphering the session key with an inherent public key for a decryptor is received in the deciphering device. The inherent secret key stored in the inherent data storing means in the deciphering device is paired with the above-mentioned inherent public key. Accordingly, the second enciphered session key is deciphered by the deciphering device, thereby making it possible to obtain the session key. The enciphered data can be deciphered with the session key.

An enciphered file created by each of cryptographic systems according to the first to third inventions is created, in a cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and a client comprising inherent data storing means for storing the inherent ID and an inherent secret key paired with the inherent public key, and session key generating means are connected to each other through a network, by the client.

The enciphered file has a creator ID which is an inherent ID of the creator of the enciphered file stored in the inherent data storing means in the client and an enciphered session key obtained by enciphering the session key with the inherent key for the creator of the enciphered file added to enciphered data obtained by enciphering plaintext data with a session key generated by the session key generating means in the client every time the plaintext data is enciphered. The plaintext data is enciphered with the session key generated every time the plaintext data is enciphered, so that the secrecy of the enciphered file is high.

The inherent key used for generating the enciphered session key is obtained by deciphering the enciphered inherent key transmitted from the key management server to the client in response to the transmission of the inherent ID stored in the inherent data storing means in the client to the key management server from the client with the inherent secret key stored in the inherent data storing means in the client. The enciphered inherent key is obtained by enciphering, in the key management server which has received the inherent ID, the inherent key stored in the management database in correspondence with the inherent ID with the inherent public key stored in the management database in correspondence with the inherent ID. Even if an attempt to improperly create the enciphered file using an ID of another person is made, therefore, an unauthorized user having no inherent secret key to be used for deciphering the enciphered inherent key cannot obtain the inherent key (cannot decipher the enciphered inherent key). No enciphered file can be eventually created.

The other features of the present invention will become apparent from the following embodiments.

BRIEF DESCRIPTION OF DRAWINGS

FIG. 4 illustrates the contents of a management database.

FIG. 17 illustrates the contents of a management database.

FIG. 19 is a flow chart showing the flow of processing based on an ID file creation/distribution program, the flow of processing based on an ID setup program and the flow of processing based on a second public key registration program.

FIG. 31 illustrates the contents of a first management database and a second management database.

FIG. 43 illustrates the contents of a first management database.

FIG. 51 is a block diagram showing enciphered file deciphering processing by giving attention to processing performed by a client and a key management server.

BEST MODE FOR CARRYING OUT THE INVENTION

FIRST EMBODIMENT

Figure 1:
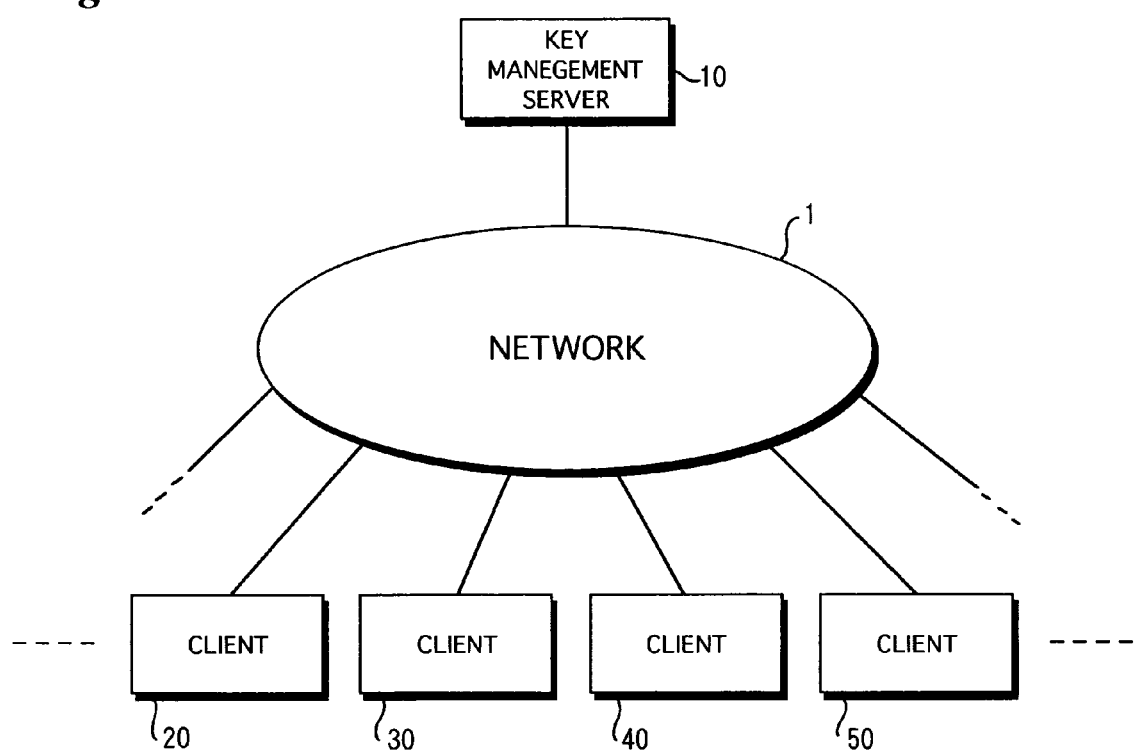
FIG. 1 is a block diagram showing the overall configuration of a cryptographic system according to a first embodiment.

FIG. 1 is a block diagram showing the overall configuration of a cryptographic system according to a first embodiment. The cryptographic system comprises a key management server computer (hereinafter referred to as a key management server) 10, a plurality of client computers (user terminals) (hereinafter referred to as clients) (in the cryptographic system shown in FIG. 1, four clients 20, 30, 40, and 50 are illustrated), and a network 1 (including both a dedicated line and a public line) for connecting the key management server 10 and the plurality of clients 20, 30, . . . .

In the cryptographic system, each of members (users) who utilize the system can generate a session key using a client, and encipher (encrypt) plaintext data with the generated session key, to create enciphered data using the client, as described later. The user can decipher (decrypt) the created enciphered data into plaintext data with the session key (in this sense, it can be said that the session key is an encryption/decryption key). Further, the cryptographic system is characterized in that the key management server 10 and the clients 20, 30 . . . are controlled such that the particular user can decipher enciphered data created by the other user who utilizes the cryptographic system.

Figure 2:
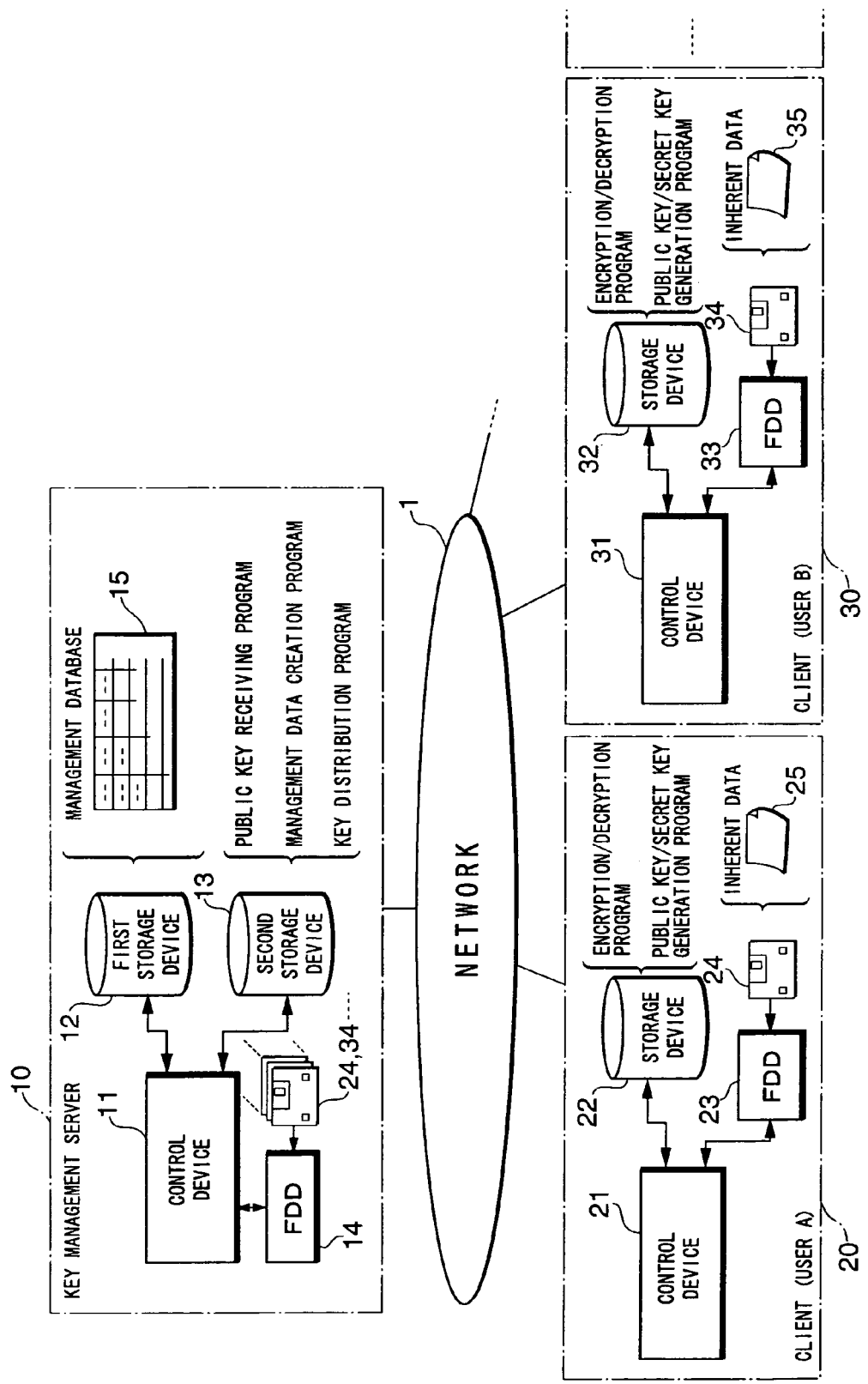
FIG. 2 illustrates the overall configuration of the cryptographic system according to the first embodiment in detail.

FIG. 2 is a block diagram showing the overall configuration of the cryptographic system shown in FIG. 1 in more detail. In the cryptographic system shown in FIG. 2, only the two clients (the client 20 and the client 30) are illustrated.

The key management server 10 comprises a control device 11, a first storage device 12, a second storage device 13, and a floppy-disk drive (hereinafter referred to as FDD) 14. The control device 11 is a computer system comprising a CPU, a memory (RAM), a communication device (a modem, a terminal adaptor, a router, etc.; used as transmitting means, receiving means, or distributing means), an input device (a keyboard, a mouse, etc.; used as entering means), and a display device (a CRT (Cathode-Ray Tube) display, an LCD (Liquid Crystal Display), etc.). Various types of programs, described later, are read in a CPU included in the control device 11 so that the control device 11 (CPU) functions as key generating means, enciphering means, deciphering means, judging means, etc. A hard disk (drive) is generally used for the first storage device 12 and the second storage device 13. The first storage device 12 and the second storage device 13 may be respectively different hard disks. Alternatively, two different regions may be provided in one hard disk and respectively positioned as the first storage device 12 and the second storage device 13.

The first storage device 12 in the key management server 10 is provided with a management database 15. The management database 15 is a database storing an ID, an inherent key, etc. with respect to each of the users of the cryptographic system (the details thereof will be described later). The second storage device 13 stores a public key receiving program, a management data creation program, and a key distribution program. Processing based on the programs (the operations of the key management server 10 controlled by the programs) will be described later.

The client 20 (which is taken as a computer of a user A) comprises a control device 21 comprising a CPU, a memory (RAM), a communication device, an input device, a display device, etc., a storage device 22, and an FDD 23. The client 30 (which is taken as a computer of a user B) also has the same hardware configuration (a control device 31, a storage device 32, and an FDD 33) as that of the client 20. Each of the storage device 22 in the client 20 and the storage device 32 in the client 30 stores an encryption/decryption program and a public key/secret key generation program. The programs are read in the CPUs in the control devices 21, 31, . . . , whereby the control devices 21, 31, . . . (CPUs) function as enciphering means, deciphering means, key generating means, etc. The details of the encryption/decryption program and the public key/secret key generation program will be described later.

Figure 3A:
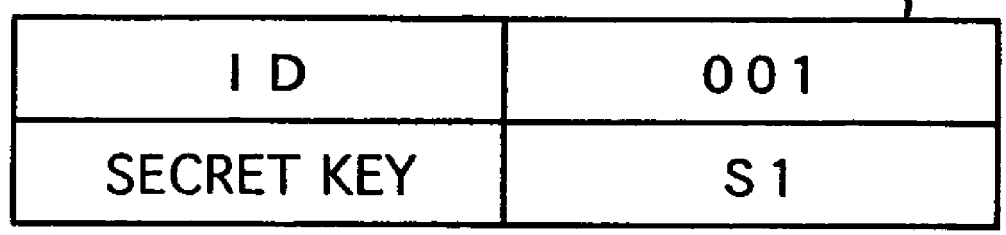
FIG. 3a and FIG. 3b respectively illustrate the contents of management data that a user having an ID "001" has and the contents of management data that a user having an ID "002" has.
Figure 3B:
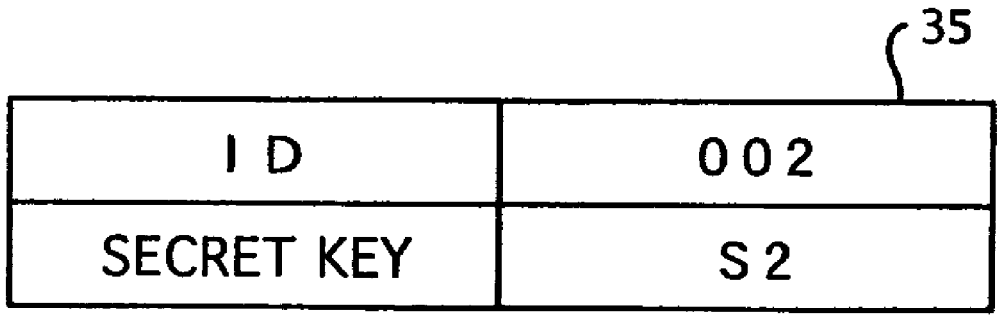

The users A and B respectively have an FD 24 having inherent data 25 recorded thereon and an FD 34 having inherent data 35 recorded thereon. FIG. 3*a* and FIG. 3*b* respectively illustrate an example of the inherent data 25 recorded on the FD 24 that the user A has and an example of the inherent data 35 recorded on the FD 34 that the user B has.

An ID and a secret key are recorded as the inherent data on the FD that each of the users of the cryptographic system has.

The "ID" is a unique identification code (number) for specifying each of the users who utilize the cryptographic system. The ID "001" and the ID "002" respectively represent the user A and the user B.

The "secret key" is, in a pair of a public key and a secret key generated by the public key/secret key generation program stored in each of the storage devices 22 and 32 in the clients 20 and 30, the secret key. As described later, in the clients 20, 30 . . . , the public key/secret key generation program is executed when the cryptographic system is set up (or the client is added to the cryptographic system). The inherent data 25 and 35 respectively include a secret key S1 and a secret key S2.

The ID "001" and the ID "002" respectively included in the inherent data 25 and 35 are recorded on the FDs 24 and 34 using the floppy disk drive (FDD) 14 in the key management server 10. The management database 15 in the key management server 10 is utilized for respectively recording the IDs on the FDs 24 and 34. FIG. 4 illustrates an example of the management database 15.

The management database 15 stores management data for each of the plurality of users who utilize the cryptographic system. The management data includes an "ID", an "invalid flag", a "public key", an "inherent key", a "decryption object ID1", a "decryption object ID2", a "decryption object ID3", etc.

The "ID" is an identification code for identifying the user who utilizes the cryptographic system and having a one-to-one correspondence with the user, as described above.

The "invalid flag" stores a flag (an invalid flag "FF") indicating that when the user who utilizes the cryptographic system is not authorized to utilize the cryptographic system after that, authorization by the user to utilize the cryptographic system has invalidated. The invalid flag is stored in the management data by a manager of the key management server 10.

The "public key" is, in a pair of a public key and a secret key generated by the execution of the public key/secret key generation program in the client, the public key. The public keys is previously transmitted to the key management server 10 from each of the clients 20, 30 . . . (the details thereof will be described later).

The "inherent key" is random number data inherent in each of the users who utilize the cryptographic system. The inherent key is used for enciphering the session key used for enciphering the plaintext data and deciphering the enciphered session key.

Each of the "decryption object ID1", the "decryption object ID2", the "decryption object ID3" . . . stores an ID of a creator of a decipherable enciphered file (an ID of a decryption object). In the cryptographic system, the relationship between the user who utilizes the cryptographic system and the creator of the enciphered file decipherable by the user (the creator is also the user who utilizes the cryptographic system) is previously determined.

For example, the management data related to the ID "001" includes as decryption object IDs four IDs, i.e., "001", "002", "003", and "004". This means that the user (the user A) having the ID "001" has authorization to respectively decipher the enciphered files created by the users having the IDs "001", "002", "003" and "004". Similarly, the management data related to the ID "002" includes IDs "002" and "004" as decryption object IDs. Therefore, the user having the ID "002" (the user B) has authorization to respectively decipher the enciphered files created by the users having the IDs "002" and "004".

Figure 5:
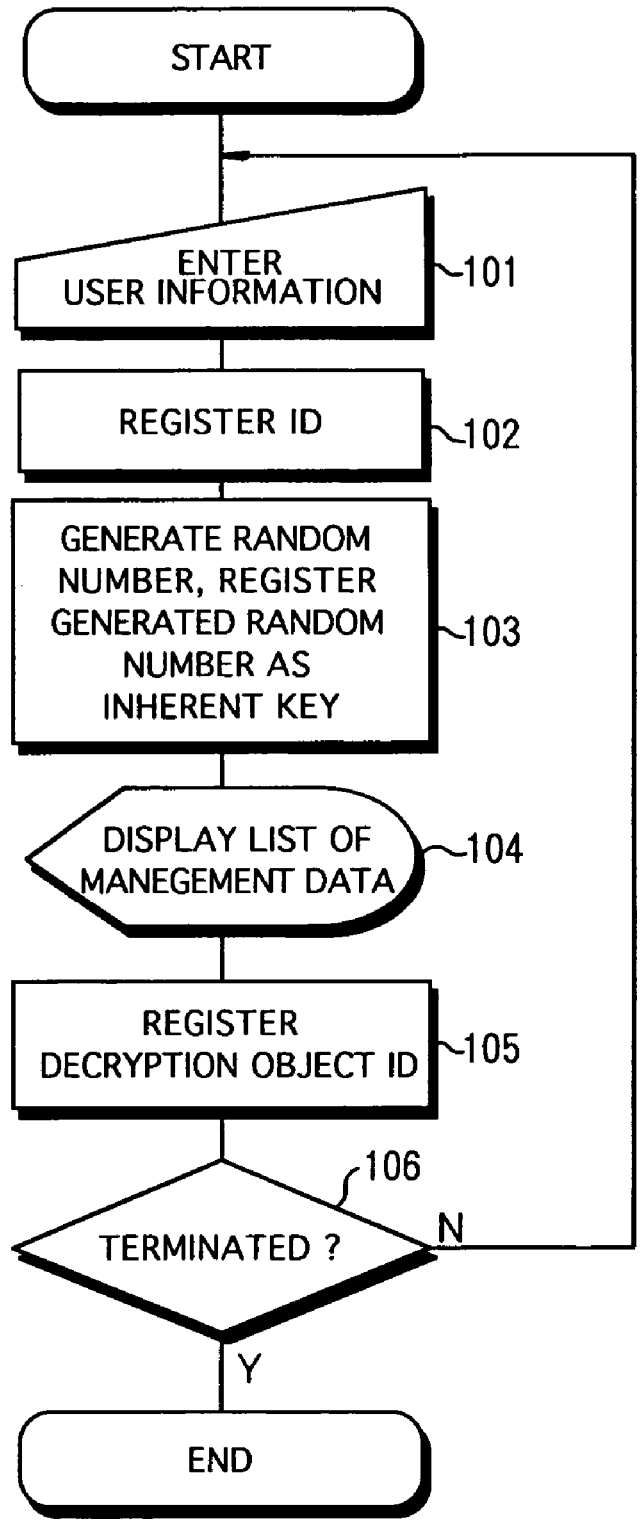
FIG. 5 is a flow chart showing the flow of processing based on a management data creation program.

FIG. 5 is a flow chart showing the flow of processing based on the management data creation program stored in the second storage device 13 in the key management server 10. The management data is stored in the above-mentioned management database 15 in accordance with the management data creation program.

When the manager of the key management server 10 enters an instruction to start the management data creation program from the input device, the management data creation program is read out of the second storage device 13 in the key management server 10, and is read in the CPU. The management data creation program is executed.

First, user information such as the name of the user who utilizes the cryptographic system is entered from the input device in the key management server 10 by the manager of the key management server 10 (step 101). When the entry of the user information is completed, an ID is assigned to the user. The assigned ID is registered in an ID column in the management database 15 provided for the first storage device 12 (step 102).

A random number is generated. The generated random number is registered in an inherent key column as an inherent key corresponding to the registered ID (step 103).

A list of the management data (the whole of the management database 15) is displayed on a display screen of the display device (step 104). When management data related to the other user has already been registered in the management database 15, an ID, an inherent key, etc. of the user are displayed by icons or the like. The manager of the key management server 10 registers an ID of a decryption object in a decryption object ID column (a decryption object ID1, a decryption object ID2, a decryption object ID3 . . . ) (step 105).

When the management data related to the other user is registered, the above-mentioned operations are repeated (NO in step 106, step 101). When the entry of data related to all the users is terminated, the entry of the management data excluding the public key to be stored in a public key column is completed (see FIG. 4). The manager of the key management server 10 terminates the processing based on the management data creation program (YES in step 106).

To the users for which the management data are created by the management data creation program, the FDs having the IDs for specifying the users recorded thereon are respectively distributed.

Figure 6:
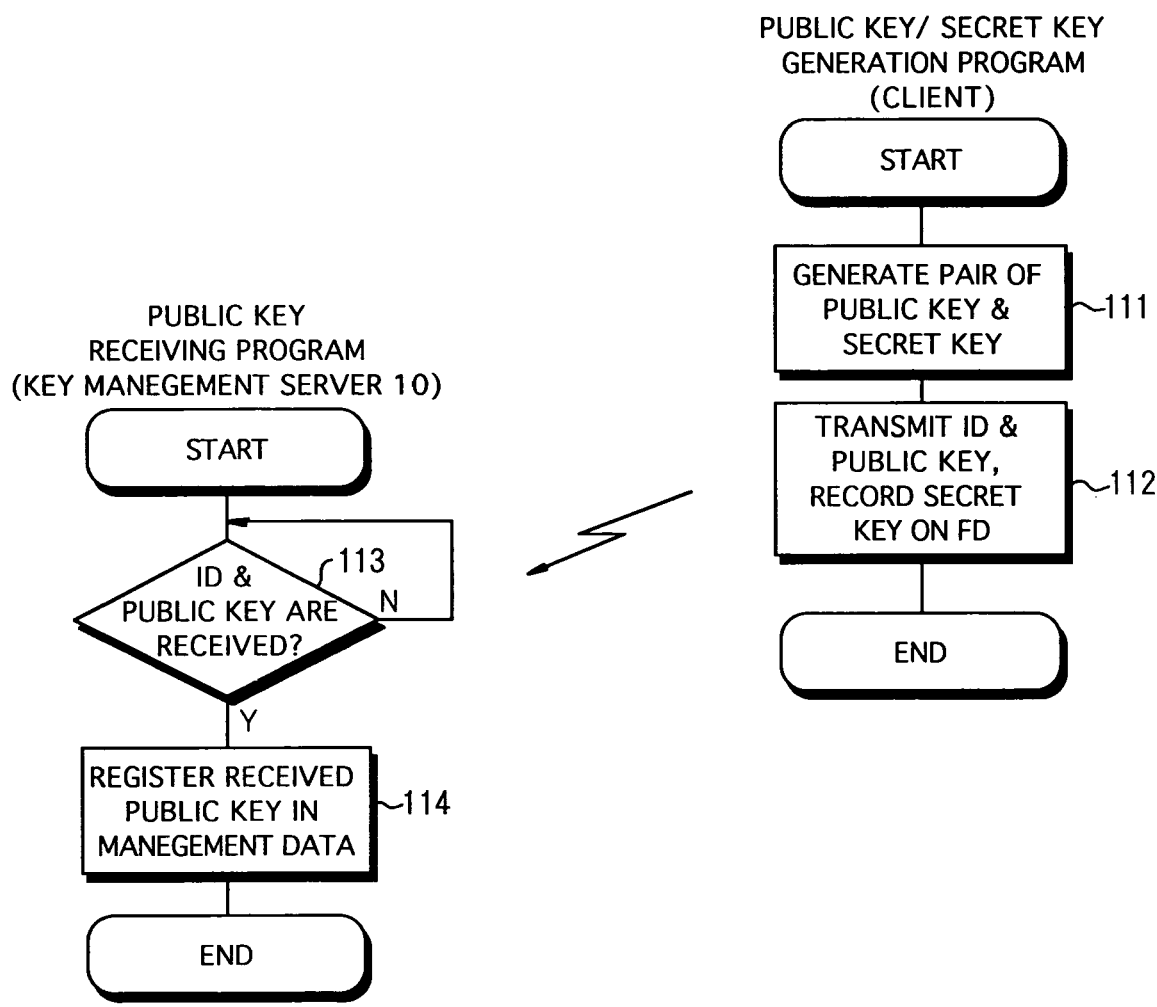
FIG. 6 is a flow chart showing the flow of processing based on a public key/secret key generation program and the flow of processing based on a public key receiving program.
Figure 7:
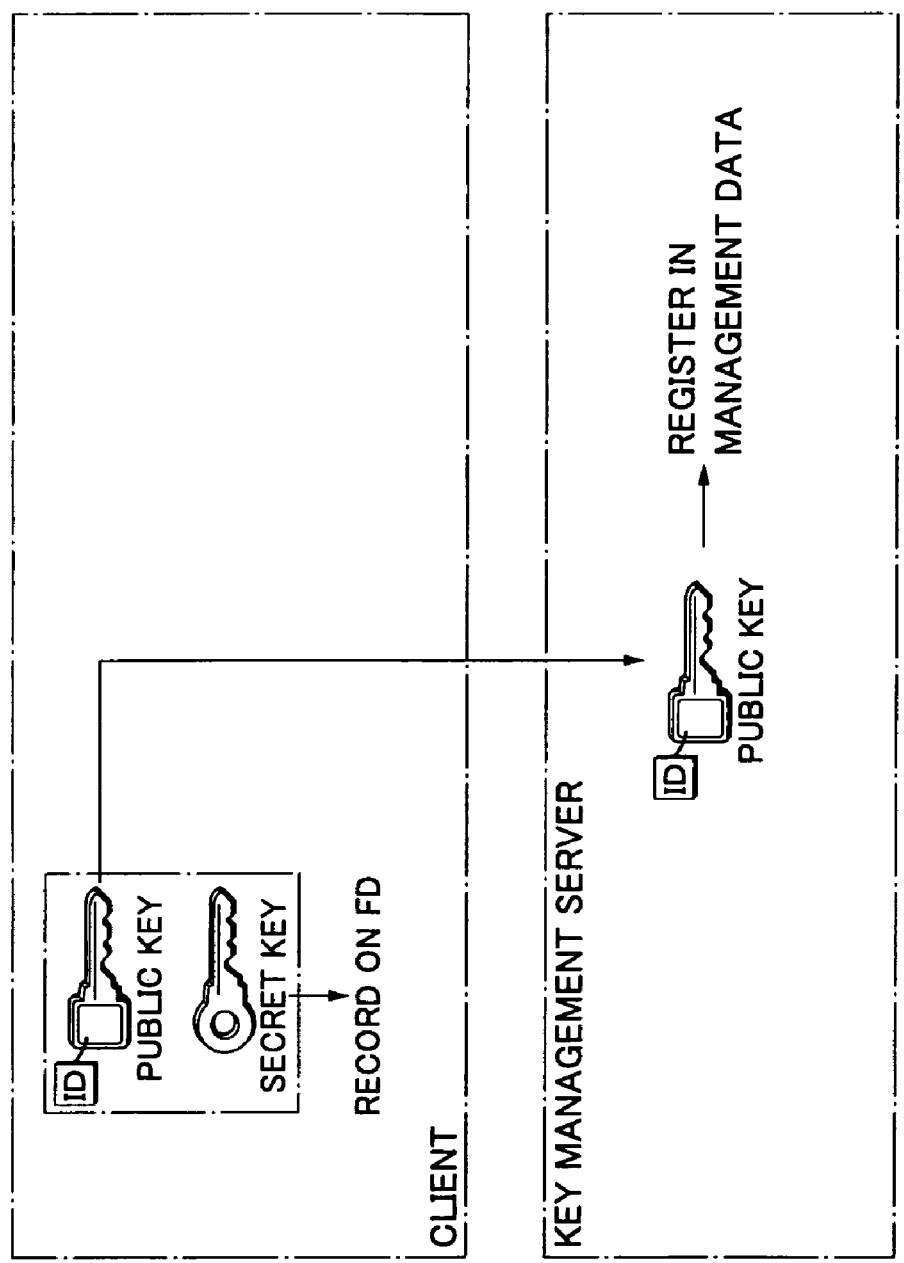
FIG. 7 illustrates public key registering processing by giving attention to transmission/receiving of keys.

The user who has received the FD having the ID recorded thereon executes the public key/secret key generation program from the input device in the client. On the other hand, in the key management server 10, the receiving of the public key generated in the client is prepared by the public key receiving program. FIG. 6 shows side by side a flow chart showing processing based on the public key/secret key generation program executed in the client and a flow chart showing processing based on the public key receiving program executed in the key management server 10. FIG. 7 illustrates the processing shown in FIG. 6 by giving attention to transmission/receiving of keys. As a representative of the clients 20, 30 . . . , the operations of the client 20 (the computer of the user A) will be described.

When the public key/secret key generation program is executed in the client 20, the pair of the public key and the secret key is generated (step 111, the public key and the secret key are respectively denoted by "OP1" and "S1"). The public key/secret key generation program reads out the ID "001" from the FD 24, and transmits the read ID "001" and the generated public key OP1 to the key management server 10. Further, the generated secret key S1 is recorded on the FD 24 (step 112). The ID "001" and the secret key S1 (the inherent data 25) are recorded on the FD 24 (see FIG. 3a).

The key management server 10 waits for the receiving of the ID and the public key which are transmitted from the client by the public key receiving program (NO in step 113). When the ID "001" and the public key OP1 are received from the client 20 (YES in step 113), the key management server 10 stores the received public key OP1 in the public key column in the management data corresponding to the received ID "001" (step 114). The public key generated in the other client is transmitted to the key management server 10 and is registered in the management data in the same way. The management database 15 is completed.

Figure 8:
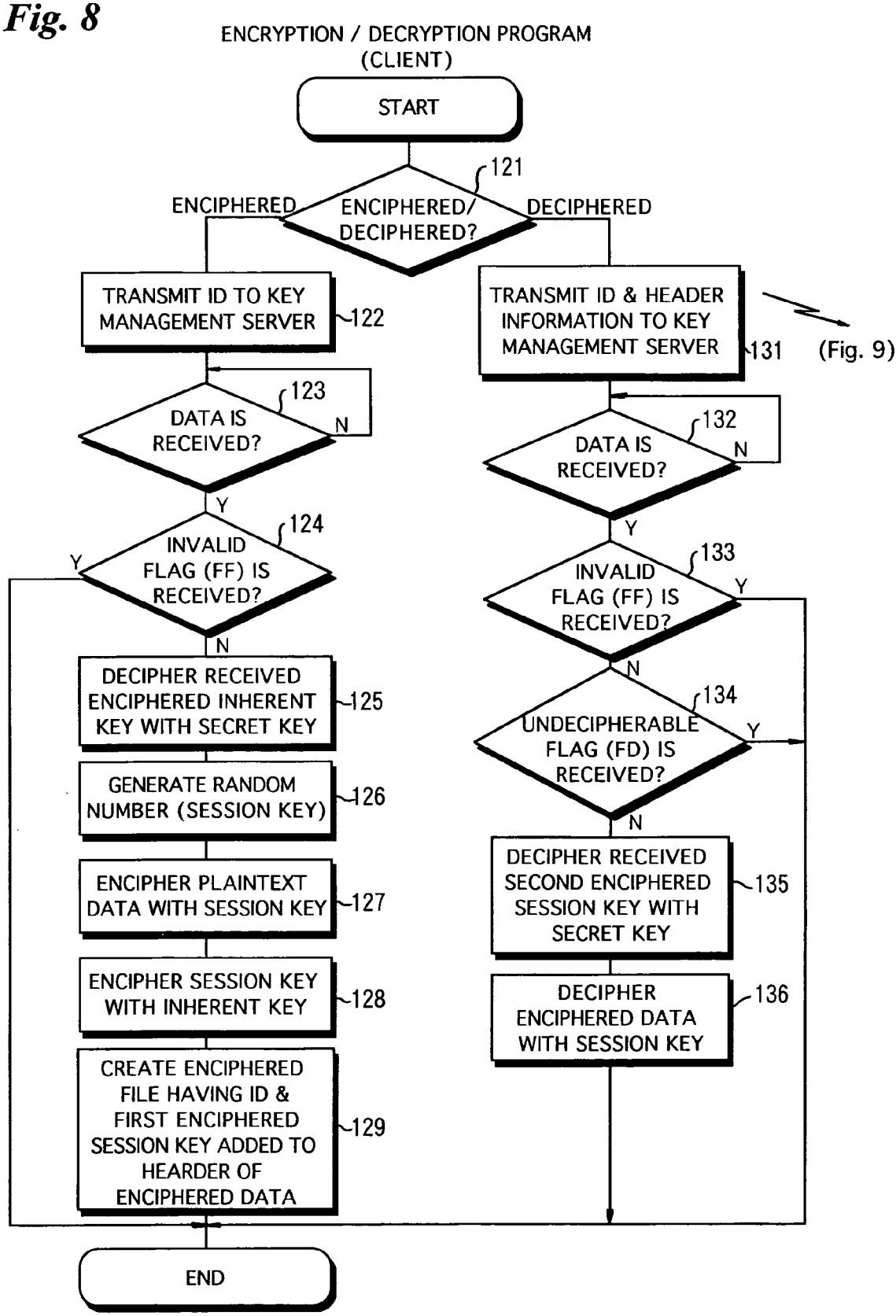
FIG. 8 is a flow chart showing the flow of processing based on an encryption/decryption program.
Figure 9:
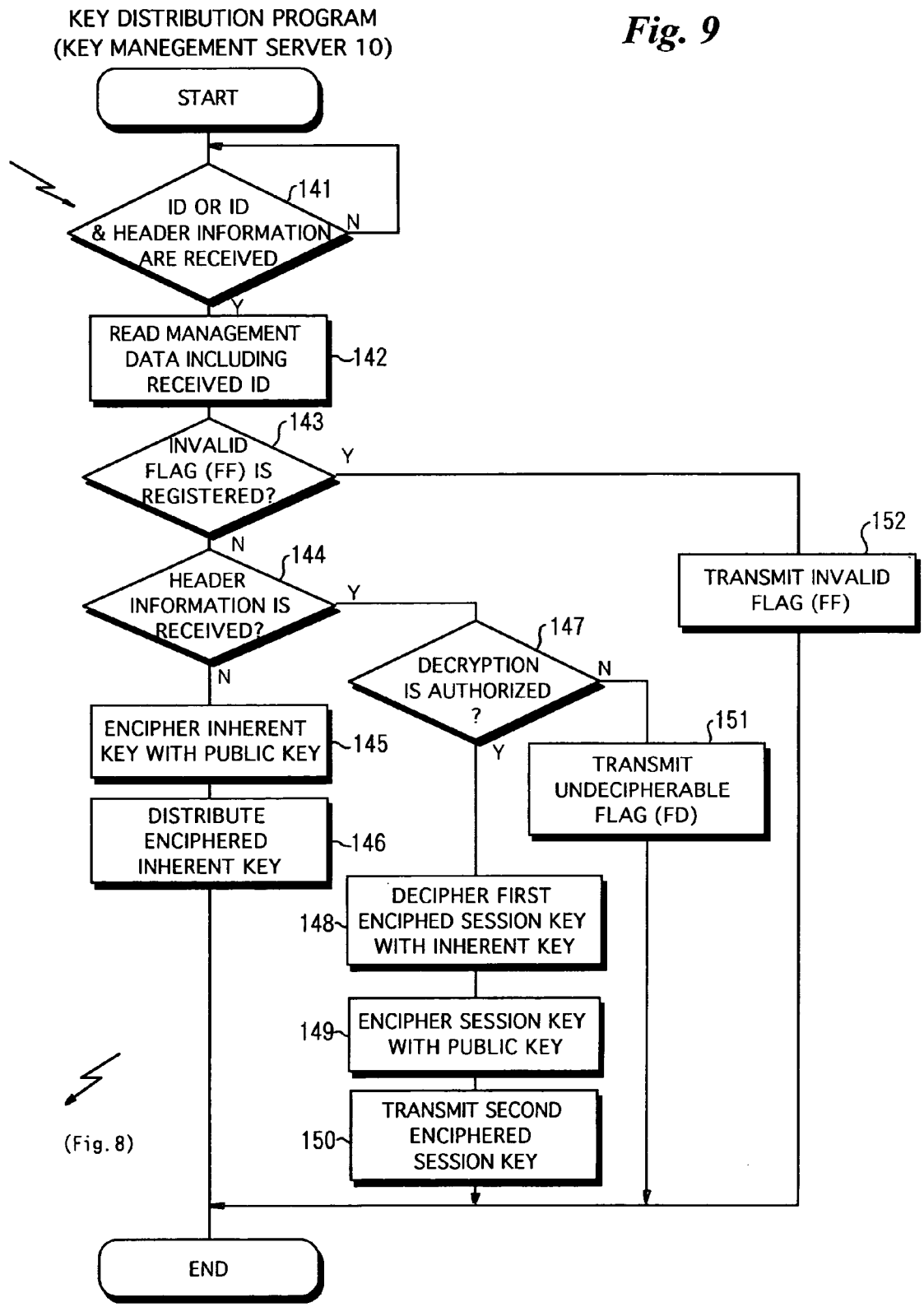
FIG. 9 is a flow chart showing the flow of processing based on a key distribution program.
Figure 10:
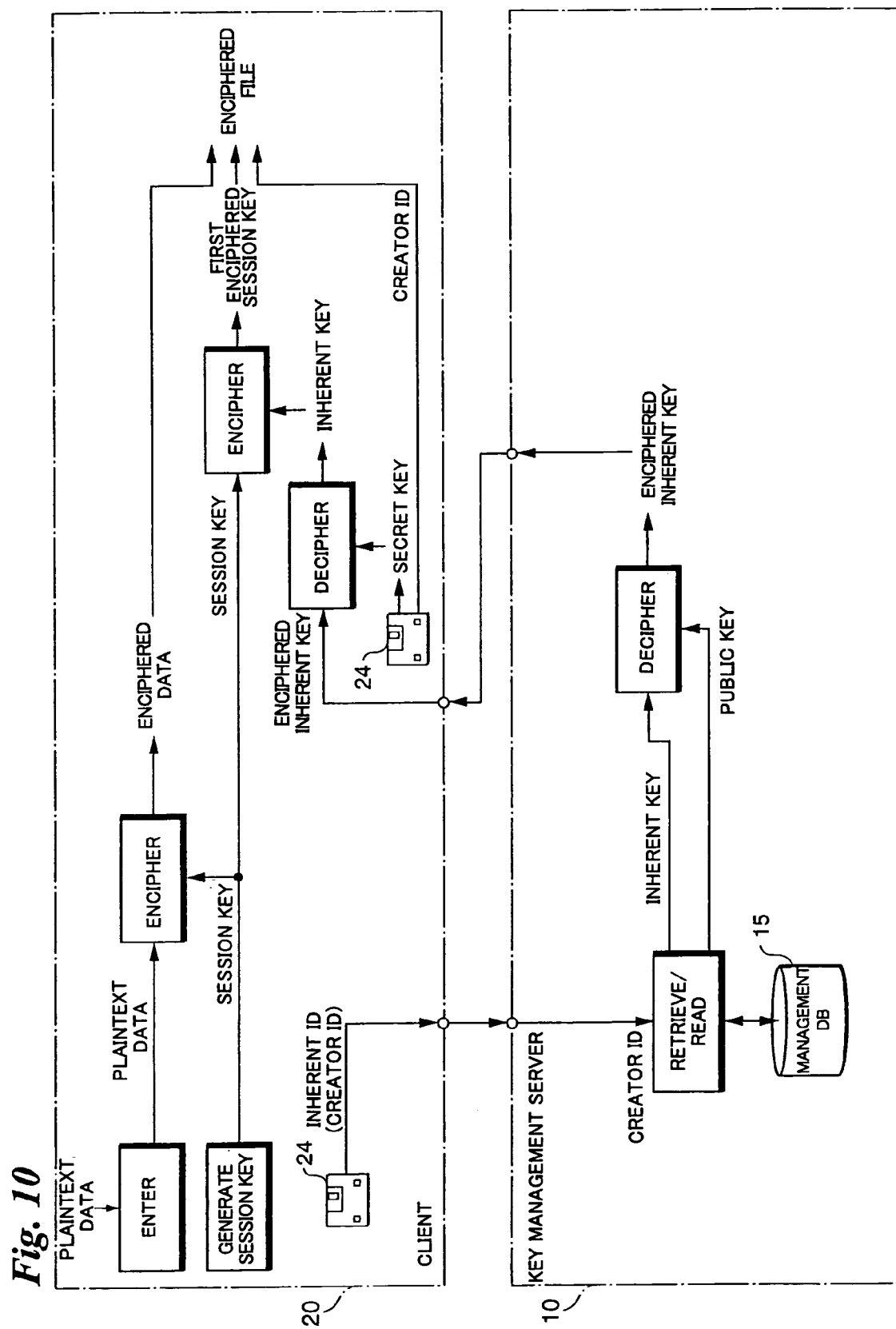
FIG. 10 is a block diagram showing enciphered file creating processing by giving attention to processing performed by a client and a key management server.
Figure 11:
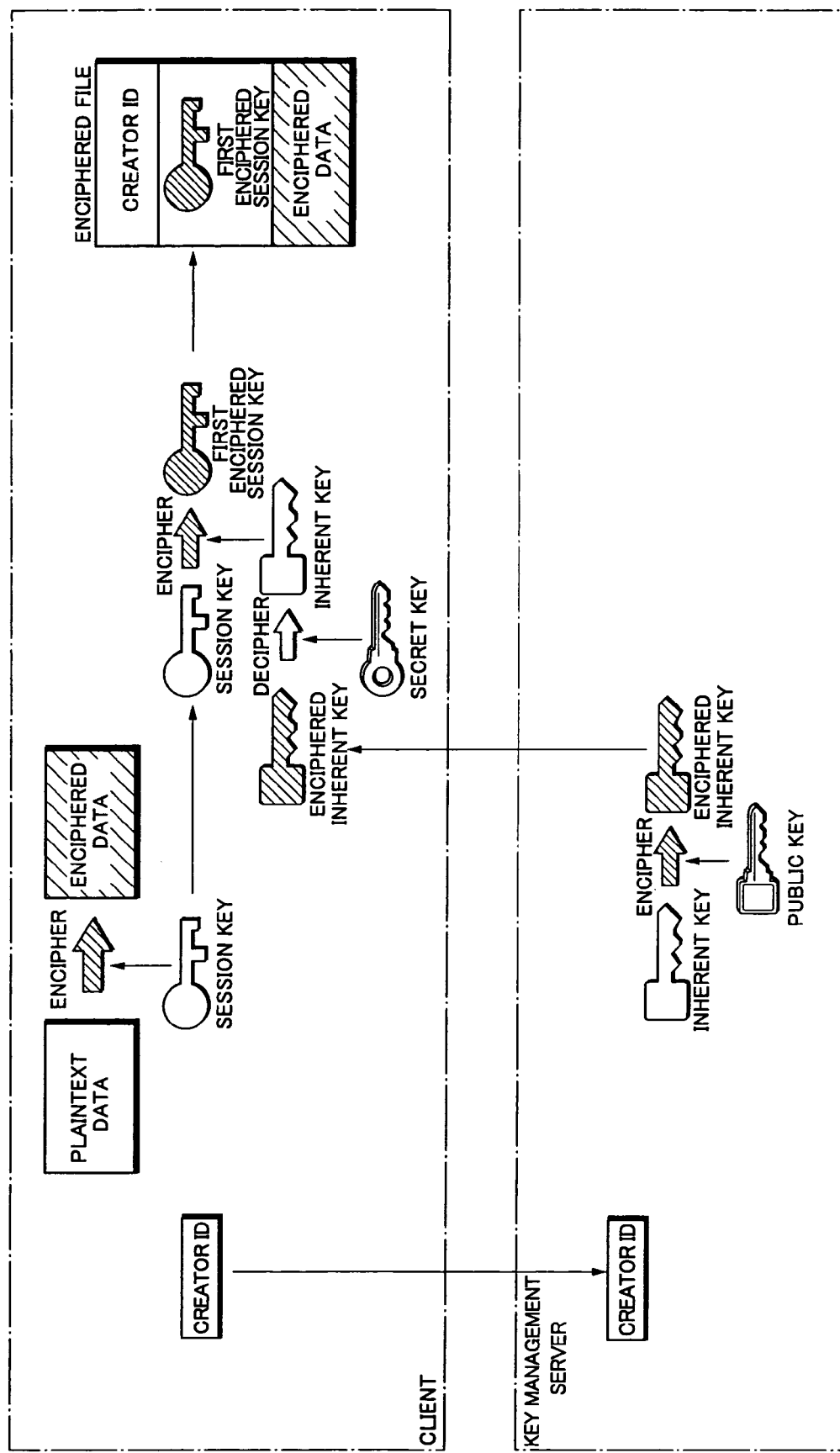
FIG. 11 illustrates enciphered file creating processing by giving attention to transmission/receiving of keys.
Figure 12:
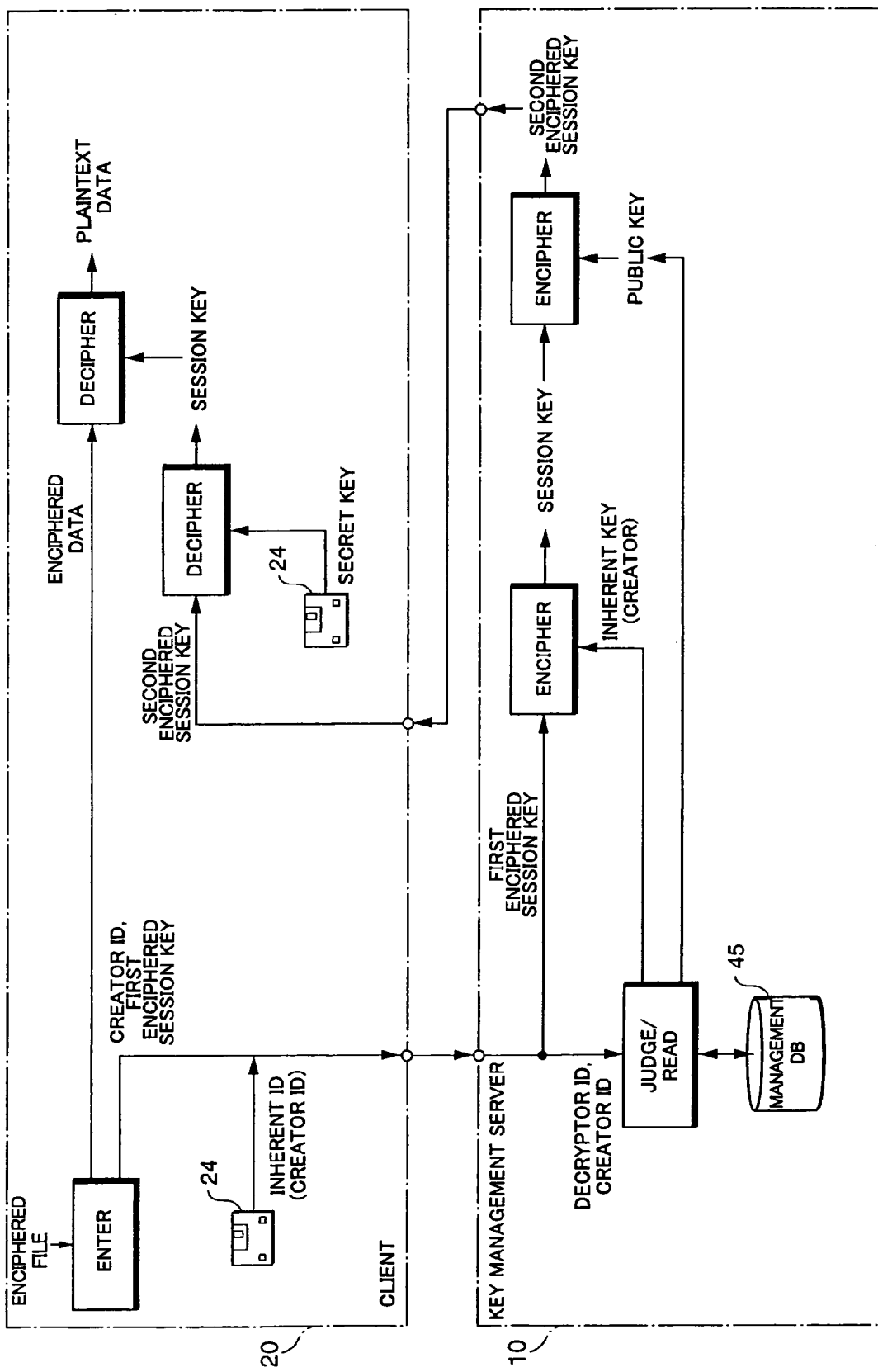
FIG. 12 is a block diagram showing enciphered file deciphering processing by giving attention to processing performed by a client and a key management server.
Figure 13:
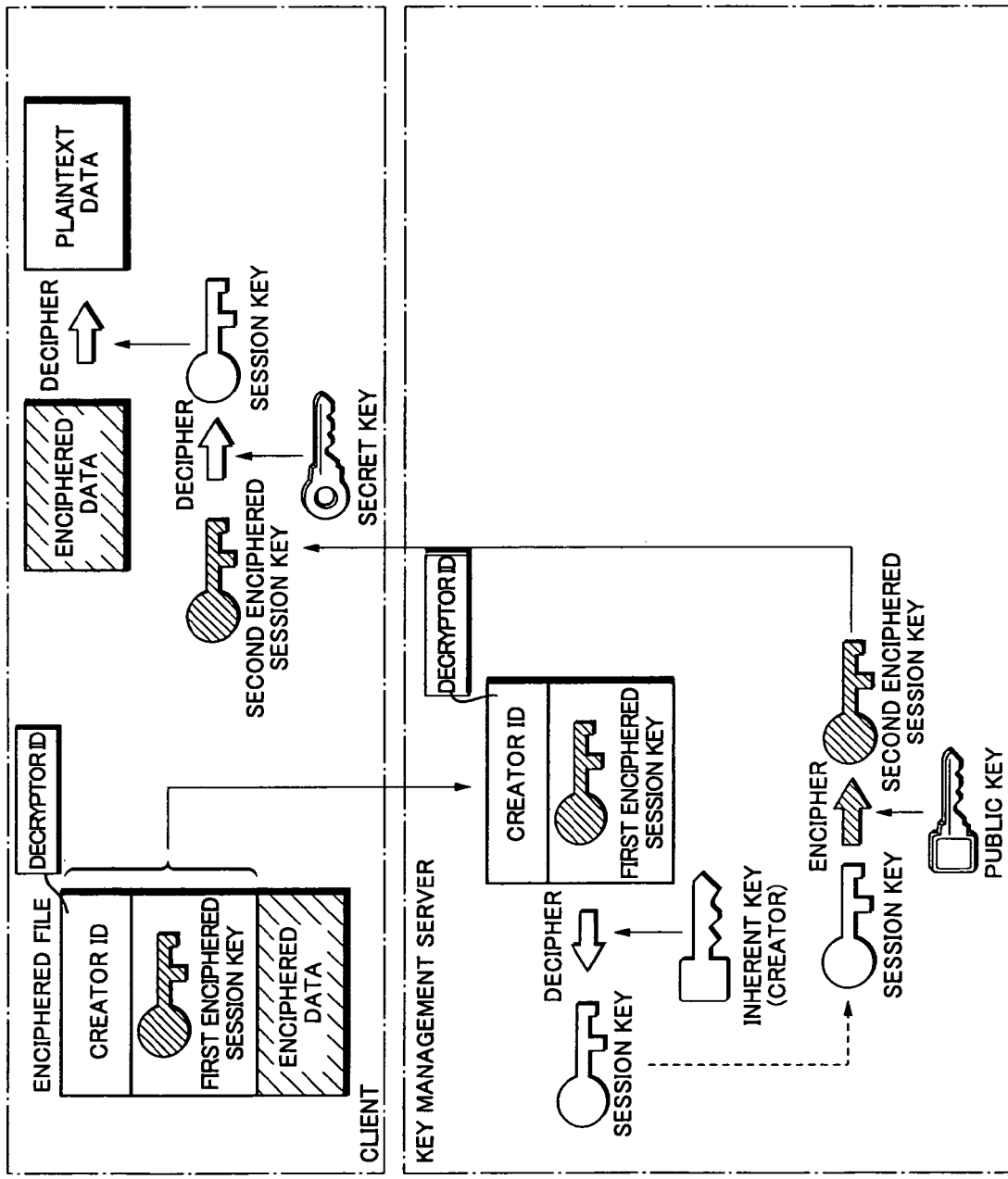
FIG. 13 illustrates enciphered file deciphering processing by giving attention to transmission/receiving of keys.

FIG. 8 is a flow chart showing the flow of processing based on the encryption/decryption program stored in the storage device in the client. FIG. 9 is a flow chart showing the flow of processing based on the key distribution program executed in the key management server 10. FIG. 10 is a block diagram showing processing performed by the client 20 and the key management server 10 in enciphering processing (enciphered file creating processing) in the processing shown in FIGS. 8 and 9. FIG. 11 illustrates the enciphering processing (enciphered file creating processing) by giving attention to transmission/receiving of keys. FIG. 12 is a block diagram showing processing performed by the client 20 and the key management server 10 in enciphered file deciphering processing in the processing shown in FIGS. 8 and 9. FIG. 13 illustrates the enciphered file deciphering processing by giving attention to transmission/receiving of keys. In a case where the user who utilizes the cryptographic system enciphers the plaintext data or a case where the user deciphers the enciphered file, the encryption/decryption program is executed in the client. The enciphered file creating processing and the enciphered file deciphering processing can be also realized by causing the computer (the client and the key management server 10) to execute the programs (here, the encryption/decryption program and the key distribution program), or can be also realized using hardware (an enciphering circuit, a deciphering circuit, etc.) which shares processing based on parts or all of the programs, as subsequently described.

When an instruction to start the encryption/decryption program is entered from the input device in the client, the encryption/decryption program is read out of the storage device in the client, and is read in the CPU. The encryption/decryption program is executed. In the following description, the operations of the client 20 (the computer of the user A) will be taken as an example.

The plaintext data to be enciphered or the enciphered file to be deciphered is entered (step 121). The plaintext data or the enciphered file may be entered through a conveyable recording medium such as FD (Floppy Disk), CD-ROM (Compact Disc Read-Only Memory), CD-R (Compact Disc-Recordable), CD-RW (Compact Disc-Rewritable), or MO (Magneto-Optic), may be one stored in the storage device 22 in the client 20, or may be one stored in the storage device in the other client such as the client 30 or 40 and read out through the network 1.

When the plaintext data is entered (enciphered in step 121), the ID "001" in the inherent data 25 recorded on the FD 24 mounted on the FDD 23 in the client 20 is transmitted to the key management server 10 (step 122). The encryption/decryption program waits for the receiving of data (described later) transmitted from the key management server 10 (step 123).

The key distribution program (FIG. 9) in the key management server 10 waits for the receiving of an ID transmitted from the client or the ID and header information transmitted from the client (step 141). When the key management server 10 receives the ID "001" from the client 20, the processing based on the key distribution program progresses (YES in step 141).

The management data including the received ID "001" is read out of the management database 15 provided in the first storage device 12 (step 142). The read management data is temporarily stored in the memory in the control device 11.

It is judged whether or not the invalid flag "FF" is stored in the management data temporarily stored in the memory (step 143).

When the invalid flag is not stored in the management data (NO in step 143), it is judged whether or not the header information is received (step 144). When the enciphered file is deciphered (FIG. 8; the case of "deciphered" in step 121), the header information is transmitted to the key management server 10 from the client, as described later. In the case of processing for enciphering the plaintext data, the header information is not received in the key management server 10 (NO in step 144). The key management server 10 enciphers an inherent key SK1 with the public key OP1 in the management data temporarily stored in the memory. An enciphered inherent key SK1 <OP1> is obtained (step 145). The generated enciphered inherent key SK1 <OP1> is distributed to the client 20 (step 146). The key distribution program waits for the receiving of an ID or the ID and header information again (step 141).

As described above, the encryption/decryption program in the client 20 (FIG. 8) waits for the data transmitted from the key management server 10 (step 123). When the client 20 receives the enciphered inherent key SK1 <OP1> distributed from the key management server 10, the processing based on the encryption/decryption program progresses in the client 20 (YES in step 123).

In a case where the invalid flag "FF" is not received (a case where the enciphered inherent key is received) (NO in step 124), the received enciphered inherent key SK1 <OP1> is deciphered with the secret key S1 recorded on the FD 24 (step 125). The enciphered inherent key SK1 <OP1> is deciphered, to obtain an inherent key SK1.

A random number is generated (step 126). The generated random number is used as a session key. The entered plaintext data is enciphered with the generated session key (step 127). Enciphered data is created.

The session key used for enciphering the plaintext data is enciphered with the inherent key SK1 obtained by deciphering the enciphered inherent key SK1 <OP1> received from the key management server 10 (step 128). An enciphered session key is obtained. A key obtained by enciphering the session key with the inherent key is hereinafter referred to as a "first enciphered session key".

Figure 14:
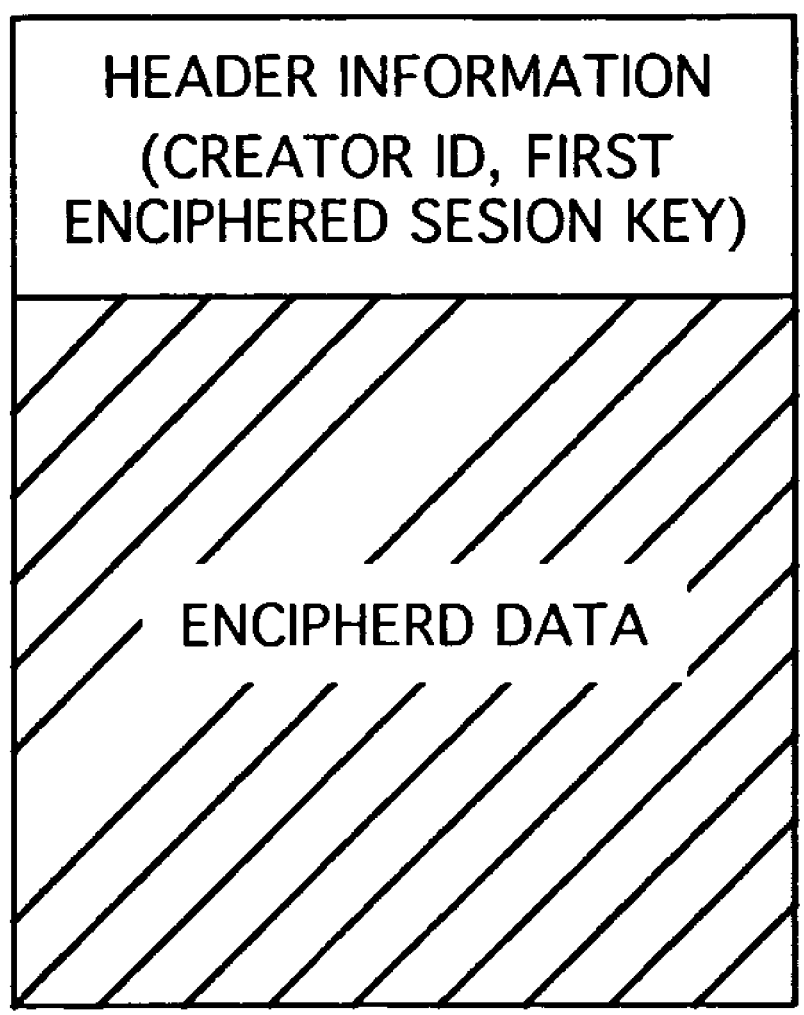
FIG. 14 schematically illustrates the data structure of an enciphered file.

An enciphered file having the ID "001" and the first enciphered session key added as header information to the created enciphered data is created (step 129; the enciphered file is schematically illustrated in FIG. 14). The created enciphered file is stored in the storage device 22 in the client 20. The processing based on the encryption/decryption program is terminated. The header information includes an ID of a creator (a creator ID) of the enciphered data (enciphered file).

When the invalid flag "FF" is stored in the management data read in the memory in the key management server 10 (FIG. 9; YES in step 143), the key distribution program transmits the invalid flag "FF" to the client 20 (step 152). In the client 20 which has received the invalid flag "FF", the processing based on the encryption/decryption program is terminated (FIG. 8; YES in step 124).

As described above, the invalid flag "FF" is stored in the management data related to the user who is not authorized to utilize the cryptographic system by the manager of the key management server 10. In this case, the plaintext data is not enciphered using the encryption/decryption program. Enciphering processing performed by the user who has stored the invalid flag can be inhibited by storing the invalid flag in the management data. The users can be intensively managed in the key management server 10. Further, it is possible to prevent enciphering processing performed by a person who is not authorized to utilize the cryptographic system.

When the enciphered file (see FIG. 14) is entered into the client 20 (deciphered in step 121), the ID "001" (a decryptor ID) and the header information in the entered enciphered file are transmitted to the key management server 10 from the client 20 (step 131). The encryption/decryption program waits for the receiving of data (described later) transmitted from the key management server 10 (step 132).

When the invalid flag "FF" is stored in the management data read in the memory in the key management server 10 (FIG. 9; YES in step 143), the invalid flag "FF" is transmitted to the client 20 from the key management server 10 (step 152). In the client 20, the processing based on the encryption/decryption program is terminated (FIG. 8; YES in step 133). The enciphered file is prevented from being improperly deciphered by the user who is not authorized to decipher the enciphered file.

When the invalid flag is not stored in the management data (NO in step 143), it is judged whether or not the header information is received (step 144). When the enciphered file is deciphered, as described above (FIG. 8; the case of "deciphered" in step 121), the key management server 10 receives the header information in the enciphered file to be deciphered (YES in step 144). The key distribution program judges whether or not the ID included in the received header information is a decryption object ID (step 147).

As described above, the ID of the creator of the decipherable enciphered file is stored in the decryption object ID column in the management data. On the other hand, the header information transmitted to the key management server 10 from the client includes the ID of the creator of the enciphered file. When the same ID as the ID included in the received header information (the ID of the creator of the enciphered file) is stored in the decryption object ID column in the management data, it is judged that the user who will perform the deciphering processing is the user having authorization to decipher the enciphered file to be deciphered (YES in step 147).

The header information transmitted to the key management server 10 from the client 20 includes the first enciphered session key together with the ID of the creator of the enciphered file. The first enciphered session key is obtained by enciphering the session key with an inherent key for the creator of the enciphered file. The key distribution program specifies the creator of the enciphered file on the basis of the creator ID of the enciphered file in the header information, and deciphers the first enciphered session key using the inherent key in the management data related to the user (step 148). The first enciphered session key is deciphered, to obtain a session key.

The obtained session key is enciphered with the public key OP1 for the user who will decipher the enciphered file (here, the user A having the ID "001") (step 149). An enciphered session key is generated. A key obtained by enciphering the session key with the public key is hereinafter referred to as a "second enciphered session key" in the first embodiment. The second enciphered session key is distributed to the client 20 from the key management server 10 (step 150).

In a case where the invalid flag "FF" is not received (NO in step 133), and an undecipherable flag "FD" (described later) is not also received (NO in step 134) (which is a case where the second enciphered session key is received), the received second enciphered session key is deciphered with the secret key S1 recorded on the FD 24 (step 135). A session key is obtained. The enciphered data is deciphered with the obtained session key (step 136). Plaintext data is obtained.

When the same ID as the ID included in the received header information (the ID of the creator of the enciphered file) is not stored in the decryption object ID column in the management data, the key distribution program judges that the user who will perform deciphering processing is the user having no authorization to decipher the enciphered file to be deciphered (YES in step 144, and NO in step 147). In this case, the undecipherable flag "FD" is transmitted to the client 20 from the key management server 10 (step 151).

In the client 20 which has received the undecipherable flag "FD", the deciphering processing is terminated (YES in step 134). The enciphered data is prevented from being deciphered by a person having no decryption authorization.

For example, it is assumed that in a state where the management database 15 shown in FIG. 4 is provided for the first storage device 12 in the key management server 10, the user B (the ID "002") executes the encryption/decryption program using the client 30, to enter an enciphered file.

When the entered enciphered file is an enciphered file created by the user B himself or herself, the enciphered file is allowed to be deciphered because management data related to the user B (the ID "002") includes the ID "002" as a decryption object ID (NO in step 134, and steps 135 and 136). Since the management data related to the user B (the ID "002") also includes the ID "004" as the decryption object ID, the user B can also decipher an enciphered file created by the user having the ID "004". On the other hand, the management data related to the user B does not include the ID "001" as the decryption object ID. When the user B attempts to decipher the enciphered file created by the user having the ID "001" (the user A), therefore, the undecipherable flag "FD" is transmitted to the client 30 (step 134). The user B cannot decipher the enciphered file created by the user A.

The cryptographic system can be utilized in the following circumstances, for example. In the management database 15 provided in the key management server 10, management data related to each of employees of a company or the like is generated. In a decryption object ID column in management data related to his or her boss, an ID of the employee which is a subordinate of the boss is registered. The cryptographic system can be operated such that the boss can decipher an enciphered file created by the subordinate, and the subordinate cannot decipher the enciphered file created by the boss. It is possible to perform authorization management corresponding to an organization structure in the company or the like.

Although in the above-mentioned embodiment, the ID is recorded on the FD in the key management server 10 and is distributed to the users, it may be, of course, recorded on another recording medium such as MO or CD-RW and distributed. An ID is distributed to each of the users through the network 1 by an electronic mail or the like, and an ID and a secret key (inherent data) may be recorded on the hard disk in the client.

The programs for performing the processing in the above-mentioned embodiment can be stored in the storage devices in the key management server 10 or the clients 20, 30 . . . by being installed through the network 1 or being installed after being recorded on the CD-ROM or the like.

SECOND EMBODIMENT

Figure 15:
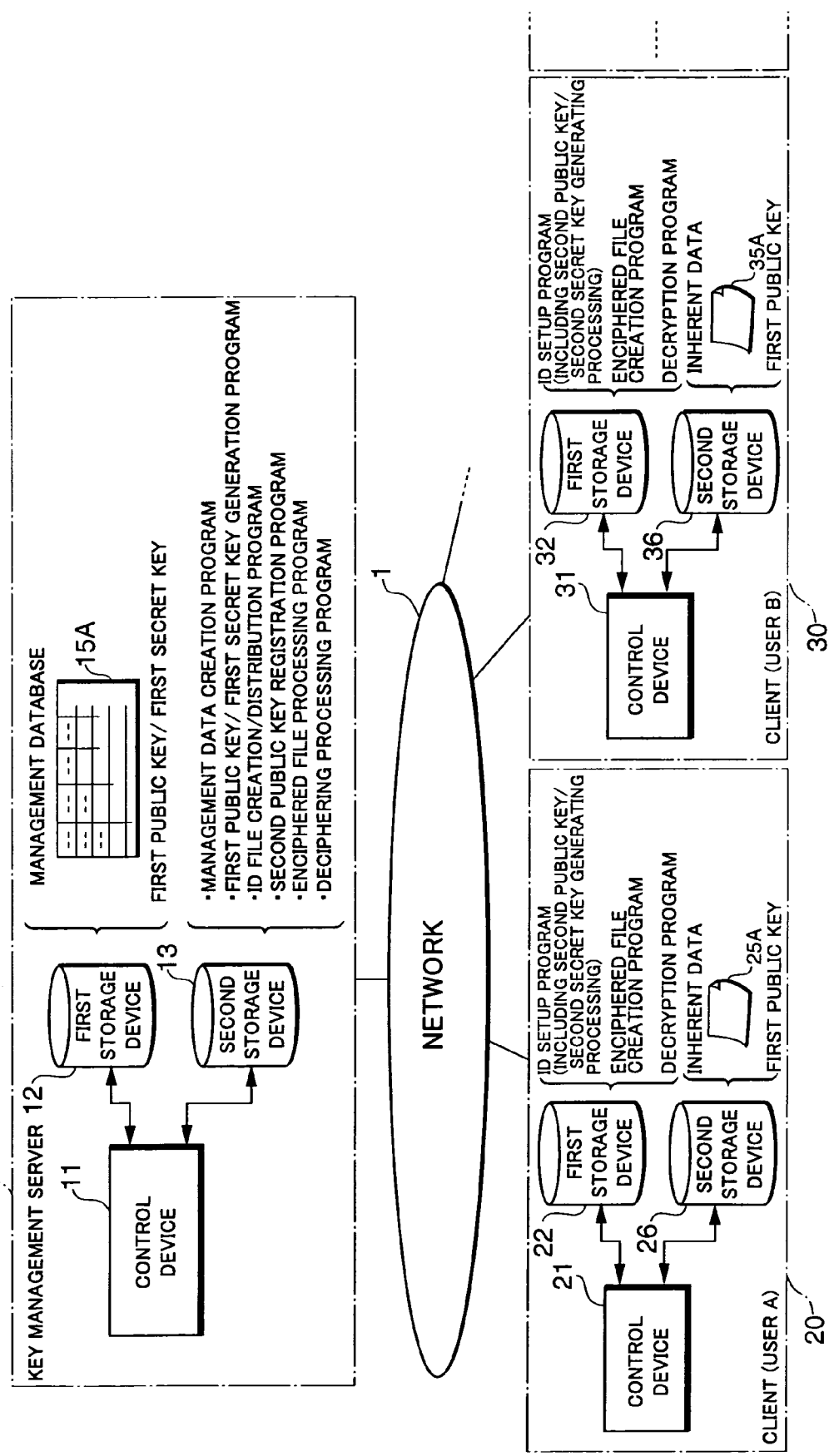
FIG. 15 illustrates the overall configuration of a cryptographic system according to a second embodiment.

FIG. 15 is a block diagram showing the overall configuration of a cryptographic system according to a second embodiment. The configuration of the cryptographic system differs from the configuration of the cryptographic system according to the first embodiment shown in FIG. 2 in that an FDD 14 is not connected to a control device 11 in a key management server 10 and in that FDDs 23 and 33 are not respectively connected to control devices 21 and 31 in clients 20 and 30 and second storage devices 26 and 36 are connected thereto from the point of view of hardware.

Further, the contents of data and programs which are stored in a first storage device 12 and a second storage device 13 in the key management server 10 in the second embodiment also differ from those in the first embodiment. The contents of data and programs which are stored in the first storage devices 22, 32 . . . in the clients 20, 30 . . . in the second embodiment also differ from those in the first embodiment.

The first storage device 12 in the key management server 10 is provided with a management database 15A, and further stores a pair of a first public key and a first secret key. The management database 15A stores an ID, a second public key, an inherent key, etc. with respect to each of users of the cryptographic system (the details thereof will be described later). The pair of the first public key and the first secret key stored in the first storage device 12 in the key management server 10 is generated in the key management server 10 and is stored in the first storage device 12, as described later. The second storage device 13 in the key management server 10 stores a management data creation program, a first public key/first secret key generation program, an ID file creation/distribution program, a second public key registration program, an enciphered file processing program, and a deciphering processing program. Processing based on the programs will be also described later.

Each of the first storage device 22 in the client 20 and the first storage device 32 in the client 30 stores an ID setup program, an enciphered file creation program, and a decryption program. Each of the second storage devices 26 and 36 stores inherent data and a first public key. The details of the processing based on the programs and the data will be also described later.

Figure 16A:
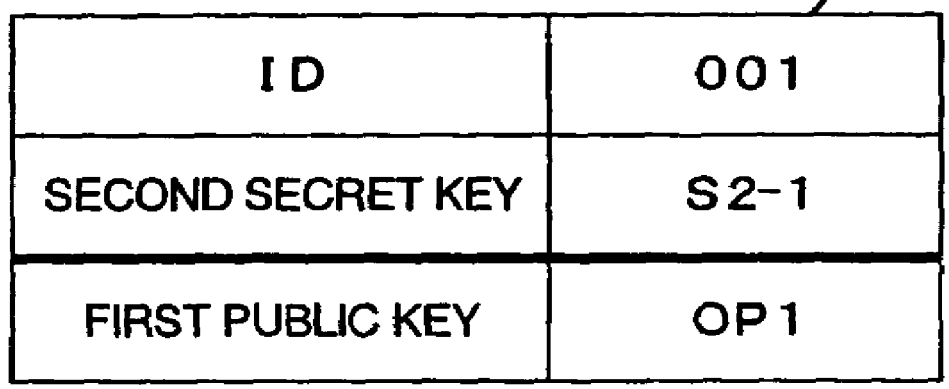
FIG. 16*a* and FIG. 16*b* respectively illustrate the contents of management data that a user having an ID "001" has and the contents of management data that a user having an ID "002" has.
Figure 16B:
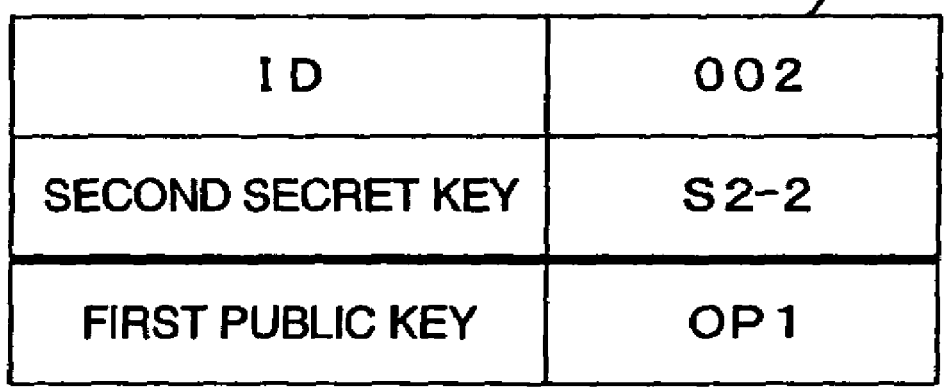

FIGS. 16(A) and 16(B) respectively illustrate an example of the inherent data 25A and the first public key which are stored in the second storage device 26 in the client 20 and an example of the inherent data 35A and the first public key which are stored in the second storage device 36 in the client 30. The inherent data 25A and 35A respectively differ from the inherent data 25 and 35 in the first embodiment shown in FIG. 3 in that a second secret key is stored in place of the secret key. Further, the second embodiment differs from the first embodiment in that a first public key OP1 is stored in addition to the inherent data in the second storage devices 26 and 36. The ID and the second secret key differ for each of the clients 20 and 30 . . . . The first public key OP1 is common to all the clients 20, 30 . . . . As described later, the second secret key is generated in each of the clients 20, 30 . . . . The first public key OP1 is generated in the key management server 10.

FIG. 17 illustrates the contents of the first storage device 12 in the key management server 10. The first storage device 12 in the key management server 10 stores the management database 15A and the pair of the first public key and the first secret key.

Similarly to the management database 15 in the first embodiment (FIG. 4), the management database 15A stores management data related to each of the users who utilize the cryptographic system. The management database 15A differs from the management database 15 in the first embodiment (FIG. 4) in that a second public key is included in place of the public key. The second public key is the public key in the pair of the public key and the secret key generated by the execution of the ID setup program in the client, and is transmitted in an enciphered state to the key management server 10 from each of the clients 20, 30 . . . (the details thereof will be described later). The management data constituting the management database 15A is created on the basis of the management data creation program (see FIG. 5)

except for the second public key registered in a second public key column and is registered in the management database 15A, as in the first embodiment.

Figure 18:
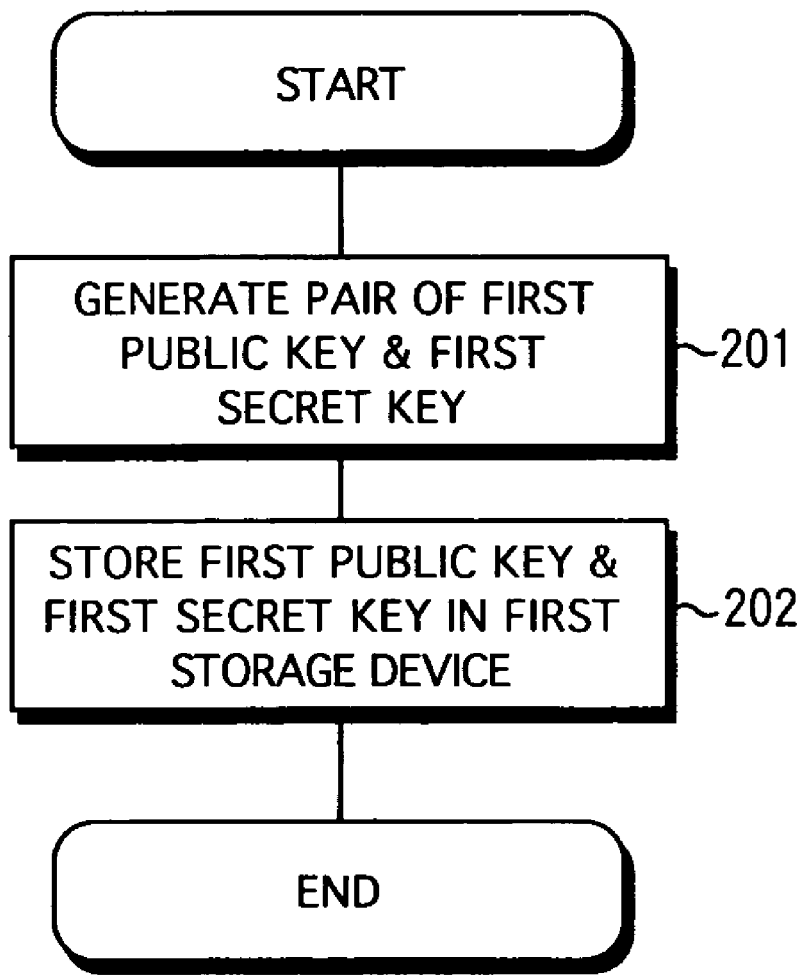
FIG. 18 is a flow chart showing the flow of processing based on a first public key/first secret key generation program.

FIG. 18 is a flow chart showing the flow of processing based on the first public key/first secret key generation program stored in the second storage device 13 in the key management server 10.

When a manager of the key management server 10 enters an instruction to start the first public key/first secret key generation program from an input device, the first public key/first secret key generation program is read out of the second storage device 13 in the key management server 10, and is read in a CPU. The first public key/first secret key generation program is executed when the cryptographic system is set up (when the operations of the cryptographic system are started or when the management database 15A is generated).

A pair of a public key and a secret key is generated (step 201). The public key/secret key generated in the key management server 10 is referred to as a first public key OP1/first secret key S1.

The generated first public key OP1 and first secret key S1 are stored in the first storage device 12 in the key management server 10 (step 202). The processing based on the first public key/first secret key generation program is terminated.

The pair of the public key/secret key is also generated in each of the clients 20, 30 . . . , as subsequently described. The public key/secret key generated in each of the clients 20, 30 . . . is referred to as a second public key/second secret key. As described above, the second public key in the pair of the second public key and the second secret key generated in each of the clients 20, 30 . . . is transmitted in an enciphered state to the key management server 10. In the key management server 10, the enciphered second public key is deciphered, and is registered in a second public key column in the management data provided for each of the users.

Figure 20:
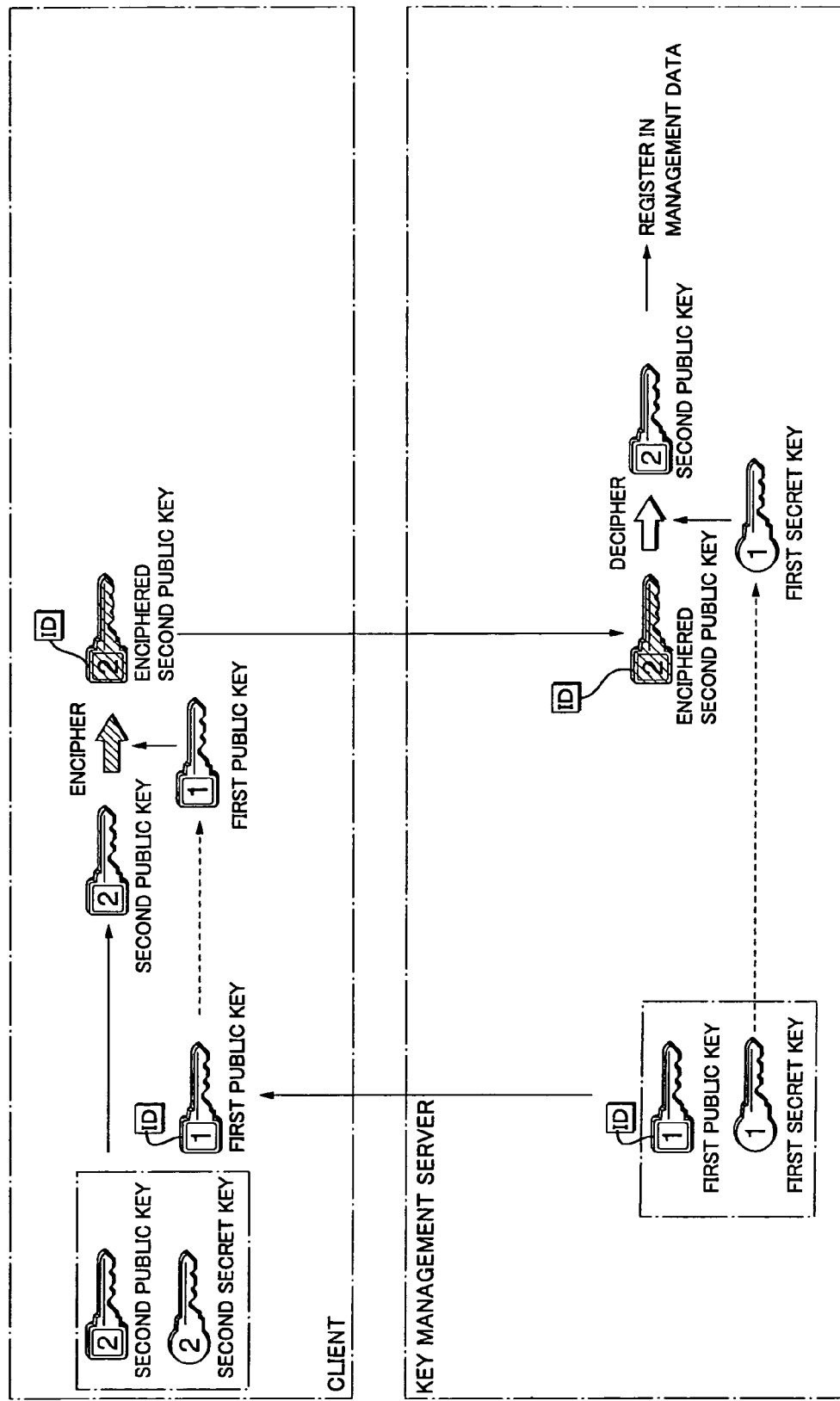
FIG. 20 illustrates second public key registering processing by giving attention to transmission/receiving of keys.

FIG. 19 is a flow chart showing the flow of processing performed by the key management server 10 and the client until the second public key is stored in the management database 15A in the key management server 10. FIG. 20 illustrates the processing shown in FIG. 19 by giving attention to transmission/receiving of keys. The ID file creation/distribution program and the second public key registration program are executed in the key management server 10, and the ID setup program is executed in the client. The operations of the client 20 (a computer of a user A) will be described as a representative of the clients 20, 30 . . . .

When the manager of the key management server 10 enters an instruction to start the ID file creation/distribution program, the ID file creation/distribution program is executed. A list of the management data (the whole of the management database 15A) is displayed on a display screen of a display device (step 211).

The manager of the key management server 10 selects an ID of the user who should distribute an ID file, described later (step 212). When it is assumed that an ID "001" (an ID of the user A) is selected, an ID file including the selected ID "001" and the first public key OP1 in correspondence with ID "001" stored in the first storage device 12 is created (step 213). The created ID file is distributed toward the client 20 (the computer of the user A) through a network 1 (step 214). When the ID file is created and is transmitted to the other user, the above-mentioned processing is also repeated (NO in step 215, step 212). When the distribution of the ID file is terminated with respect to all the users, the processing based on the ID file creation/distribution program is terminated (YES in step 215).

In the client 20, the ID setup program stored in the first storage device 22 is started. The ID file transmitted from the key management server 10 is received in the client 20 (step 221).

As described above, the ID "001" and the first public key OP1 are included in the ID file distributed to the client 20 from the key management server 10. The ID setup program stores in the second storage device 26 the ID "001" and the first public key OP1 which are included in the ID file (step 222).

The ID setup program further generates a pair of a public key and a secret key (this is a second public key/second secret key) (step 223). In a generated pair of a second public key OP2-1 and a second secret key S2-1, the second secret key S2-1 is stored in the second storage device 26 (step 224). As shown in FIG. 16a, the second storage device 26 in the client 20 stores the ID "001" and the second secret key S2-1 (the inherent data 25A), and stores the first public key OP1.

The generated second public key OP2-1 is enciphered with the first public key OP1 distributed from the key management server 10 (step 225). An enciphered second public key OP2-1 <OP1> is obtained. The obtained enciphered second public key OP2-1 <OP1> and the ID "001" are transmitted to the key management server 10 from the client 20 (step 226). The processing based on the ID setup program in the client 20 is terminated.

In the key management server 10, the second public key registration program waits for the receiving of the ID and the enciphered second public key which are transmitted from the client (NO in step 231). The key management server 10 reads out, when it receives the ID "001" and the enciphered second public key OP2-1 <OP1> from the client 20 (YES in step 231), the first secret key S1 in the pair of the first public key OP1 and the first secret key S1 stored in the first storage device 12, and deciphers the received enciphered second public key OP2-1 <OP1> with the first secret key S1 (step 232). A second public key OP2-1 is obtained. The obtained second public key is registered (stored) in the management data related to the received ID "001" (step 233). The second public key for each of the users is stored in the management data in such a way, thereby completing the management database 15A (FIG. 17).

Figure 21:
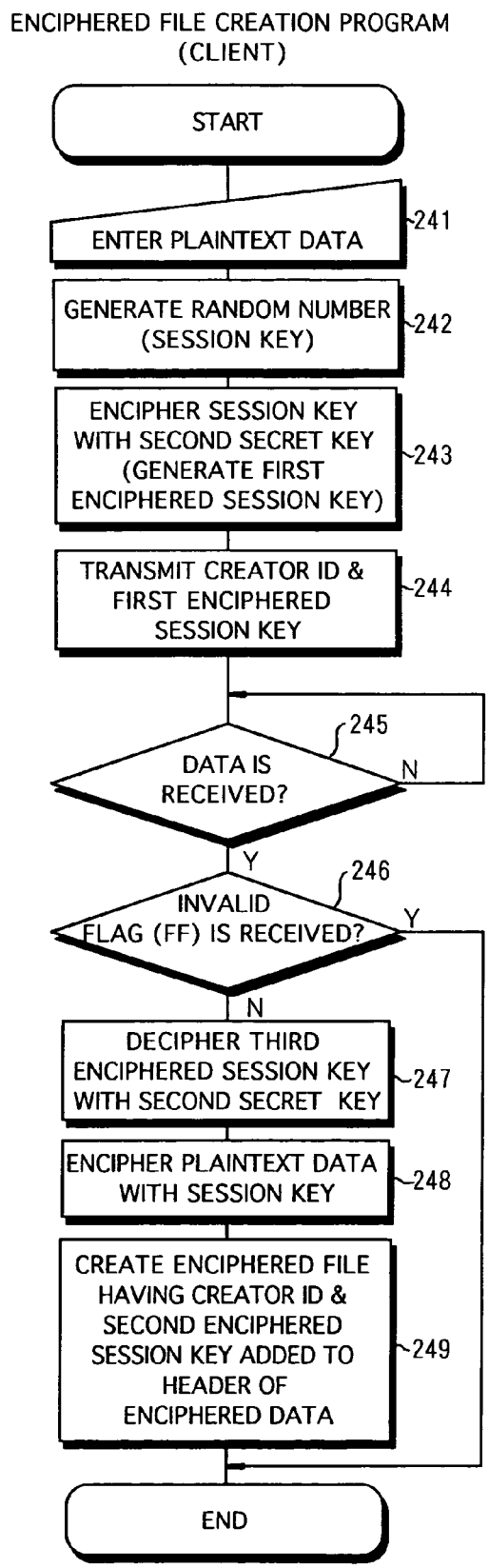
FIG. 21 is a flow chart showing the flow of processing based on an enciphered file creation program.
Figure 22:
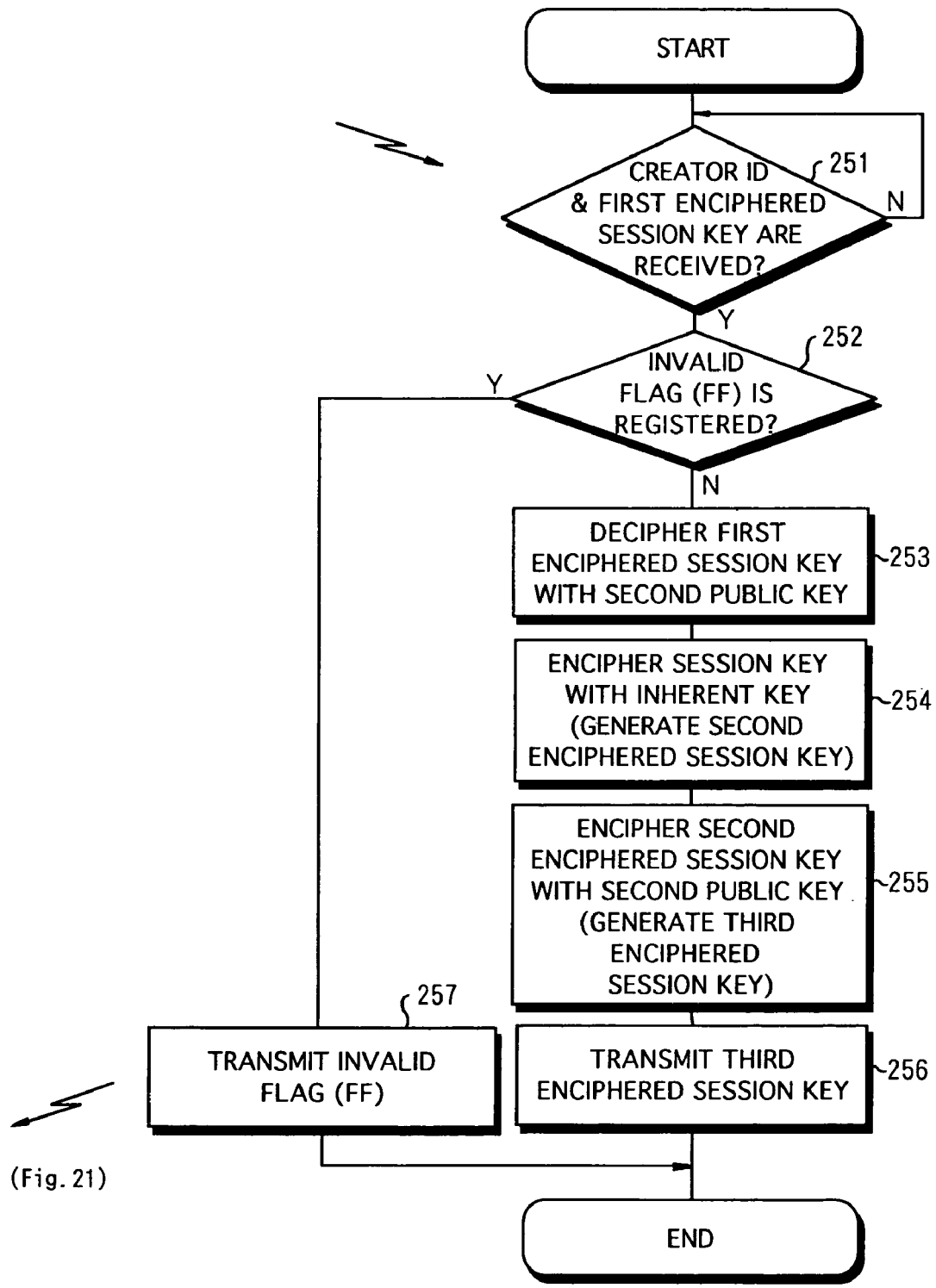
FIG. 22 is a flow chart showing the flow of processing based on an enciphered file processing program.
Figure 23:
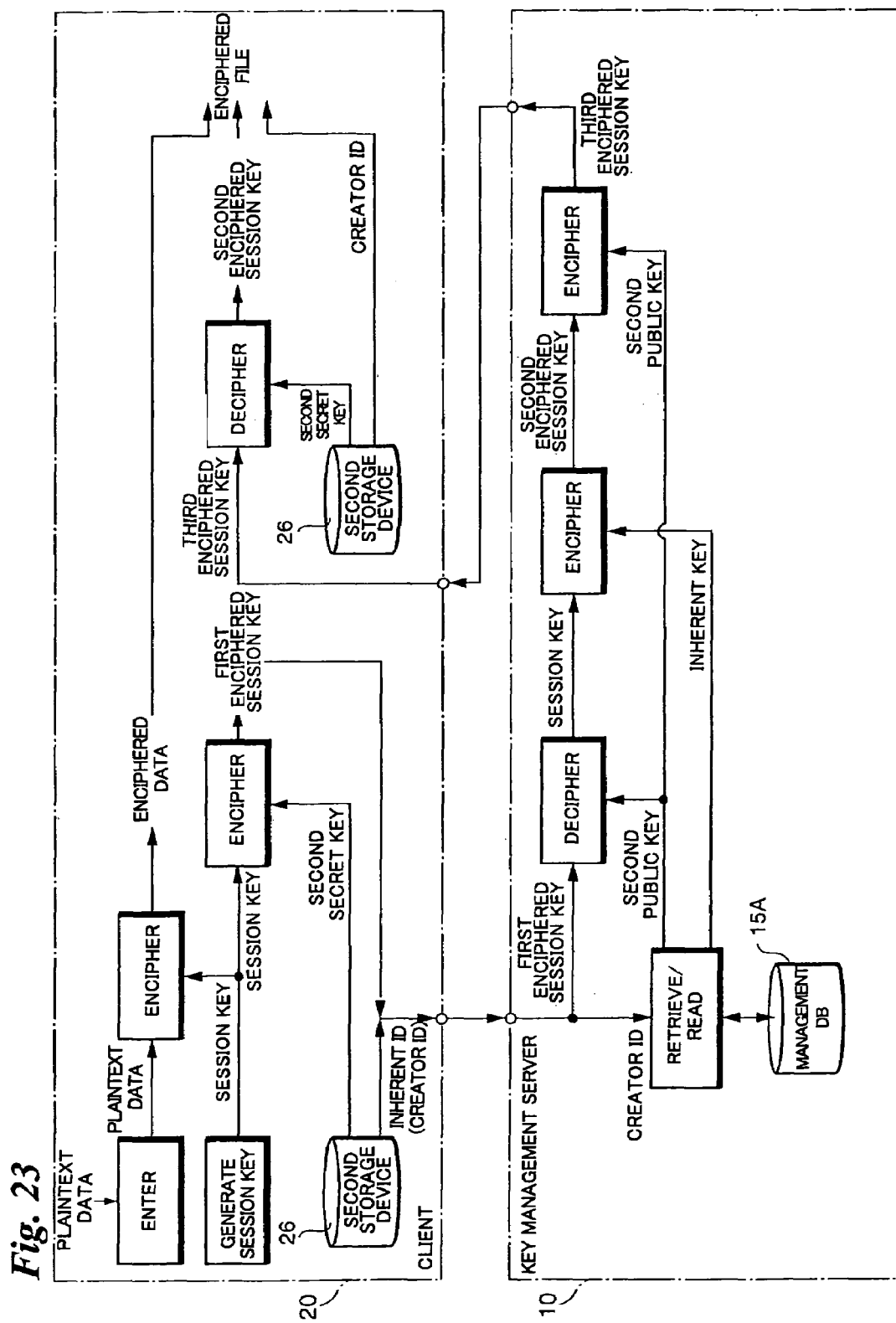
FIG. 23 is a block diagram showing enciphered file creating processing by giving attention to processing performed by a client and a key management server.
Figure 24:
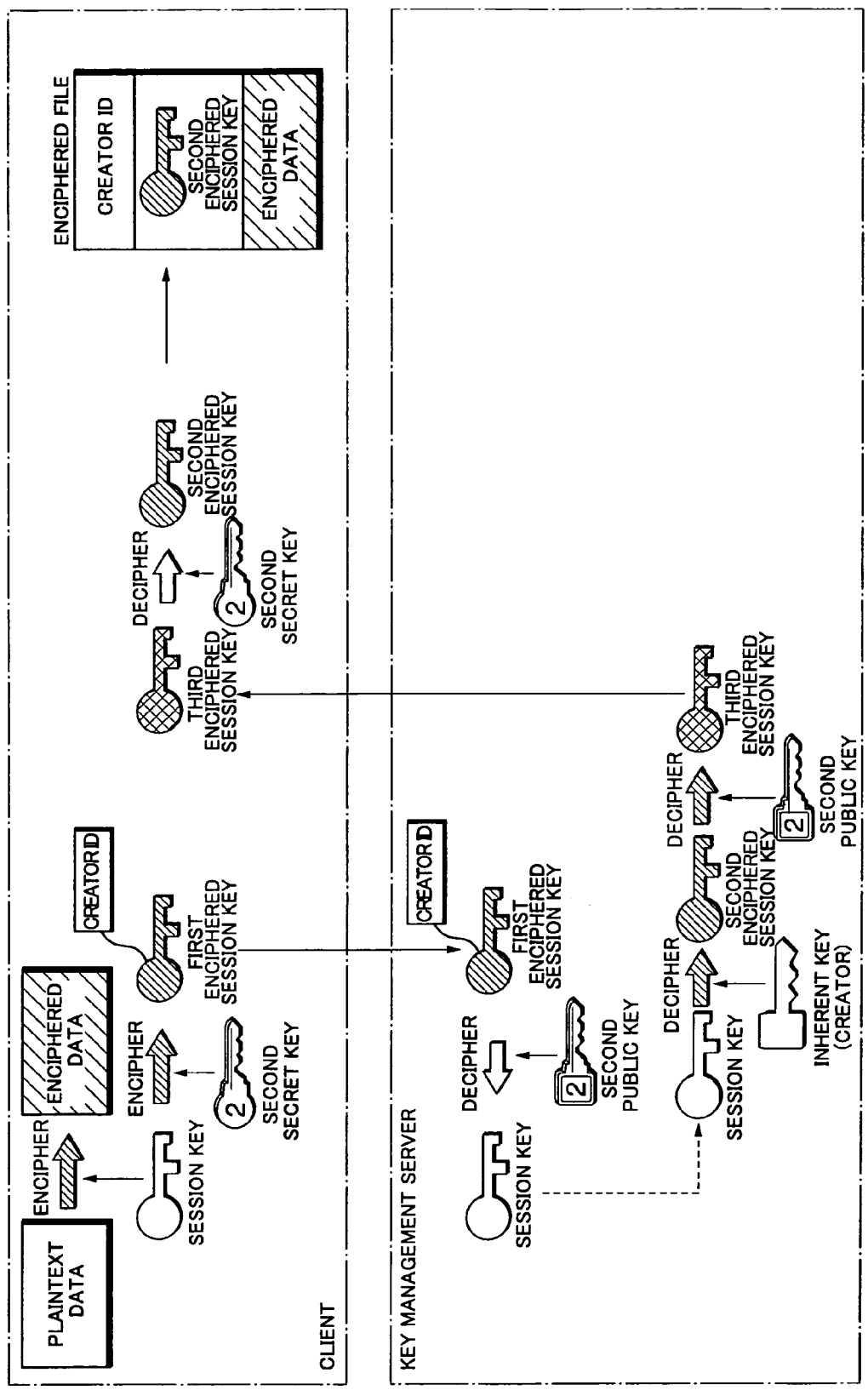
FIG. 24 illustrates enciphered file creating processing by giving attention to transmission/receiving of keys.

FIG. 21 is a flow chart showing the flow of processing based on the enciphered file creation program stored in the first storage device in the client. FIG. 22 is a flow chart showing the flow of processing based on the enciphered file processing program executed in the key management server 10 in response to the execution of the enciphered file creation program in the client. FIG. 23 shows by a block diagram processing performed by the client 20 and the key management server 10 in the processing for creating the enciphered file shown in FIGS. 21 and 22. FIG. 24 illustrates the processing for creating the enciphered file shown in FIGS. 21 and 22 by giving attention to the flow of keys.

When an instruction to start the enciphered file creation program is entered from the input device in the client, the enciphered file creation program is read out of the first storage device in the client, and is read in the CPU. The enciphered file creation program is executed. In the following description, the operations of the client 20 (the computer of the user A) will be taken as an example.

Plaintext data to be enciphered is entered (step 241).

A random number is generated (step 242). The generated random number is used as a session key. The entered plaintext data is enciphered with the session key, as described later.

The generated session key is enciphered with the second secret key S2-1 in the inherent data 25A stored in the second storage device 26 in the client 20 (step 243). In the second embodiment, a key obtained by enciphering the session key with the second secret key is referred to as a "first enciphered session key". The session key itself remains temporarily stored in a memory in the client 20.

The ID "001" (a ID of a user who will create an enciphered file: hereinafter referred to as a "creator ID") in the inherent data 25A and the above-mentioned first enciphered session key are transmitted to the key management server 10 from the client 20 (step 244).

The enciphered file processing program in the key management server 10 (FIG. 22) waits for the receiving of the creator ID and the first enciphered session key (NO in step 251). When the key management server 10 receives the creator ID "001" and the first enciphered session key from the client 20, the processing based on the enciphered file processing program progresses (YES in step 251).

The management data including the received creator ID "001" is read out of the management database 15A provided in the first storage device 12 in the key management server 10, and is temporarily stored in a memory in the control device 11. In the management data temporarily stored in the memory, when an invalid flag "FF" is stored, the invalid flag "FF" is transmitted to the client 20 from the key management server 10 (YES in step 252, step 257). When the client 20 receives the invalid flag "FF" (FIG. 21: YES in step 245, YES in step 246), the processing based on the enciphered file creation program is terminated as it is in the client 20. No enciphered file is created.

When the invalid flag is not stored in the management data (NO in step 252), the received first enciphered session key is deciphered with the second public key OP2-1 in the management data related to the user having the ID "001" temporarily stored in the memory (step 253). Since the first enciphered session key is enciphered with the second secret key S2-1 in the client 20, the first enciphered session key is deciphered with the second public key OP2-1. A session key is obtained (step 253).

An inherent key SK1 in the management data is used, so that the obtained session key is enciphered (step 254). In the second embodiment, a key obtained by enciphering the session key with the inherent key is hereinafter referred to as a "second enciphered session key".

Furthermore, the generated second enciphered session key is enciphered with the second public key OP2-1 in the management data (step 255). A key obtained by enciphering the second enciphered session key with the second public key in the second embodiment is hereinafter referred to as a "third enciphered session key". The third enciphered session key is transmitted to the client 20 from the key management server 10 (step 256). The processing based on the enciphered file processing program in the key management server 10 is terminated.

The client 20 waits for the receiving of the third enciphered session key transmitted from the key management server 10 (FIG. 21: NO in step 245). When the third enciphered session key is received (YES in step 245, NO in step 246), the client 20 deciphers the third enciphered session key with the second secret key S2-1 in the inherent data 25A stored in the second storage device 26 (step 247). A second enciphered session key is obtained.

The entered plaintext data is enciphered with the session key, to create enciphered data (step 248). An enciphered file having a creator ID and the above-mentioned enciphered session key (they are referred to as header information) added to the header of the created enciphered data is created (step 249). The processing based on the enciphered file creation program is terminated.

Figure 25:
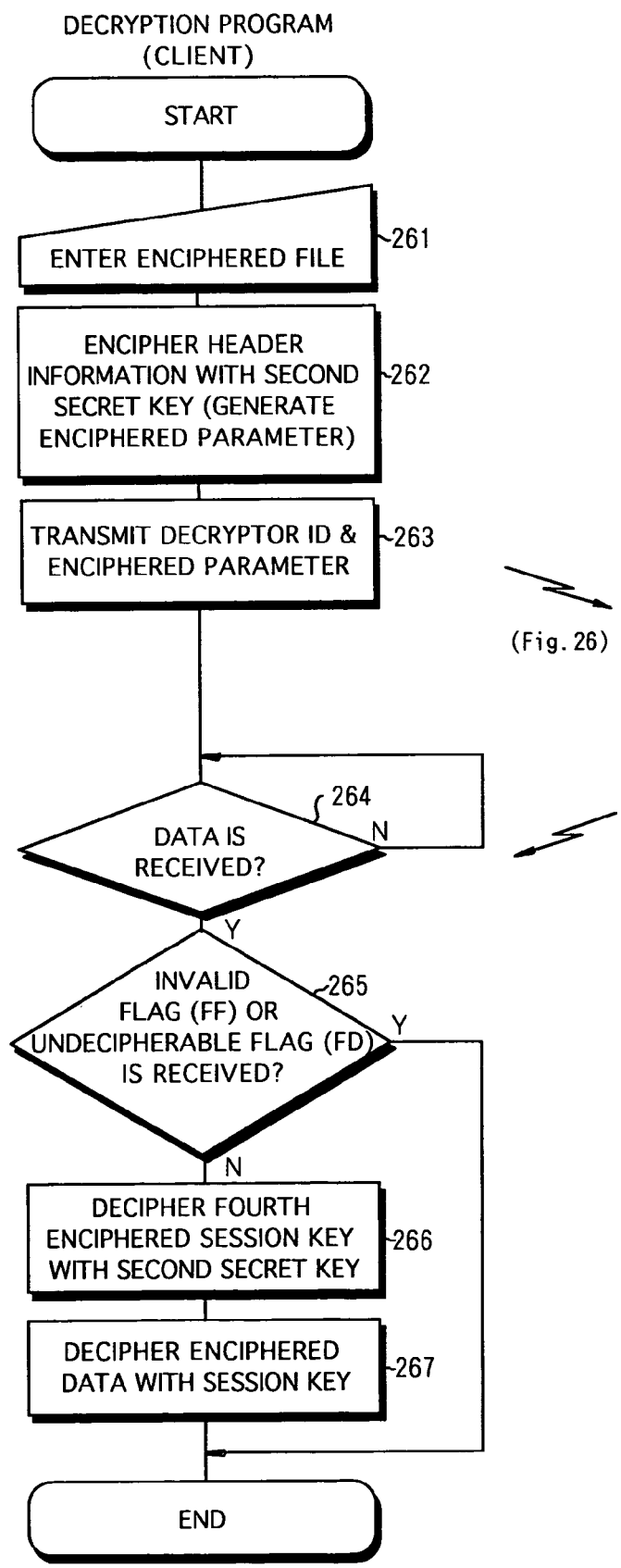
FIG. 25 is a flow chart showing the flow of processing based on a decryption program.
Figure 26:
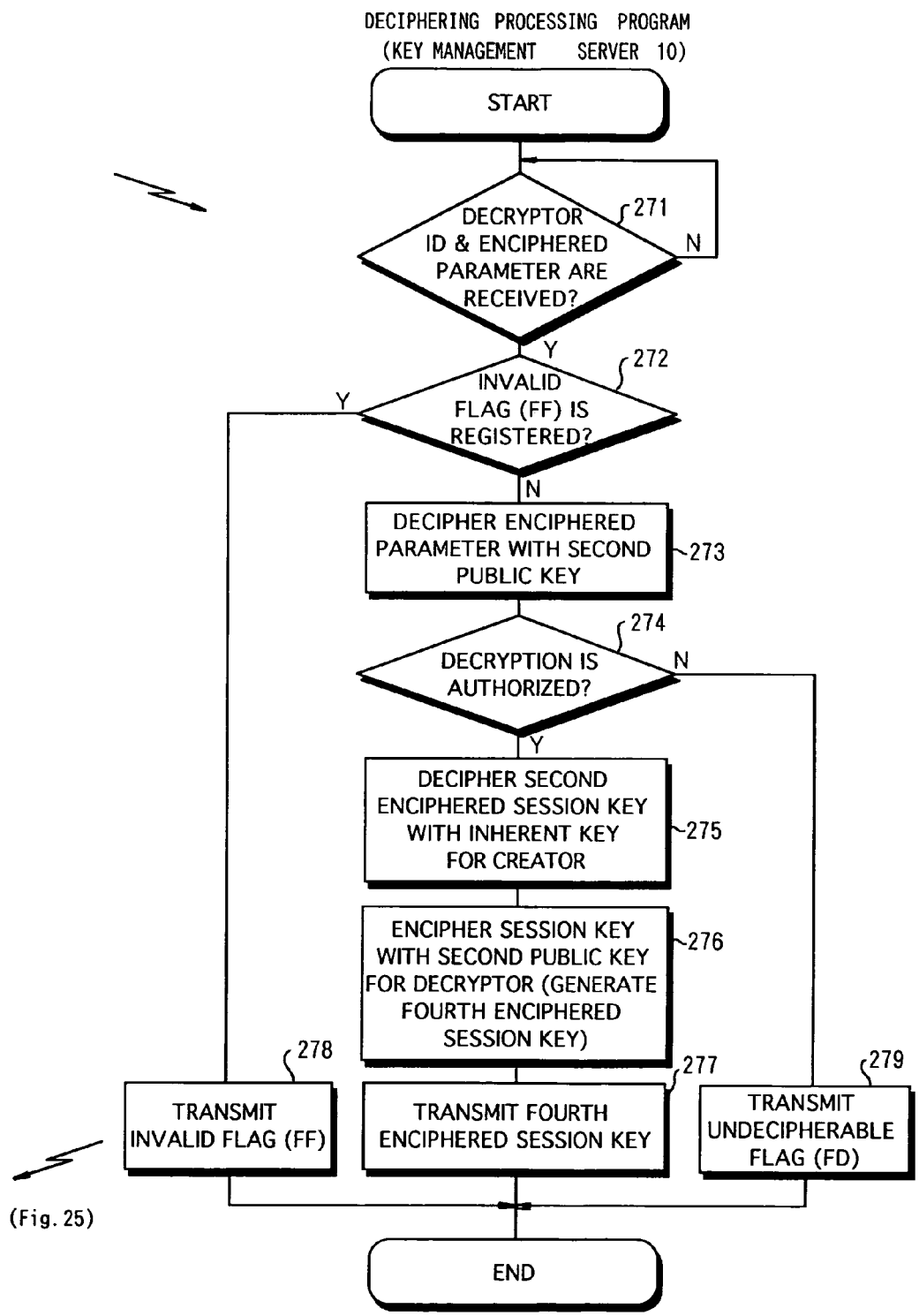
FIG. 26 is a flow chart showing the flow of processing based on a deciphering processing program.
Figure 27:
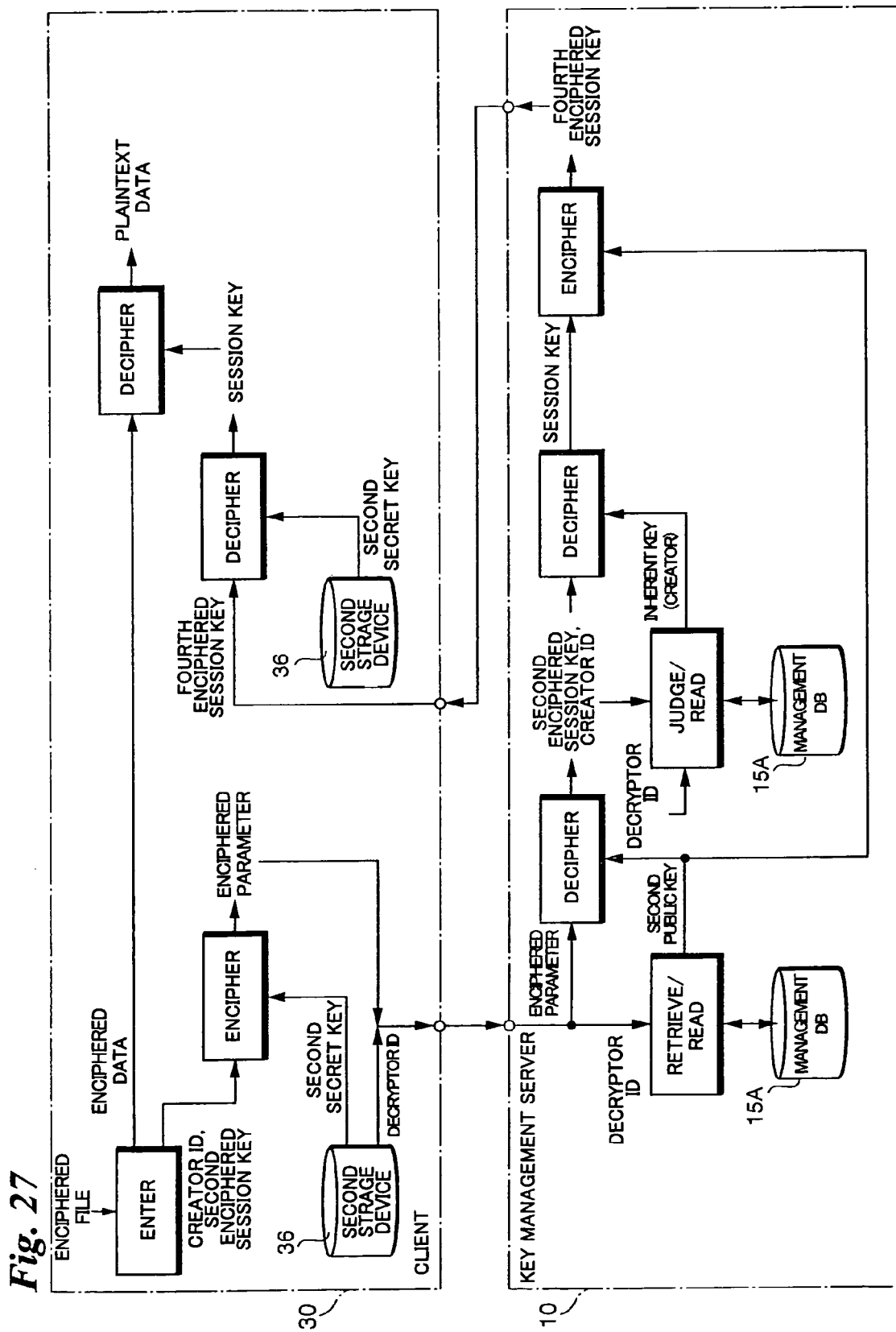
FIG. 27 is a block diagram showing enciphered file deciphering processing by giving attention to processing performed by a client and a key management server.
Figure 28:
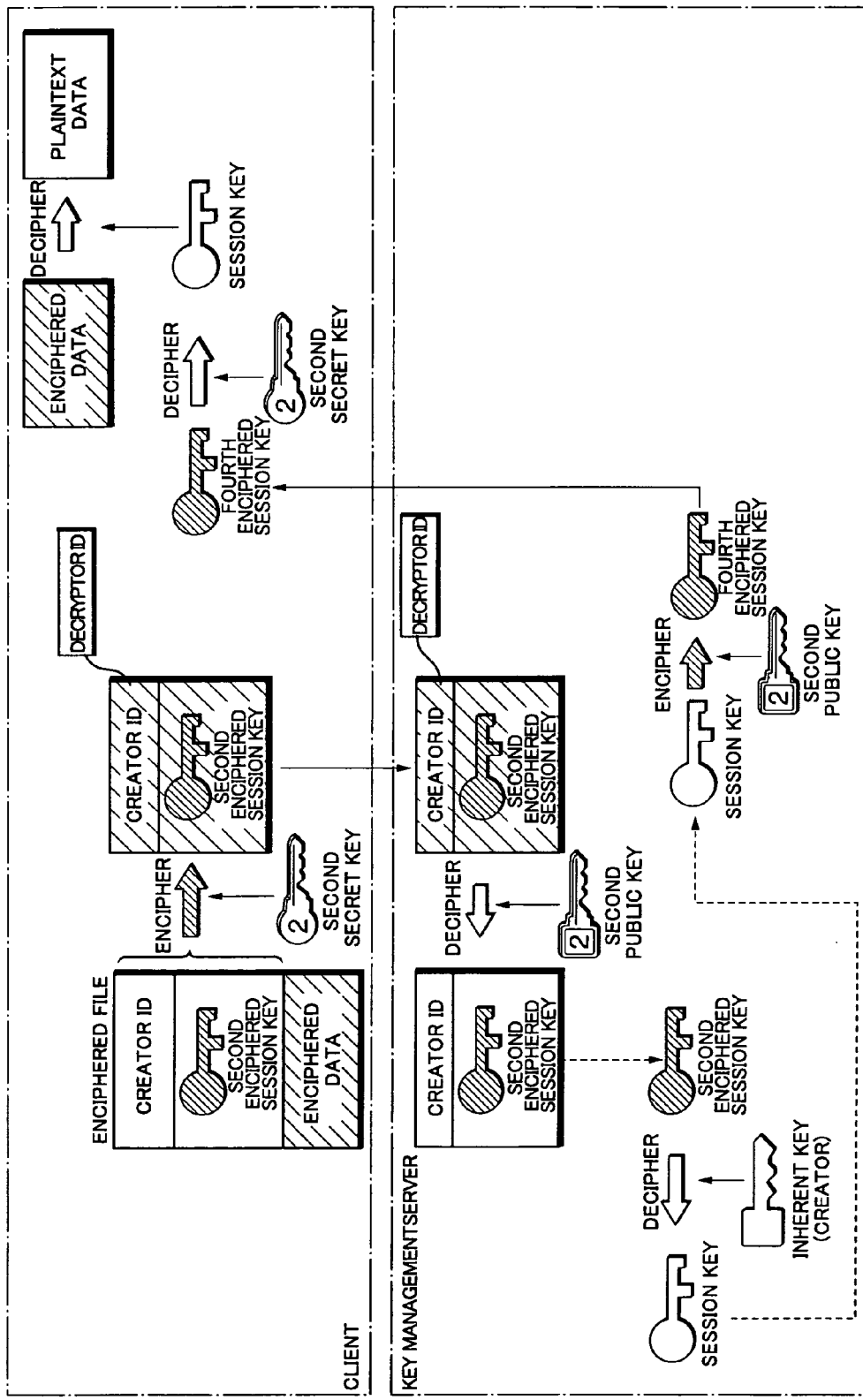
FIG. 28 illustrates enciphered file deciphering processing by giving attention to transmission/receiving of keys.

FIG. 25 is a flow chart showing the flow of the processing based on the decryption program stored in the first storage device in the client. FIG. 26 is a flow chart showing the flow of the processing based on the deciphering processing program executed in the key management server 10. FIG. 27 is a block diagram showing processing performed by the client 30 and the key management server 10 in enciphered file deciphering processing shown in FIGS. 25 and 26. FIG. 28 illustrates the enciphered file deciphering processing shown in FIGS. 25 and 26 by giving attention to the flow of keys.

When an instruction to start the decryption program is entered in the client, the decryption program is read out of the first storage device in the client and is read in the CPU. The decryption program is executed. The operations of the client 30 (a computer of a user B) will be taken as an example.

The user B (a decryptor) of the client 30 enters the enciphered file into the client 30 (step 261).

The enciphered file created in the cryptographic system according to the second embodiment has the header information (the creator ID and the second enciphered session key) added to the header of the enciphered data, as described above. The decryption program enciphers the header information (the creator ID and the second enciphered session key) included in the entered enciphered file with a second secret key S2-2 in the inherent data 35A stored in the second storage device 36 (step 262). The header information is enciphered. Hereinafter referred to as an "enciphered parameter" is one obtained by enciphering the header information in the enciphered file with the second secret key for the decryptor.

An ID "002" of the decryptor (the user B) (included in the inherent data 35A in the second storage device 36) and the above-mentioned enciphered parameter are transmitted to the key management server 10 from the client 30 (step 263).

In the key management server 10, the deciphering processing program waits for the receiving of the decryptor ID and the enciphered parameter (FIG. 26: step 271). When the key management server 10 receives the decryptor ID "002" and the enciphered parameter which have been transmitted from the client 30, the processing based on the deciphering processing program progresses (YES in step 271). Management data including the received decryptor ID "002" is read out of the management database 15A provided in the first storage device 12, and is temporarily stored in a memory in the key management server 10.

It is judged whether or not an invalid flag is stored in the management data temporarily stored in the memory (step 272). When the invalid flag "FF" is stored (YES in step 272), the key management server 10 transmits the invalid flag "FF" to the client 30 (step 278). In this case, processing for deciphering the enciphered file (enciphered data) is not performed (FIG. 25: YES in step 264, YES in step 265).

When the invalid flag is not stored in the management data temporarily stored in the memory (NO in step 272), the received enciphered parameter is deciphered with the second public key OP2-2 in the management data related to the decryptor. The enciphered parameter is obtained by enciphering the header information with the second secret key S2-2 in the inherent data (FIG. 25, step 262). When the enciphered parameter is deciphered, therefore, the header information (the creator ID and the second enciphered session key) is obtained (step 273).

It is judged whether or not the creator ID in the obtained header information is stored as a decryption object ID in the management data related to the decryptor stored in the memory (step 274).

When the same ID as the creator ID is not included as the decryption object ID in the management data, the decryptor is a person having no authorization to decipher the enciphered file created by a creator specified by the creator ID (there is no qualification for decryption: NO in step 274). In this case, an undecipherable flag "FD" is transmitted to the client 30 from the key management server 10 (step 279). In the client 30 which has received the undecipherable flag "FD", the processing based on the decryption program is terminated (YES in step 264, YES in step 265).

When the same ID as the creator ID is included as the decryption object ID in the management data, the decryptor is a person having authorization to decipher the enciphered file created by the creator specified by the creator ID (there is qualification for decryption: YES in step 274). In this case, the management data related to the creator specified by the creator ID is referred to, so that the second enciphered session key is deciphered with the inherent key in the management data (step 275). A session key is obtained.

The second public key in the management data related to the decryptor (the second public key OP2-2 in the case of the user having the ID "002") is used, to encipher the obtained session key again (step 276). A key obtained by enciphering the session key with the second public key for the decryptor in the key management server 10 is hereinafter referred to as a "fourth enciphered session key". The fourth enciphered session key is transmitted to the client 30 from the key management server 10 (step 277).

In the client 30 which has received the fourth enciphered session key (FIG. 25: YES in step 264, NO in step 265), the second secret key S2-2 in the inherent data 35A is used, to decipher the fourth enciphered session key (step 266). A session key is obtained.

Finally, the obtained session key is used, to decipher the enciphered data in the enciphered file (step 267). Plaintext data is obtained.

According to the second embodiment, the public key/secret key (the second public key/second secret key) is generated in each of the clients 20, 30 . . . , and the public key/secret key (the first public key/first secret key) is also generated in the key management server 10. The second public key in the second public key/second secret key generated in each of the clients 20, 30 . . . is enciphered with the first public key distributed from the key management server 10, is transmitted to the key management server 10 from each of the clients 20, 30 . . . , and is registered in the management data. Therefore, the secrecy of the second public key is high.

Furthermore, in the second embodiment, the inherent key in the management data is not transmitted and received through the network 1. Therefore, the secrecy of the inherent key is significantly high.

Also in the second embodiment, it is judged whether or not the decryptor is a person having authorization to decipher the enciphered data depending on whether or not the creator ID in the header information is stored as the decryption object ID in the management data related to the decryptor, thereby making it possible to perform authorization management corresponding to an organization structure in a company or the like.

MODIFIED EMBODIMENT

Figure 29:
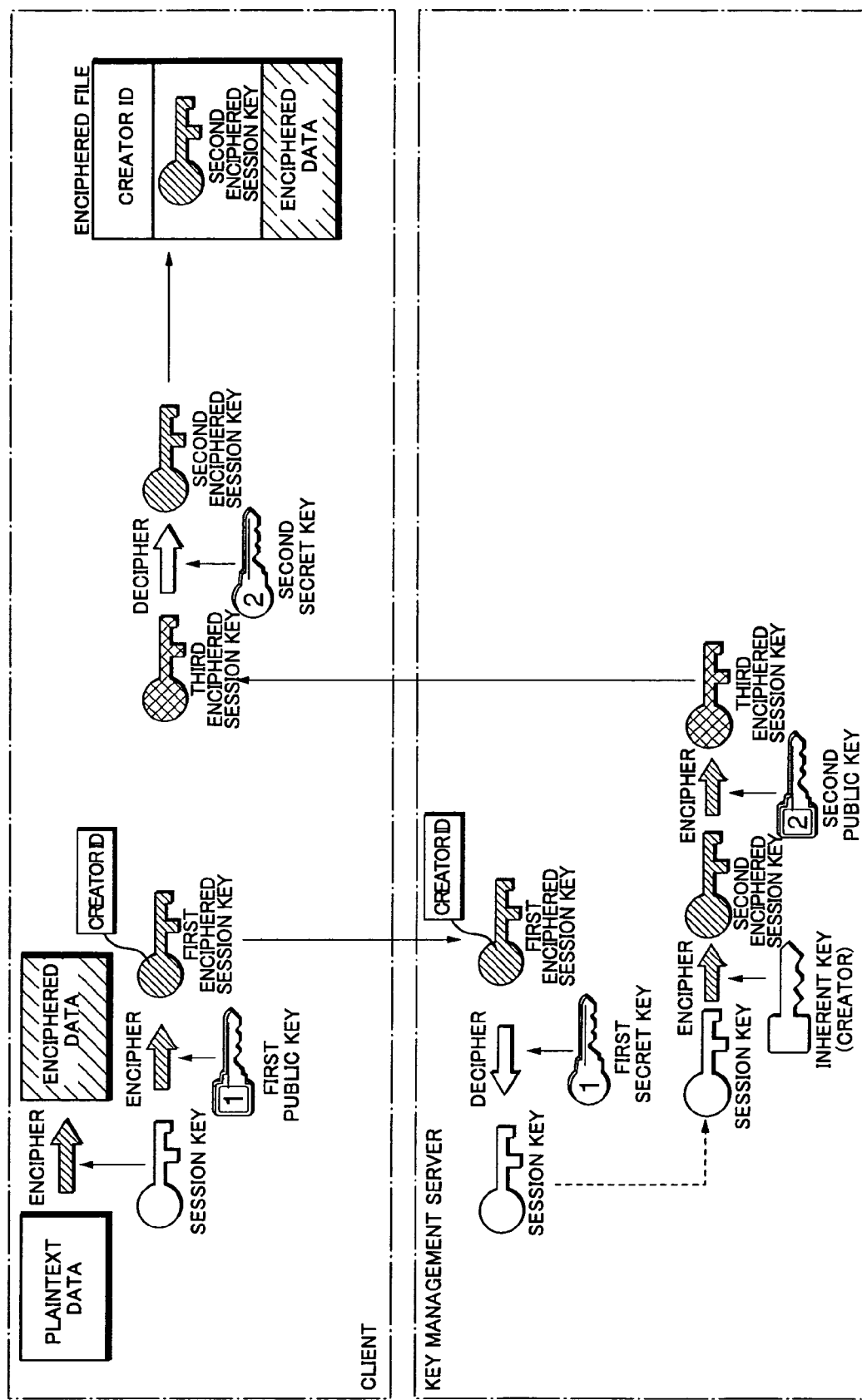
FIG. 29 illustrates enciphered file creating processing in a modified example of the second embodiment by giving attention to transmission/receiving of keys.

In processing for creating the enciphered file, the first public key may be used in place of the second secret key as the key used for enciphering the session key in the client (the processing in the step 243 shown in FIG. 21). FIG. 29 shows the flow of transmission and receiving of keys in a case where the first public key is used for enciphering the session key (generation of the first enciphered session key). In this case, for first enciphered session key deciphering processing in the key management server 10 (FIG. 22: step 253), not the second public key but the first secret key stored in the first storage device 12 in the key management server 10 is used.

THIRD EMBODIMENT

Figure 30:
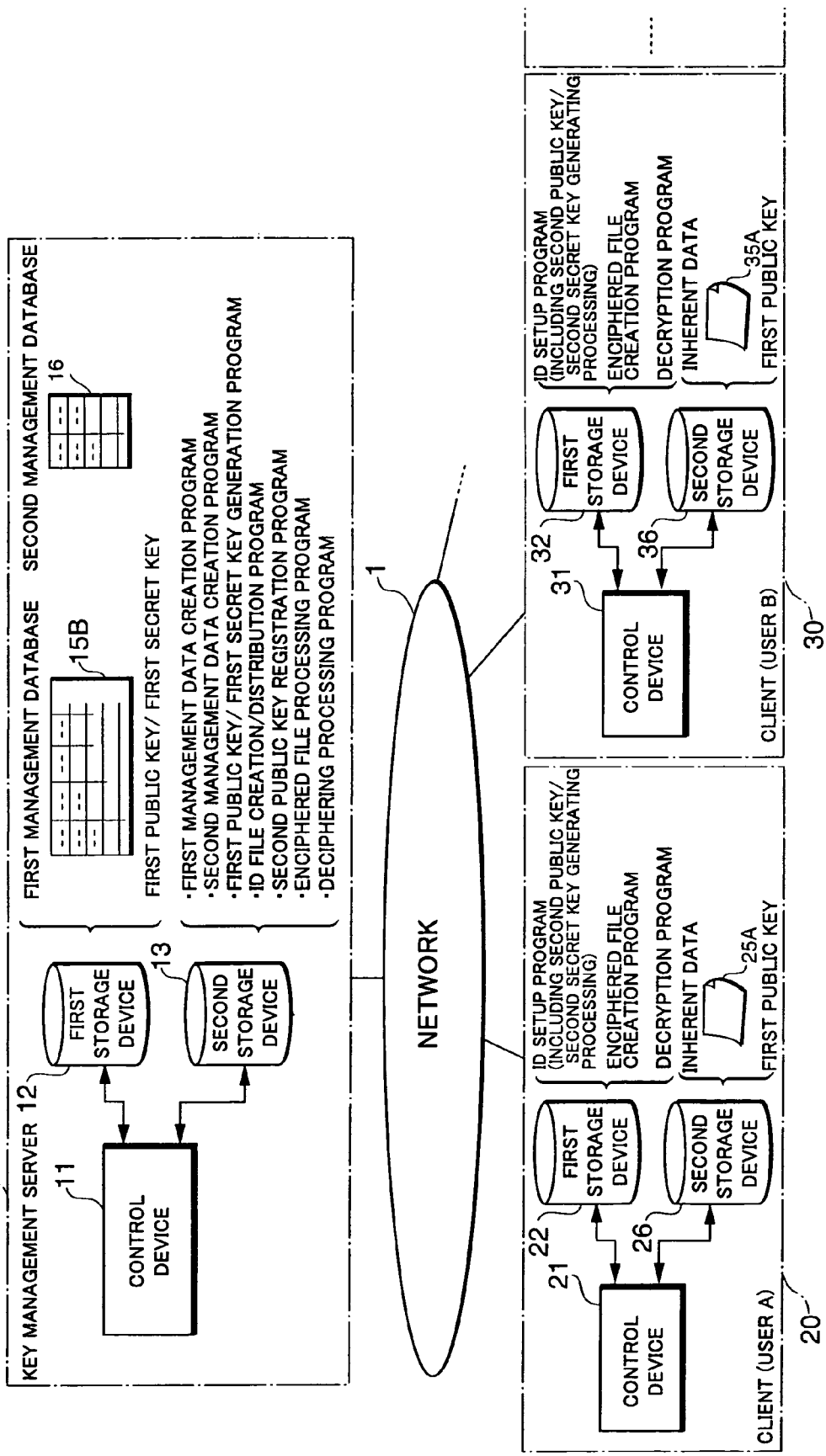
FIG. 30 illustrates the overall configuration of a cryptographic system according to a third embodiment.

FIG. 30 is a block diagram showing the overall configuration of a cryptographic system according to a third embodiment. The cryptographic system according to the third embodiment differs from the cryptographic system according to the second embodiment shown in FIG. 15 in the contents of data (a database) stored in a first storage device 12 in a key management server 10, the contents of a program stored in a second storage device 13 in the key management server 10, and processing based on programs stored in a first storage device 22 in each of clients 20, 30 . . . .

In the cryptographic system according to the third embodiment, a concept "group" is adopted. Users of the cryptographic system can belong to one or a plurality of groups. of course, the users who do not belong to any of the groups may, in some cases, exist. The cryptographic system according to the third embodiment is characterized in that the key management server 10 and the clients 20, 30 . . . are controlled such that the particular user can decipher enciphered data generated by the other user who utilizes the cryptographic system, and the key management server 10 and the clients 20, 30 . . . are controlled such that the other user belonging to the same group as the group to which the user who has generated the enciphered data belongs can decipher the enciphered data.

Each of second storage devices 26, 36 . . . in the clients 20, 30 . . . stores an ID and a second secret key (inherent data), and a first public key, as in the second embodiment (see FIG. 16a and FIG. 16b). The ID and the second secret key differ for each of the clients 20, 30. . . . The first public key (a first public key OP1) is common to all the clients 20, 30. . . .

FIG. 31 illustrates the contents of the first storage device 12 in the key management server 10. The first storage device 12 in the key management server 10 stores a first management database 15B, a pair of a first public key and a first secret key, and a second management database 16. The first management database 15B differs from the management database 15A in the second embodiment (FIG. 17) in that a registration group 1, a registration group 2, a registration group 3 . . . are added.

Each of the "registration group 1", the "registration group 2", the "registration group 3" . . . stores a group ID for identifying a group to which a user of the cryptographic system belongs. For example, three group IDs "G1", "G2", "G3" are registered in management data related to a user having an ID "001" (a user A). This means that the user having the ID "001" (the user A) belongs to groups (a group "G1", a group "G2", and a group "G3") respectively specified by the group IDs G1, G2, and G3. Similarly, the group ID "G2" is registered in management data related to a user having an ID "002" (a user B). It is found that the user having the ID "002" (the user B) belongs to the group "G2".

The second management database 16 includes a "group ID" and a "group key" (second management data).

The "group ID" is for identifying a group, as described above, and is an identification code having a one-to-one correspondence with the group.

The "group key" is random number data given for each of the groups. The group key is used for enciphering a session key and deciphering the enciphered session key, as described later.

Figure 32:
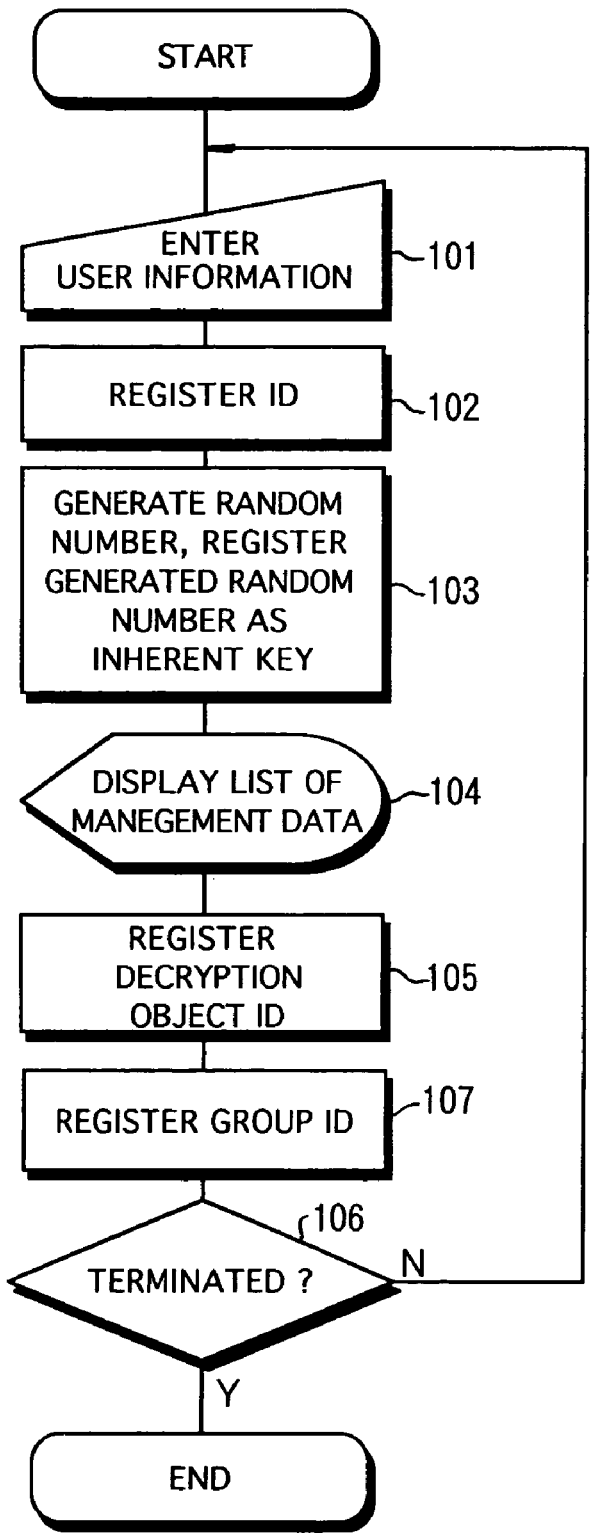
FIG. 32 is a flow chart showing the flow of processing based on a first management data creation program.

FIG. 32 is a flow chart showing the flow of processing based on a first management data creation program stored in the second storage device 13 in the key management server 10. The same processing (steps) as that based on the management data creation program in the first embodiment (FIG. 5) is assigned the same reference numeral and hence, the overlapped description is omitted.

In the processing based on the first management data creation program, the group ID is registered (step 107) in addition to the registration of a decryption object ID (step 105) (which is the same as that in the first embodiment). A manager of the key management server 10 registers the group ID for specifying the group to which the user belongs in a group ID column in management data. Of course, the step 107 is skipped if the user does not belong to any of the groups.

Figure 33:
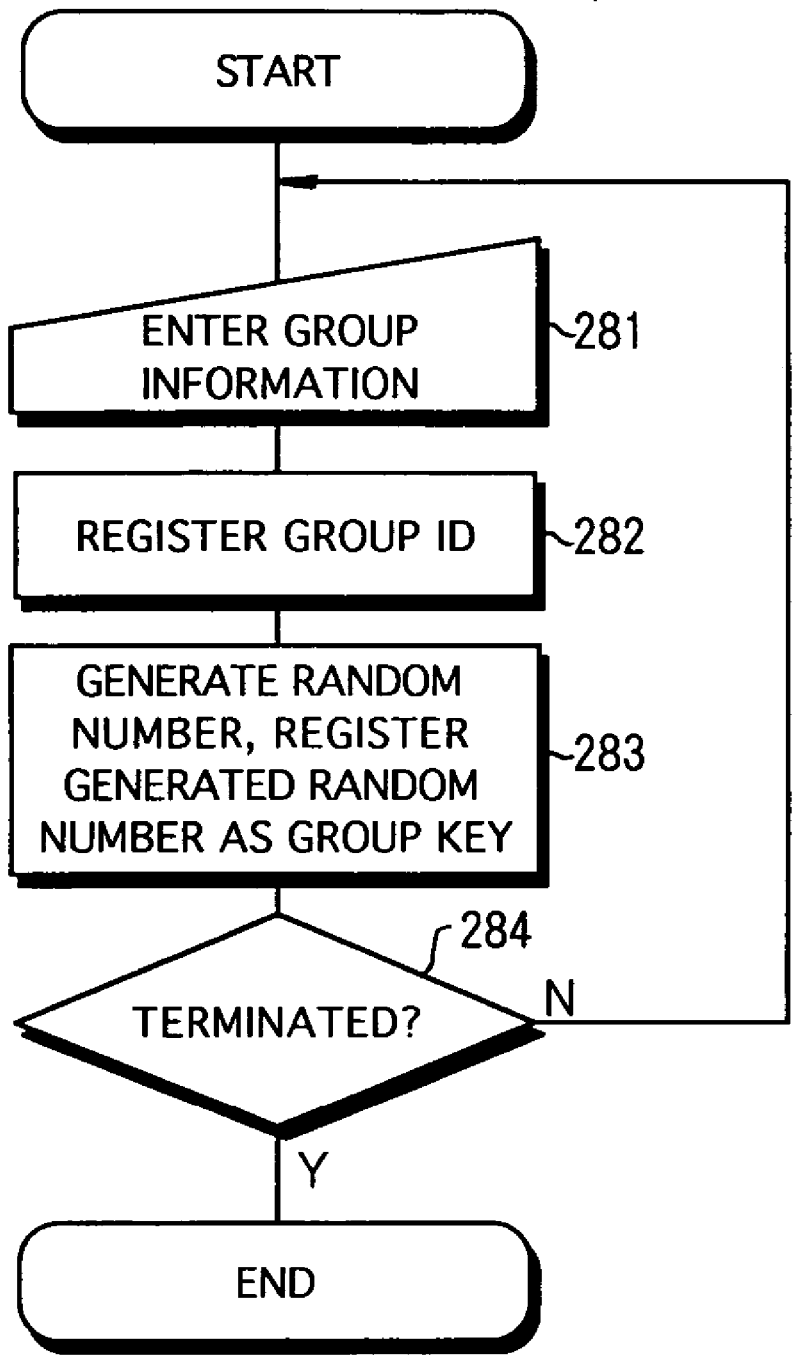
FIG. 33 is a flow chart showing the flow of processing based on a second management data creation program.

FIG. 33 is a flow chart showing the flow of processing based on a second management data creation program stored in the second storage device 13 in the key management server 10. When the manager of the key management server 10 enters an instruction to start the second management data creation program from an input device, the second management data creation program is read out of the second storage device 13 in the key management server 10, and is read in a CPU. The second management data creation program is executed.

The manager of the key management server 10 enters the name or the like (group information) of a group (a department, a section, a team, etc.) provided in an organization or the like to which the user who utilizes the cryptographic system belongs from the input device in the key management server 10 (step 281). When the entry of the group information is completed, an ID is assigned to the group. The assigned group ID is registered in a group ID column in the second management database 16 (step 282).

A random number is generated. The generated random number is registered in a group key column as a group key corresponding to the registered group ID (step 283). When group IDs and group keys related to a plurality of groups are registered, the above-mentioned processing is repeated (NO in step 284, step 281). When the entry of data related to all the groups is terminated, the second management database 16 is completed (YES in step 284).

Figure 34:
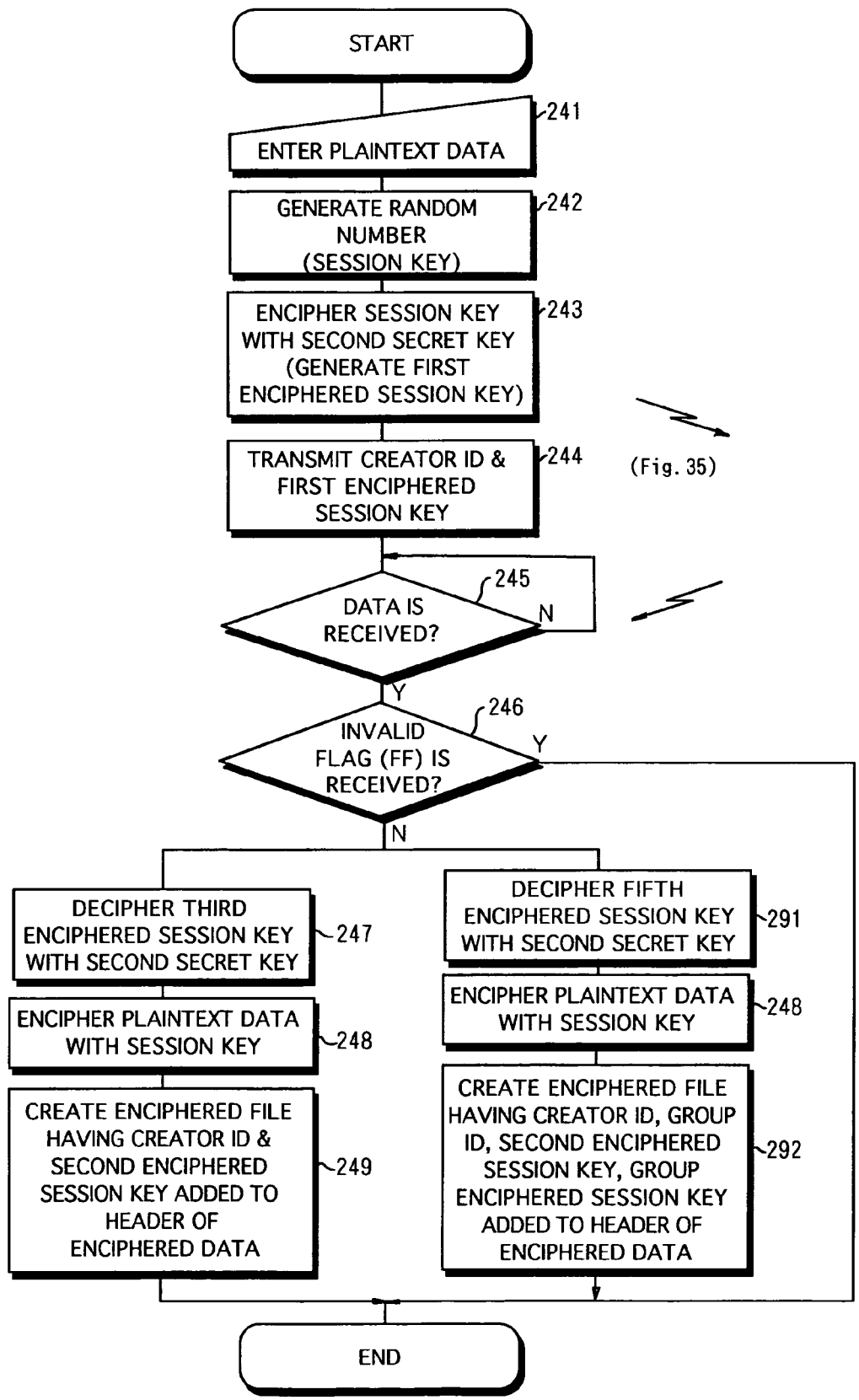
FIG. 34 is a flow chart showing the flow of processing based on an enciphered file creation program.
Figure 35:
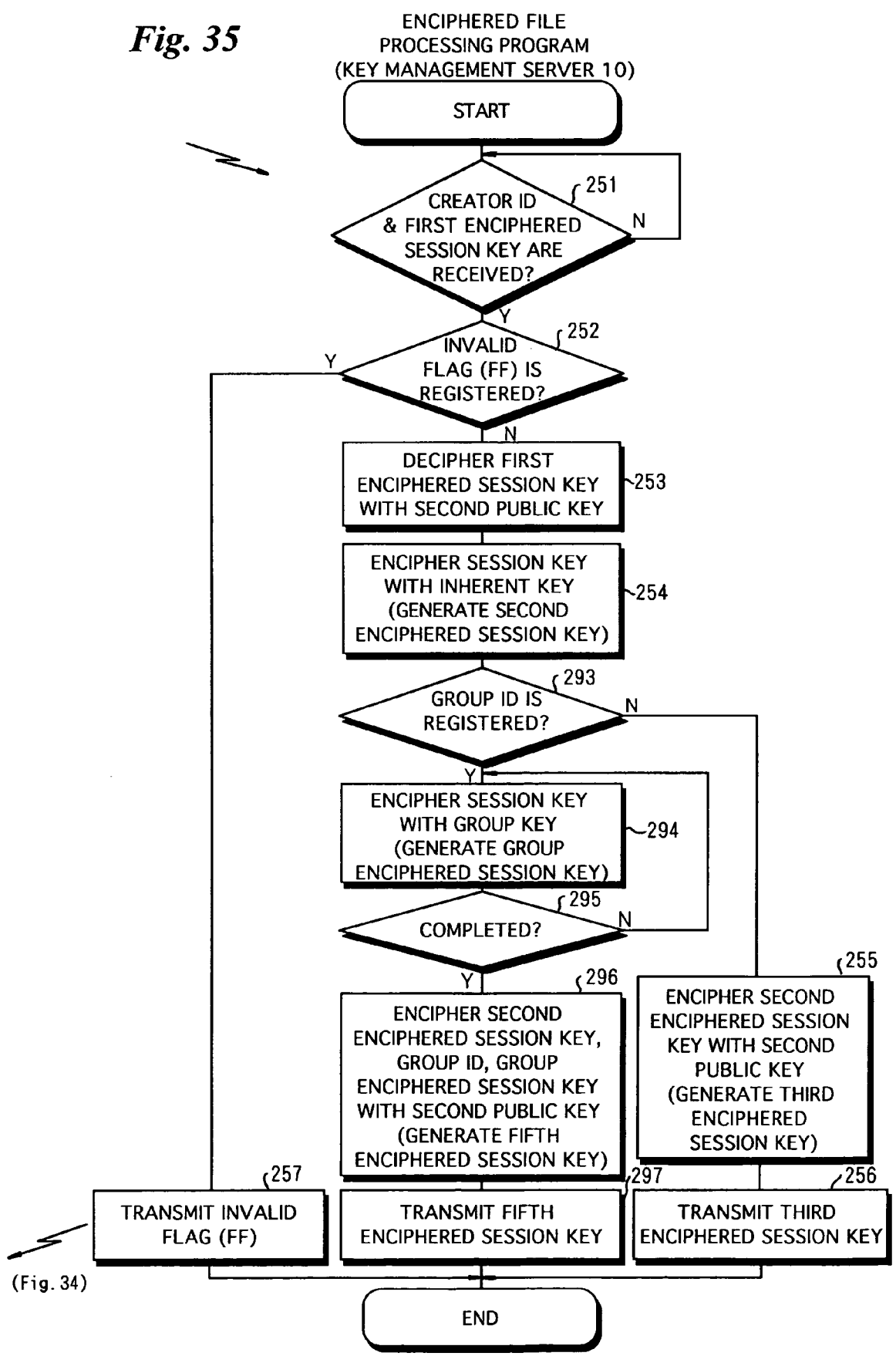
FIG. 35 is a flow chart showing the flow of processing based on an enciphered file processing program.
Figure 36:
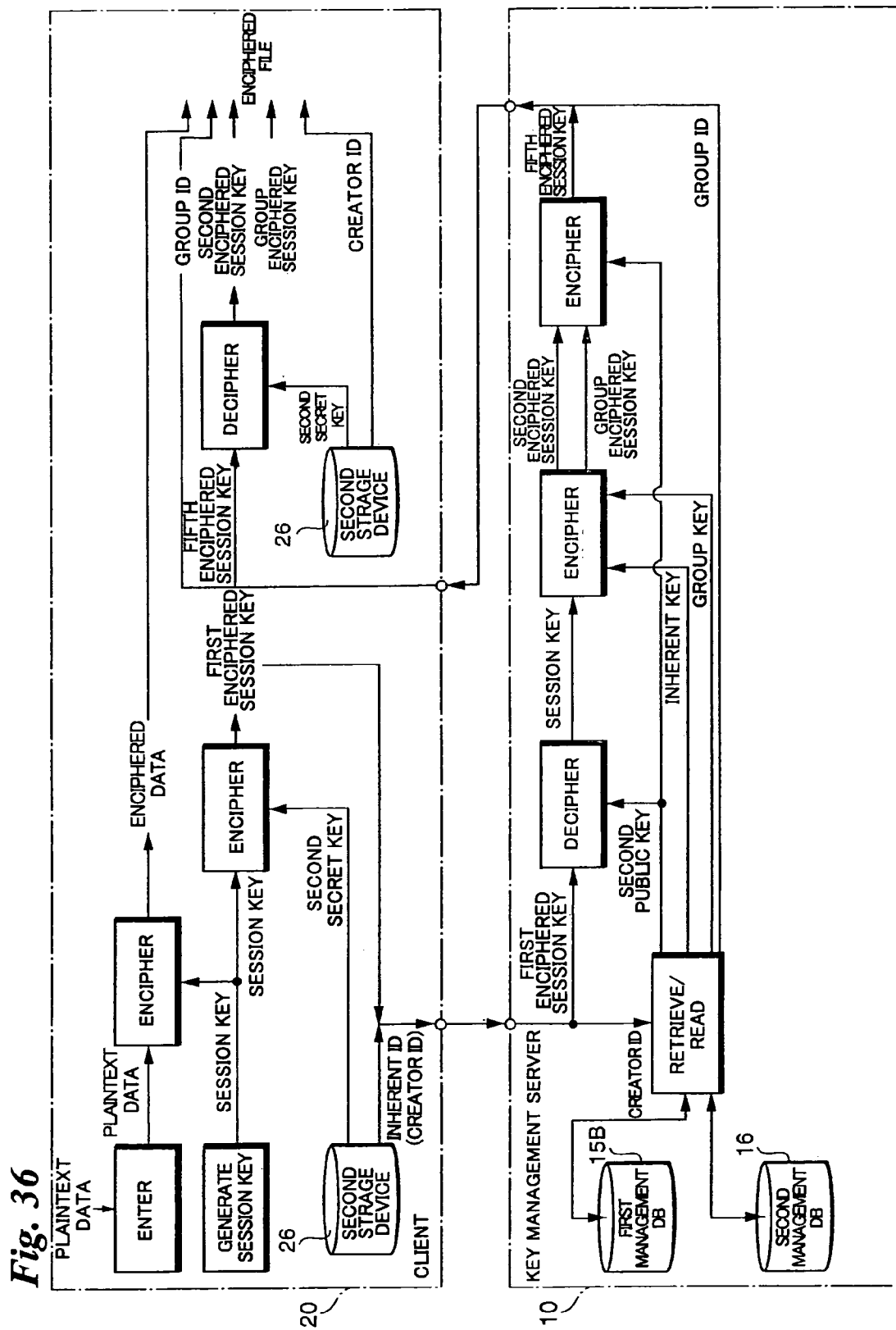
FIG. 36 is a block diagram showing enciphered file creating processing by giving attention to processing performed by a client and a key management server.
Figure 37:
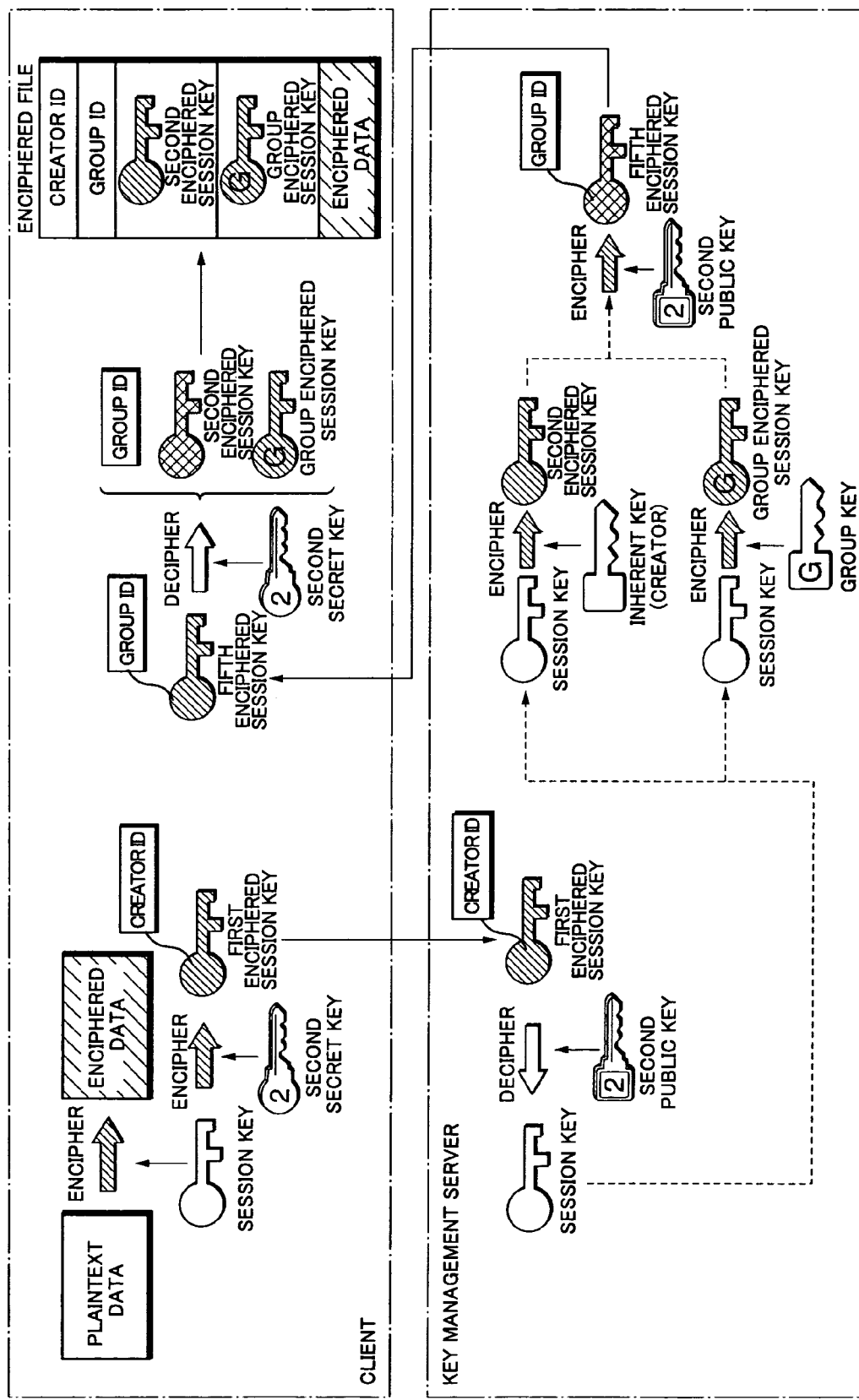
FIG. 37 illustrates enciphered file creating processing by giving attention to transmission/receiving of keys.

FIG. 34 is a flow chart showing the flow of processing based on an enciphered file creation program stored in the first storage device in the client. FIG. 35 is a flow chart showing the flow of processing based on an enciphered file processing program executed in the key management server 10 in response to the execution of the enciphered file creation program in the client. FIG. 36 shows by a block diagram processing performed by the client 20 and the key management server 10 in enciphered file creating processing shown in FIGS. 34 and 35 in a case where processing using the group key is performed. FIG. 37 illustrates the enciphered file creating processing shown in FIGS. 34 and 35 in a case where the processing using the group key is performed by giving attention to the flow of keys. The processing based on the enciphered file creation program shown in FIG. 34 includes the same processing as that in the flow chart shown in FIG. 21 in the second embodiment and hence, the same processing steps are assigned the same reference numerals, to avoid the overlapped detailed description. The processing based on the enciphered file processing program shown in FIG. 35 includes the same processing as that in the flow chart shown in FIG. 22 in the second embodiment and hence, the same processing steps are assigned the same reference numerals, to avoid the overlapped description. Operations performed by the client 20 (a computer of the user A) will be taken as an example.

An ID "001" in inherent data 25A in the client 20 (an ID of a user who will create an enciphered file: a creator ID) and a first enciphered session key obtained by enciphering a session key with a second secret key S2-1 are transmitted to the key management server 10 from the client 20 (FIG. 34: step 244). In the key management server 10, the first enciphered session key is deciphered with a second public key OP2-1 in management data related to the creator (the user A) on the basis of the received creator ID (step 253), and the obtained session key is enciphered with an inherent key SK1 in the management data. A second enciphered session key is obtained (step 254).

It is judged whether or not a group ID is registered in a group ID registration column in the management data related to the user who will create the enciphered file (step 293).

When the group ID is not registered in the group ID registration column (NO in step 293, for example, a user having an ID "004"), the same processing as that in the second embodiment is performed. That is, a third enciphered session key obtained by enciphering the second enciphered session key with the second public key is transmitted to the client 20 from the key management server 10 (steps 255 and 256). Thereafter, in the client, the third enciphered session key is deciphered with the second secret key, plaintext data is enciphered with the session key, and an enciphered file having the creator ID and the second enciphered session key added thereto as header information in enciphered data is created (FIG. 34: steps 245 to 249).

When the group ID is registered in the group ID registration column (YES in step 293), the second management database 16 is referred to, and a group key corresponding to the group ID is used, to encipher the session key (step 294). A key obtained by enciphering the session key with the group key in the key management server 10 is hereinafter referred to as a "group enciphered session key". In the key management server 10, a second enciphered session key and a group enciphered session key are generated.

When the plurality of group IDs are registered in the group ID registration column, the group key corresponding to each of the group IDs is used, so that the same number of group enciphered session keys as the number of registered group IDs are generated (NO in step 295, step 294).

When the generation of the group enciphered session key is terminated (YES in step 295), the second public key OP2-1 is used, to encipher the group ID, the second enciphered session key, and the group enciphered session key (hereinafter referred to as a fifth enciphered session key) (step 296). The generated fifth enciphered session key is transmitted to the client 20 from the key management server 10 (step 297).

In the client 20 which has received the fifth enciphered session key, the second secret key S2-1 in the inherent data 25A is used, to decipher the fifth enciphered session key (step 291). A group ID, a second enciphered session key, and a group enciphered session key are obtained.

The session key is used so that the enciphered data is created from the plaintext data (step 248). An enciphered file including the creator ID, the group ID, the second enciphered session key, and the group enciphered session key is created as header information in the created enciphered data (step 292, see FIG. 37).

Figure 38:
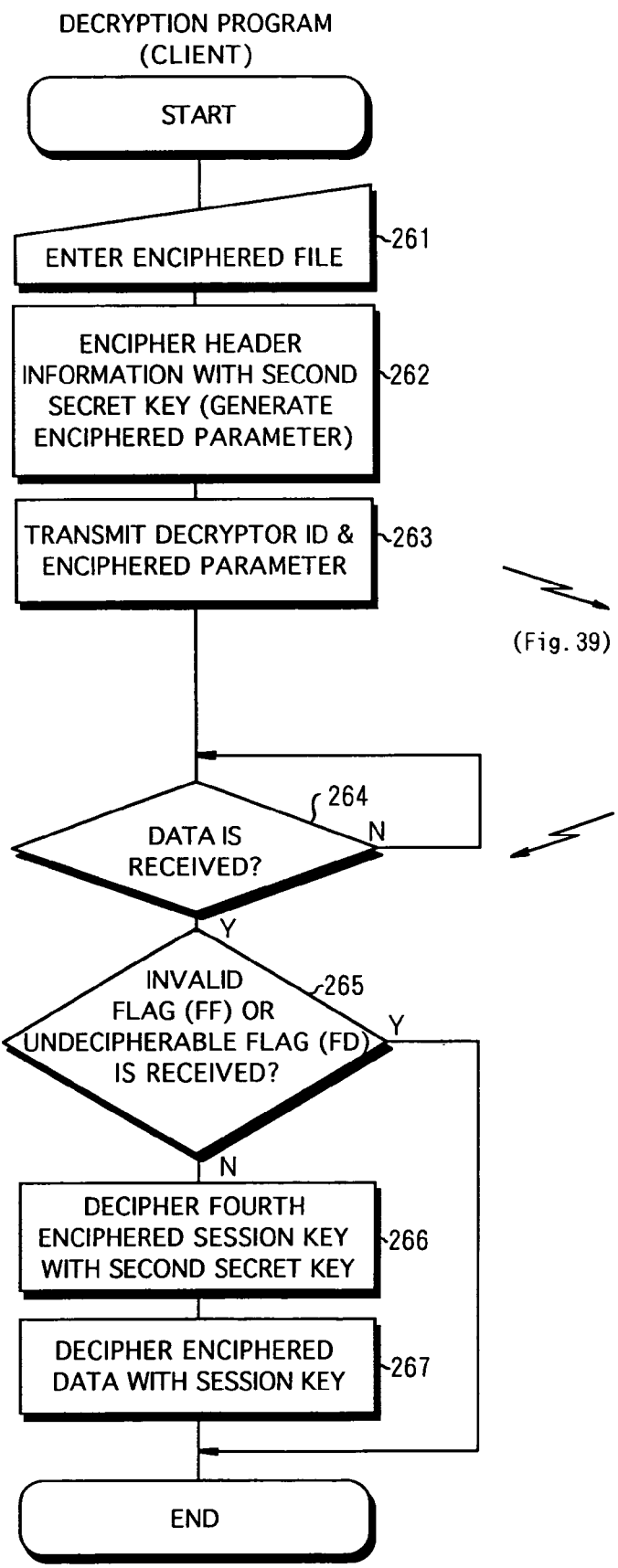
FIG. 38 is a flow chart showing the flow of processing based on a decryption program.
Figure 39:
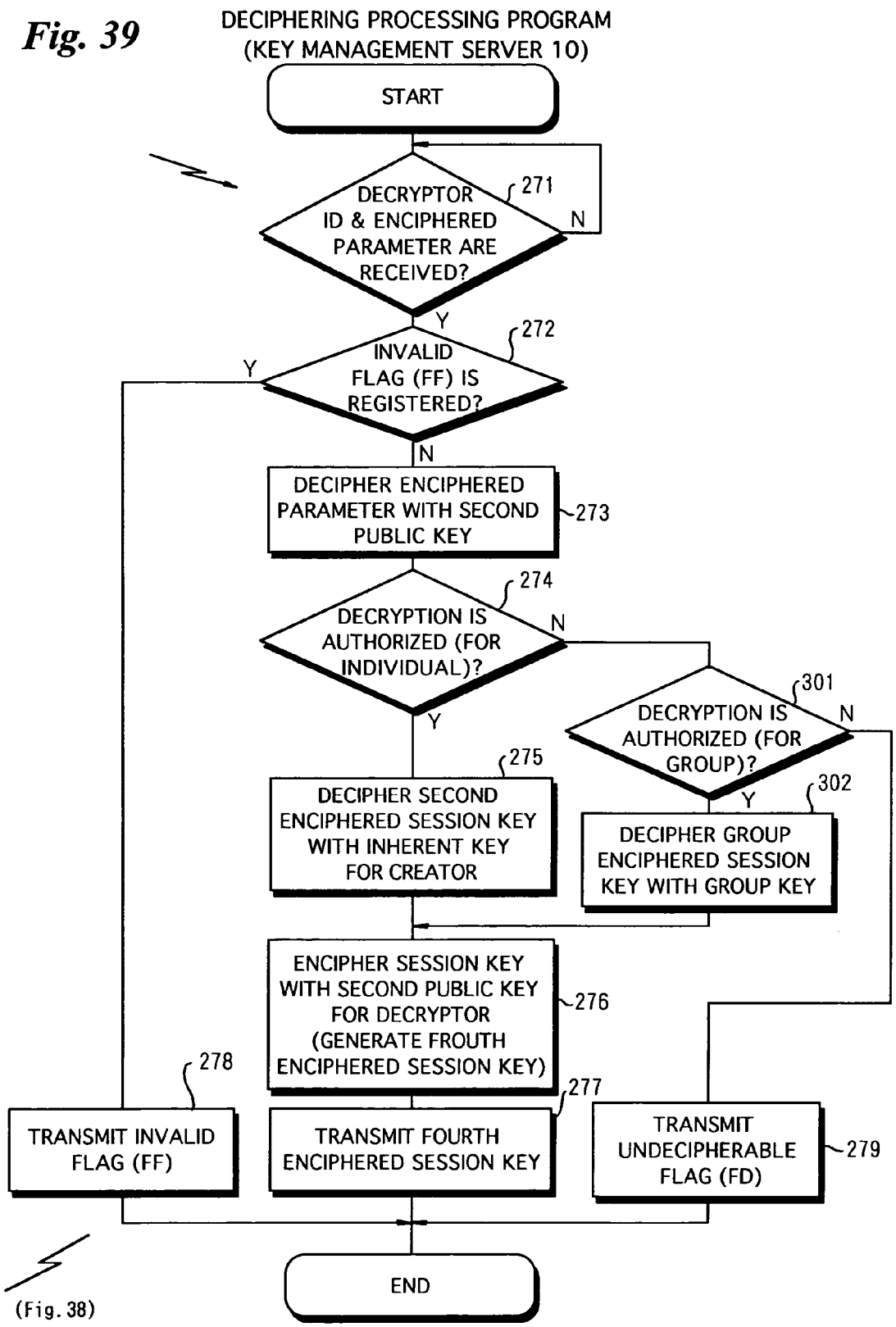
FIG. 39 is a flow chart showing the flow of processing based on a deciphering processing program.
Figure 40:
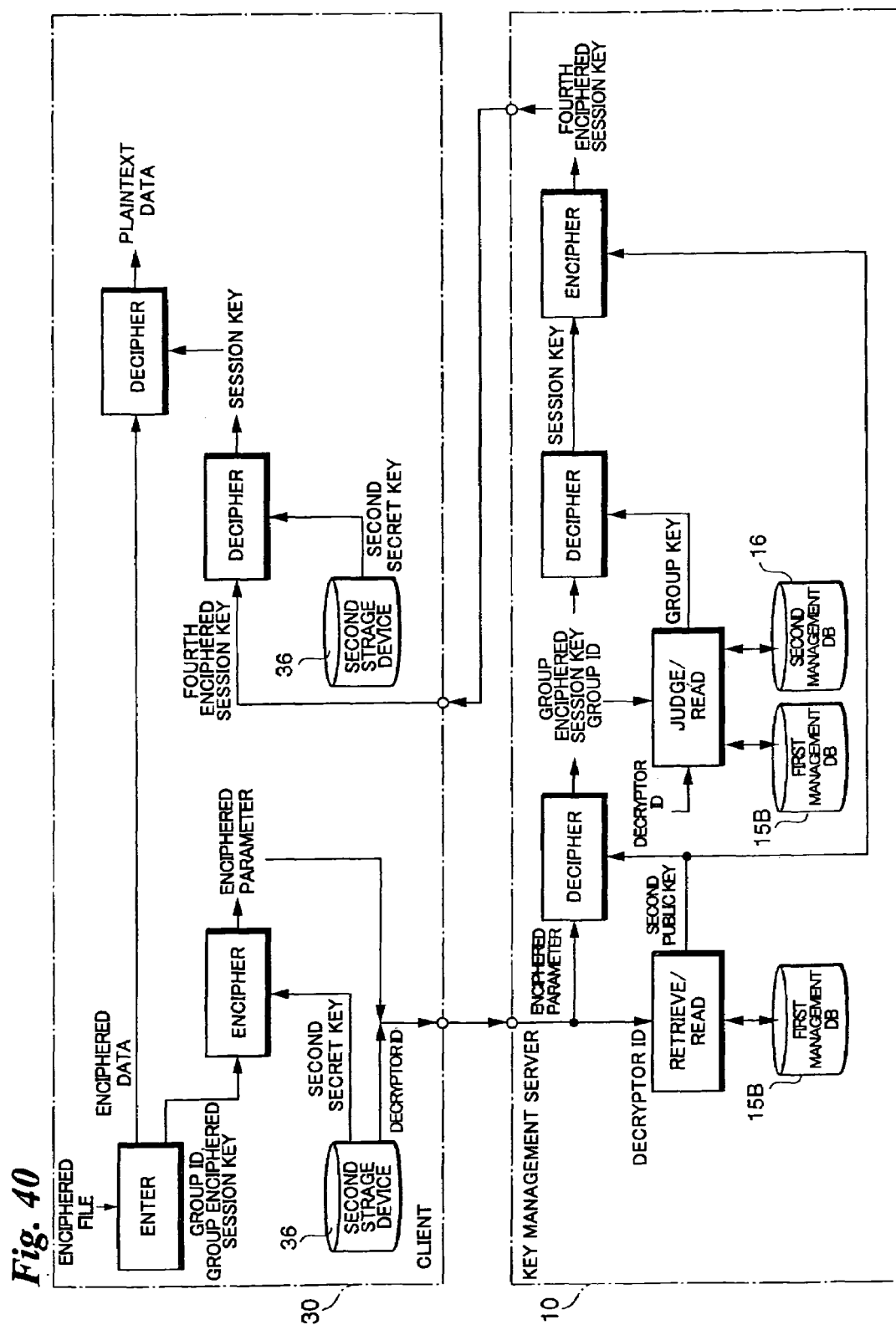
FIG. 40 is a block diagram showing enciphered file deciphering processing by giving attention to processing performed by a client and a key management server.
Figure 41:
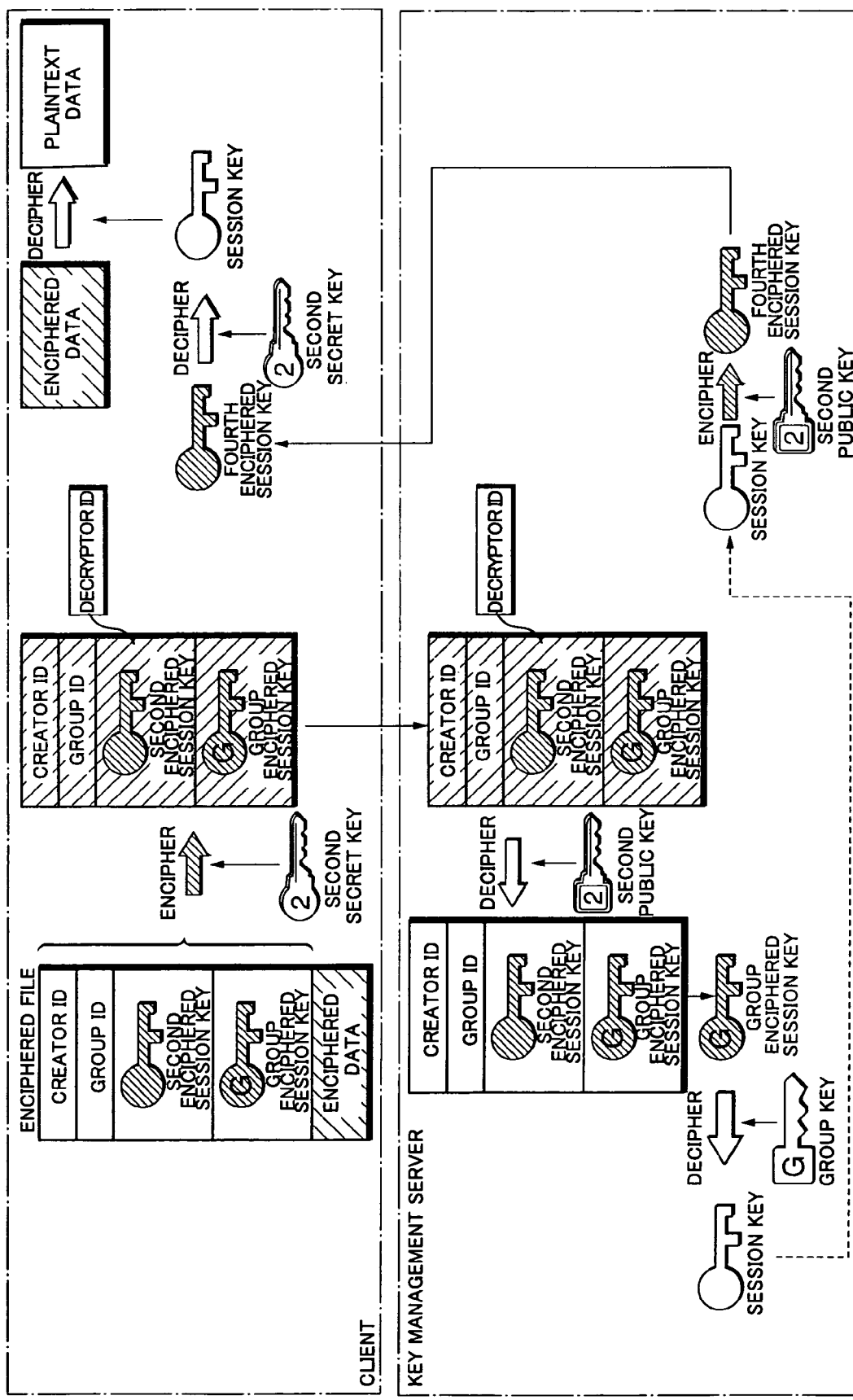
FIG. 41 illustrates enciphered file deciphering processing by giving attention to transmission/receiving of keys.

FIG. 38 is a flow chart showing the flow of processing based on a decryption program stored in the first storage device in the client. FIG. 39 is a flow chart showing the flow of processing based on a deciphering processing program executed in the key management server 10. FIG. 40 shows by a block diagram processing performed by the client 30 and the key management server 10 in processing for deciphering the enciphered file including the group enciphered session key. FIG. 41 illustrates the processing for deciphering the enciphered file including the group enciphered session key by giving attention to transmission/receiving of keys. Although the processing based on the decryption program shown in FIG. 38 is the same as that in the flow chart shown in FIG. 25 in the second embodiment, it is inserted again in order to make the description easy to understand. The processing based on the deciphering processing program shown in FIG. 39 includes the same processing as that in the flow chart shown in FIG. 26 in the second embodiment and hence, the same processing steps are assigned the same reference numerals, to avoid the overlapped description. When the group ID and the group enciphered session key are not included in the header information in the enciphered file to be deciphered, the same processing as that in the second embodiment is performed. Therefore, description is herein made of the processing for deciphering the enciphered file including the group ID and the group enciphered session key in the header information.

When the group ID is registered in the management data related to the creator of the enciphered file, as described above, the header information in the enciphered file, together with the creator ID and the second enciphered session key, includes the group ID and the group enciphered session key (FIG. 34: step 292). When a decryptor (which is taken as the user B) enters an enciphered file to be deciphered (step 261), the decryption program enciphers the header information in the entered enciphered file with a second secret key S2-2 in inherent data 35B stored in the second storage device 36 (generation of an enciphered parameter) in the client 30 (step 262). The generated enciphered parameter and an ID of the decryptor (the ID "002" of the user B) in the inherent data 35B are transmitted to the key management server 10 from the client 30 (step 263).

In the key management server 10, the received enciphered parameter is deciphered with a second public key (a second public key OP2-2 in the case of the user B having the ID "002") in management data related to the decryptor. A creator ID, a second enciphered session key, a group ID, and a group enciphered session key are obtained (step 273).

It is judged whether or not the obtained creator ID is registered as a decryption object ID in the management data related to the decryptor (step 274). If the same ID as the creator ID is registered as the decryption object ID in the management data, enciphered data included in an enciphered file is deciphered in the client 30 by the same processing as that in the second embodiment (YES in step 274, steps 275 to 277, FIG. 38: steps 264 to 267).

When the obtained creator ID is not registered as the decryption object ID in the management data related to the decryptor (NO in step 274), it is then judged whether or not the obtained group ID is registered in the management data related to the decryptor (step 301). That is, it is judged whether or not the decryptor belongs to the group to which the creator of the enciphered file to be deciphered belongs.

In a case where the decryptor belongs to the same group as that to which the creator of the enciphered file belongs (a case where the obtained group ID is registered in the management data related to the decryptor), the second management database 16 is referred to, so that a group key corresponding to the group ID is read out. The read group key is used, to decipher the group enciphered session key (step 302). A session key is obtained.

Processing performed after the session key is obtained is the same as that in the second embodiment. That is, the obtained session key is enciphered with the second public key OP2-2 for the decryptor (generation of a fourth enciphered session key) (step 276), and the fourth enciphered session key is transmitted to the client 30 from the key management server 10 (step 277). In the client 30 which has received the fourth enciphered session key, the fourth enciphered session key is deciphered with the second secret key S2-2 (step 266), and the enciphered data included in the enciphered file is deciphered with the obtained session key (step 267).

In a case where the obtained creator ID is not registered as the decryption object ID in the management data, and the obtained group ID is not also registered in the management data, an undecipherable flag (FD) is transmitted to the client from the key management server 10 (step 279).

In the third embodiment, authorization to decipher the enciphered file is thus further given to the other user belonging to the same group as the group to which the user who has created the enciphered file belongs. For example, in a case where the decryption authorization is given to users belonging to the same section, the same department, and so on in a company or the like, authorization processing using the group ID can be made use of.

Although in the above-mentioned embodiment (the third embodiment), the decryption object ID and the group ID can be registered in the management data, it goes without saying that only the group ID may be registered. In this case, only when the decryptor belongs to the same group as the creator of the enciphered file, the decryptor is authorized to decipher the enciphered file.

FOURTH EMBODIMENT

Authorization to decipher an enciphered file may be given to a user designated and/or a group designated when a creator of the enciphered file creates the enciphered file in addition to a user who specified a decryption object ID and a user belonging to the same group as that to which the creator of the enciphered file belong. A cryptographic system according to a fourth embodiment is characterized in that a key management server 10 and clients 20, 30 . . . are controlled such that authorization to decipher an enciphered file created by a creator is also given to a user designated by the creator of the enciphered file (a designated decryptor) (a designated deciphering person) and/or a group designated by the creator of the enciphered file (a designated deciphering group).

Figure 42:
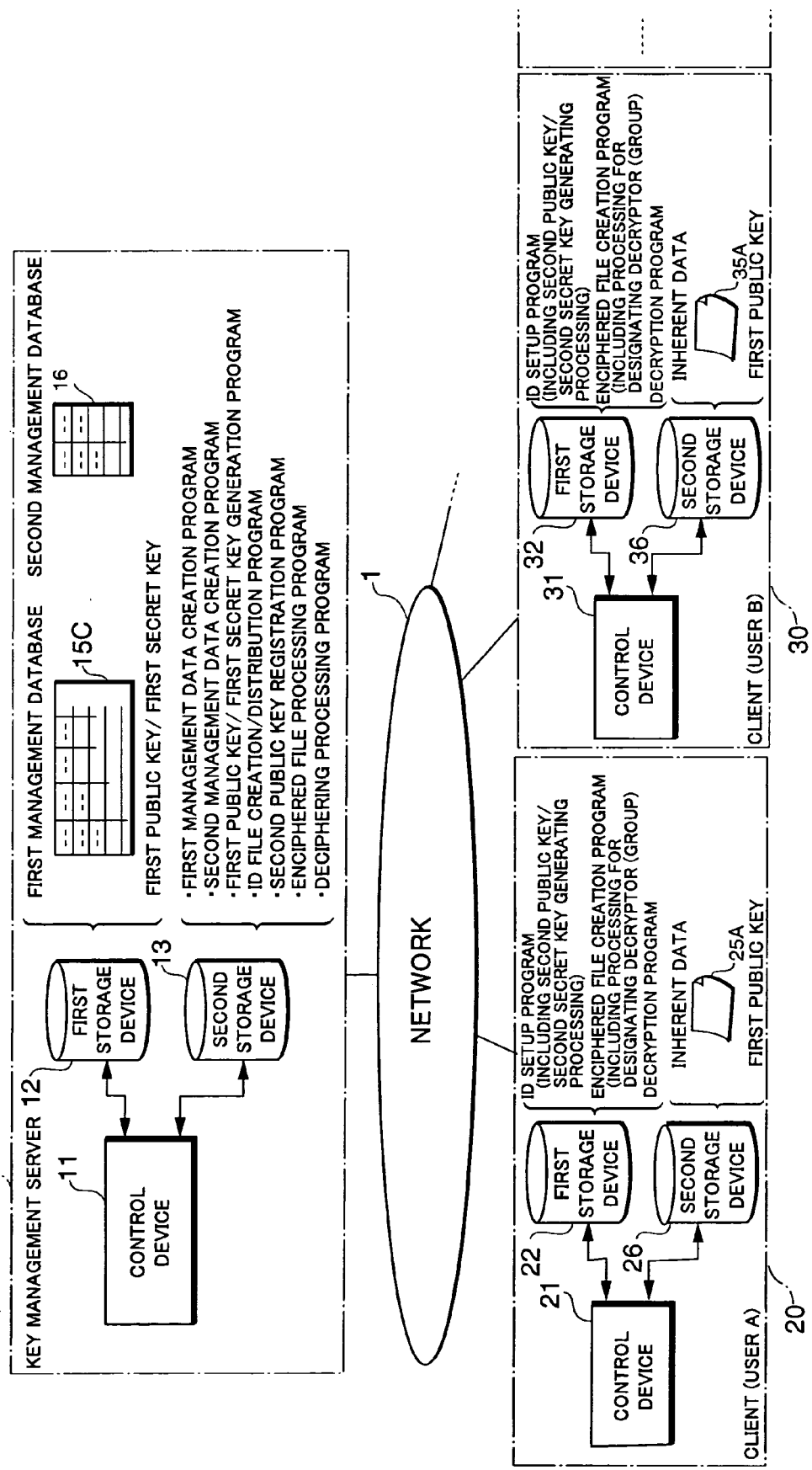
FIG. 42 illustrates the overall configuration of a cryptographic system according to a fourth embodiment.

FIG. 42 is a block diagram showing the overall configuration of the cryptographic system according to the fourth embodiment. The cryptographic system according to the fourth embodiment differs from the cryptographic system according to the third embodiment (FIG. 30) in the contents of data and processing based on programs stored in a first storage device 12 and a second storage device 13 in the key management server 10 and the contents of processing based on programs stored in first storage devices 22, 32, . . . in the clients 20, 30 . . . .

Each of second storage devices 26, 36 . . . in the clients 20, 30 . . . stores an ID and a second secret key (inherent data), and a first public key, as in the second embodiment (see FIG. 16). The ID and the second secret key differ for each of the clients 20, 30 . . . . The first public key (a first public key OP1) is common to all the clients 20, 30 . . . .

FIG. 43 illustrates a first management database 15C provided in the first storage device 12 in the key management server 10. Also in the fourth embodiment, the first storage device 12 in the key management server 10 is provided with the first management database 15C and a second management database 16. The fourth embodiment differs from the third embodiment in the contents of the first management database 15C. The first management database 15C differs from the management database 15B in the third embodiment in that each of management data is provided with two inherent keys. The two inherent keys are hereinafter referred to as a "first inherent key" and a "second inherent key".

Both the first inherent key and the second inherent key are random numbers generated on the basis of a first management data creation program (see FIG. 32) stored in the first storage device 12 in the key management server 10. Two random numbers are generated in processing based on a first management data creation program, and are respectively registered as the first inherent key and the second inherent key in the management data.

Figure 44:
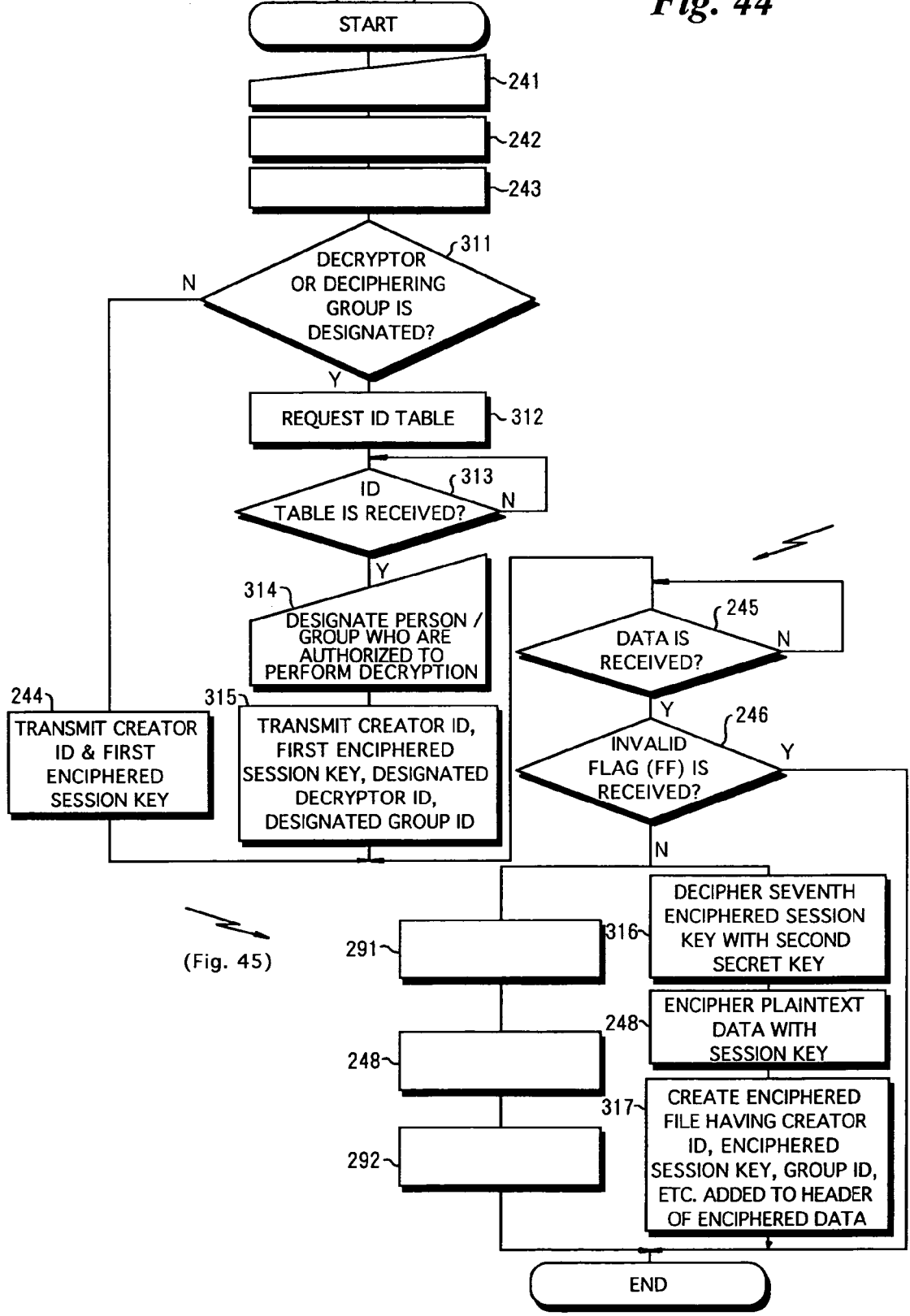
FIG. 44 is a flow chart showing the flow of processing based on an enciphered file creation program.
Figure 45:
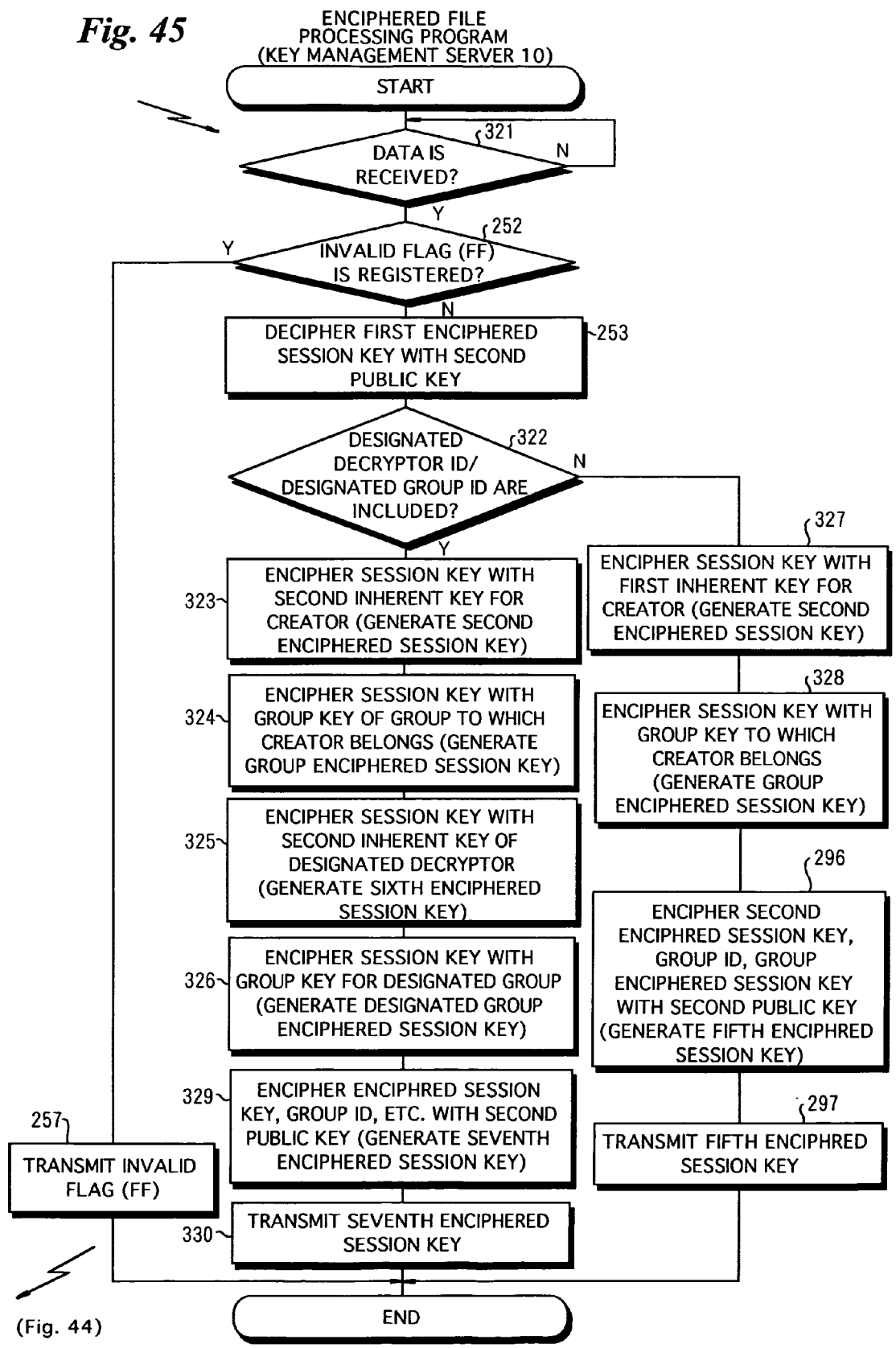
FIG. 45 is a flow chart showing the flow of processing based on an enciphered file processing program.
Figure 46:
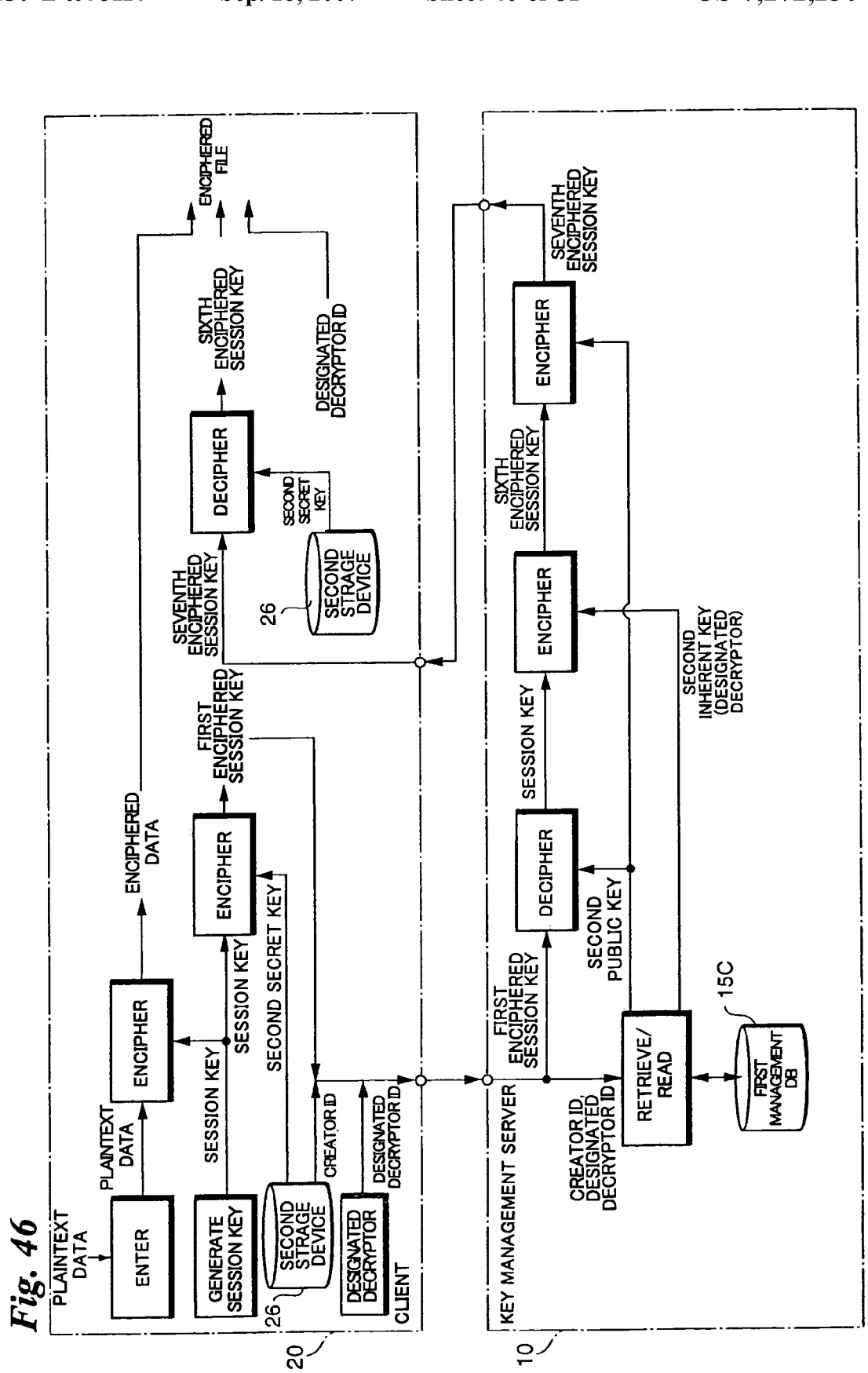
FIG. 46 is a block diagram showing enciphered file creating processing by giving attention to processing performed by a client and a key management server.
Figure 47:
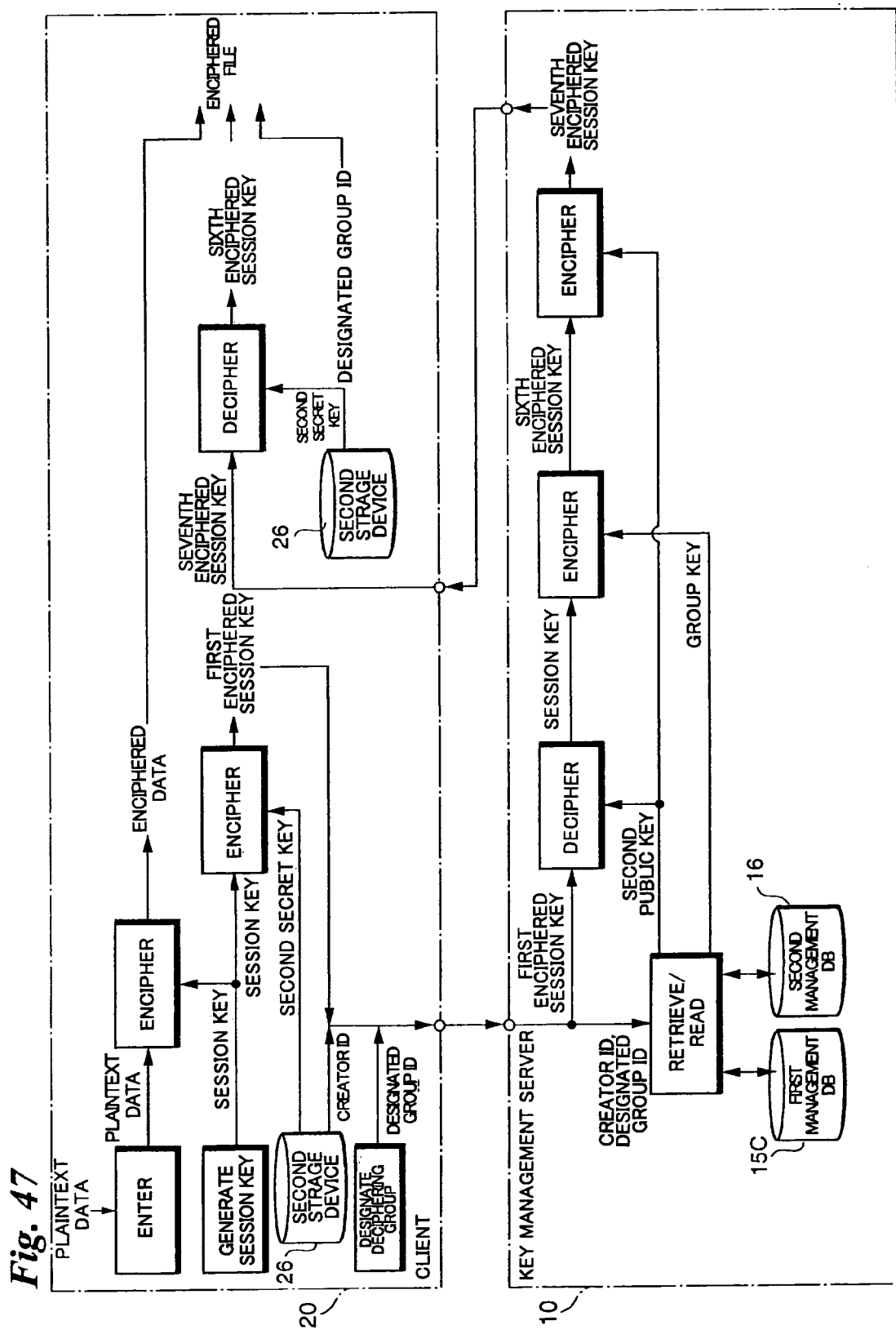
FIG. 47 is a block diagram showing enciphered file creating processing by giving attention to processing performed by a client and a key management server.

FIG. 44 is a flow chart showing the flow of processing based on an enciphered file creation program in the fourth embodiment. The same processing steps as those based on the enciphered file creation program in the third embodiment (FIG. 34) are assigned the same reference numerals and hence, the overlapped description is avoided. FIG. 45 is a flow chart showing the flow of processing based on an enciphered file processing program. The same processing steps as those based on an enciphered file processing program in the third embodiment (FIG. 35) are assigned the same reference numerals and hence, the overlapped description is avoided. FIG. 46 shows by a block diagram processing performed by the client 20 and the key management server 10 in enciphered file creating processing in a case where a person who is authorized to perform decryption is designated in the processing shown in FIGS. 44 and 45. FIG. 47 shows by a block diagram processing performed by the client 20 and the key management server 10 in the enciphered file creation processing in a case where a group who is authorized to perform decryption is designated in the processing shown in FIGS. 44 and 45. In the following description, the processing performed by the client 20 will be taken as an example on the assumption that the enciphered file creating processing using a group key is performed.

Plaintext data is entered in the client 20, a random number (a session key) is generated, and the generated session key is enciphered with a second secret key S2-1 in inherent data 25A (generation of a first enciphered session key) (steps 241 to 243).

A display screen for asking a user who should create an enciphered file (here, a user A) whether or not a user who is authorized to perform decryption (referred to as a designated decryptor) and/or a group who is authorized to perform decryption (hereinafter referred to as a designated deciphering group) should be designated is displayed on a display screen of the client 20.

When neither of the user who is authorized to perform decryption and the group who is authorized to perform decryption is designated (NO in step 311), the same processing as that in the third embodiment is performed. That is, a creator ID (an ID "001" of the user A) and a first enciphered session key are transmitted to the key management server 10 from the client 20 (step 244). In the key management server 10, the first enciphered session key is deciphered with a second public key OP2-1 (step 253), and an obtained session key is enciphered with a first inherent key SK1-1 for the creator (generation of a second enciphered session key: step 327). Further, a group key for a group to which the creator belongs is used, to encipher the session key (generation of a group enciphered session key: step 328). The second enciphered session key, the group ID, the group enciphered session key are enciphered with the second public key OP2-1 (generation of a fifth enciphered session key: step 296). The fifth enciphered session key is transmitted to the client 20 from the key management server 10 (step 297). In the client 20 which has received the fifth enciphered session key, the fifth enciphered session key is deciphered with the second secret key S2-1, and an enciphered file having the creator ID, the group ID, the second enciphered session key, and the group enciphered session key added thereto as header information in enciphered data obtained by enciphering the plaintext data with the session key is created (FIG. 44: steps 291, 248, and 292).

When either one of the user who is authorized to perform decryption and the group who is authorized to perform decryption is designated (YES in step 311), data for requesting an ID table is transmitted to the key management server 10 from the client 20 (step 312). The key management server 10 transmits, when it receives the data for requesting the ID table, data representing the ID table on which a user name, a user ID, a group name to which a user belongs, and an group ID, etc. are described to the client 20. The ID table (a table on which the user name, the user ID, the group name to which the user belongs, and the group ID, etc. are described) is displayed on the display screen of the client 20 which has received the data representing the ID table.

In the cryptographic system according to the fourth embodiment, a user having a decryption object ID registered in management data related to a creator of an enciphered file and a user belonging to a group specified by a group ID registered in the management data related to the creator of the enciphered file are authorized to decipher the enciphered file, as in the third embodiment. Further, in the cryptographic system according to the fourth embodiment, a user and/or a group designated by the creator of the enciphered file are/is authorized to decipher the enciphered file. Referring to the ID table displayed on the display screen, the user (the user A) who creates the enciphered file designates the user who is authorized to perform decryption (the designated decryptor) and/or the group who is authorized to decipher the enciphered file (step 314). Of course, the user having the decryption object ID registered in the management data and the user belonging to the group specified by the group ID registered in the management data are originally authorized to decipher the enciphered file. Therefore, the user (the designated decryptor) or the group (the designated deciphering group) designated herein will be a user or a group which is not registered in the management data.

An ID "001" (a creator ID) of the user who creates the enciphered file, the first enciphered session key, and a designated decryptor ID/designated group ID are transmitted to the key management server 10 from the client 20 (step 315).

In the key management server 10, when the designated decryptor ID and the designated group ID are included in the data transmitted from the client (YES in step 322), the procedure proceeds to the following processing.

The session key is enciphered with the second inherent key for a user specified by the creator ID (a second inherent key SK2-1 in the case of the user A) (step 323). A second session key is generated.

The session key is enciphered with the group key for the group to which the user specified by the creator ID belongs (step 324). A group enciphered session key is generated.

Furthermore, the session key is enciphered with the second inherent key for the user specified by the designated decryptor ID (which is referred to as a sixth enciphered session key) (step 325).

Furthermore, the session key is enciphered with a group key for the group specified by the designated group ID (which is referred to as a designated group enciphered session key) (step 326).

The second enciphered session key, the group enciphered session key, the sixth enciphered session key, the designated group enciphered session key, the group ID, the designated decryptor ID, and the designated group ID are enciphered with the second public key OP2-1 (which is referred to as a seventh enciphered session key) (step 329). The seventh enciphered session key is transmitted to the client 20 from the key management sever 10 (step 330).

In the client 20, the seventh enciphered session key is deciphered with the second secret key S2-1 (step 316). An enciphered file having the second enciphered session key, the group enciphered session key, the sixth enciphered session key, the designated group enciphered session key, the creator ID, the group ID, the designated decryptor ID, and the designated group ID added thereto as header information in enciphered data obtained by enciphering plaintext data is created (step 317).

Figure 48:
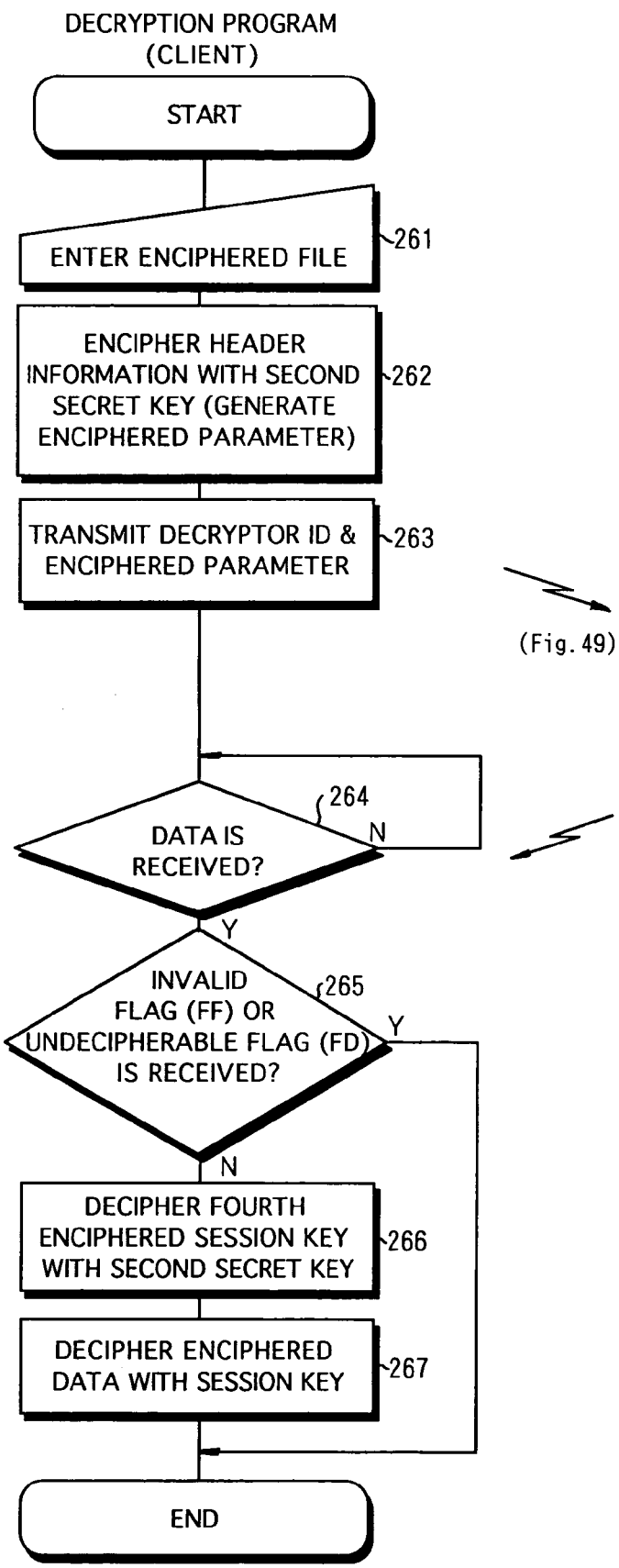
FIG. 48 is a flow chart showing the flow of processing based on a decryption program.
Figure 49:
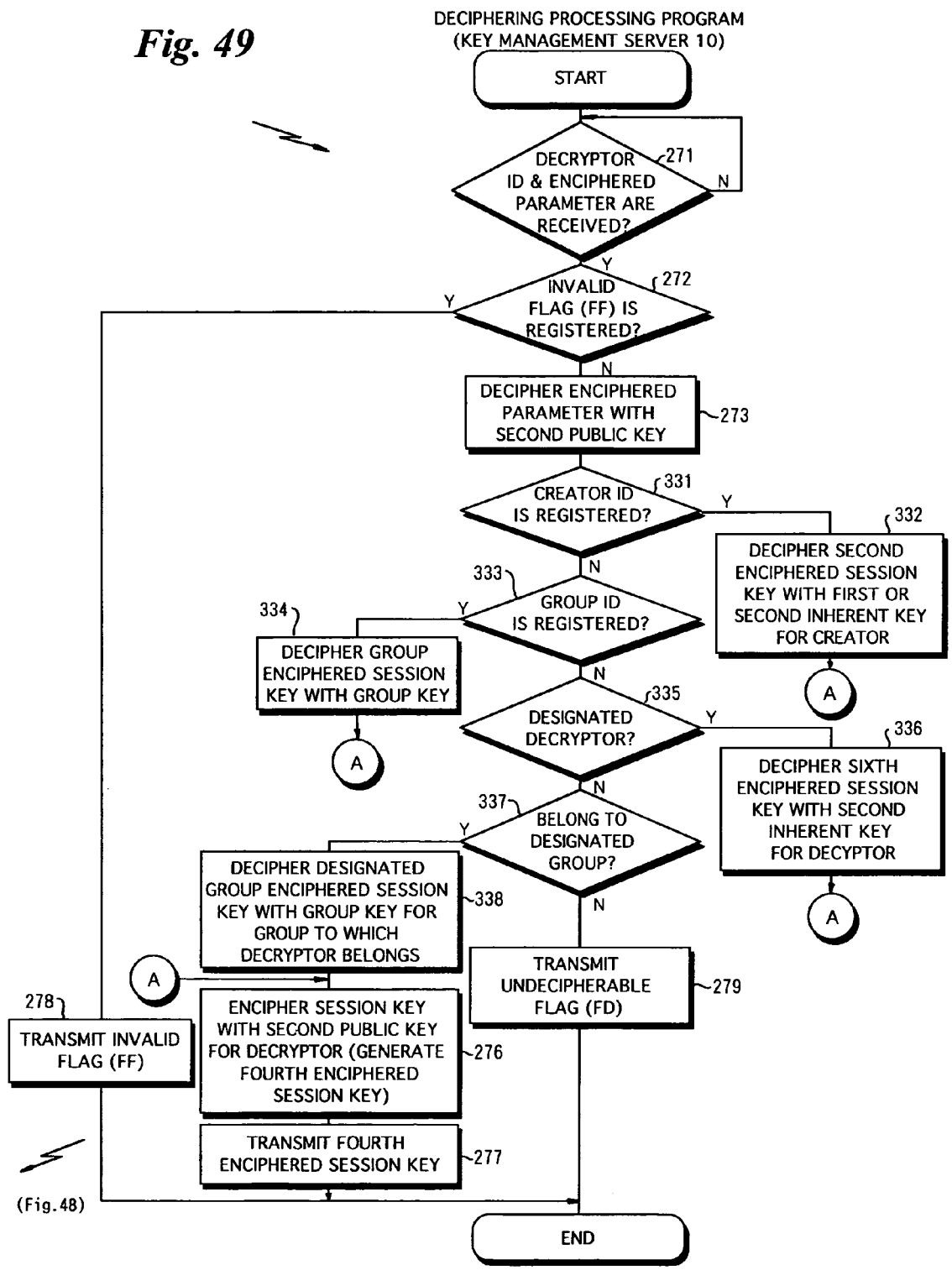
FIG. 49 is a flow chart showing the flow of processing based on a deciphering processing program.
Figure 50:
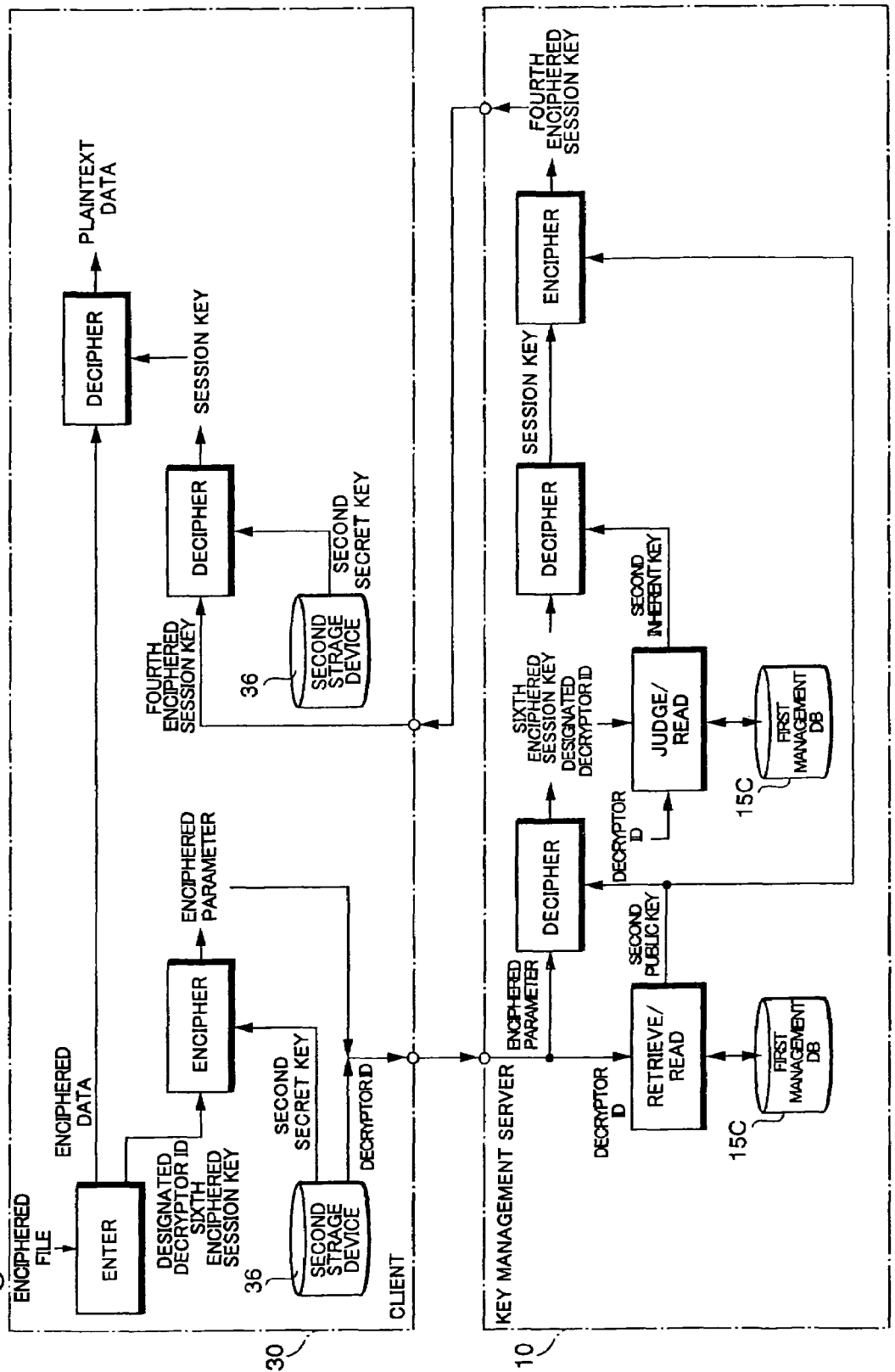
FIG. 50 is a block diagram showing enciphered file deciphering processing by giving attention to processing performed by a client and a key management server.

FIG. 48 is a flow chart showing the flow of processing based on a decryption program stored in the first storage device in the client. FIG. 49 is a flow chart showing the flow of processing based on a deciphering processing program executed in the key management server 10. FIG. 50 is a block diagram showing processing performed by the client 30 and the key management server 10 in processing for deciphering an enciphered file including a designated decryptor ID. FIG. 51 is a block diagram showing processing performed by the client 30 and the key management server 10 in processing for deciphering an enciphered file including a designated group ID. Although the processing based on the decryption program shown in FIG. 48 is the same as that in the flow chart shown in FIG. 25 in the second embodiment, it is inserted again in order to make the description easy to understand. The processing shown in FIG. 49 includes the same processing as that in the flow chart shown in FIG. 39 in the third embodiment and hence, the same processing steps are assigned the same reference numerals, to avoid the overlapped description.

The enciphered file is entered in the client (step 261), and header information is enciphered with the second secret key (generation of an enciphered parameter: step 262). An ID of a decryptor and the enciphered parameter are transmitted to the key management server 10 from the client (step 263).

In the key management data 10 which has received the decryptor ID and the enciphered parameter, the enciphered parameter is deciphered with the second public key for the decryptor. The second enciphered session key, the group enciphered session key, the sixth enciphered session key, the designated group enciphered session key, the creator ID, the group ID, the designated decryptor ID, and the designated group ID are obtained (step 273).

It is judged whether or not the same ID as the obtained creator ID is registered in a decryption object ID column in management data related to the decryptor (step 331).

When the same ID as the creator ID is registered in the management data (YES in step 331), the management data related to the creator of the enciphered file specified by the creator ID is referred to, to decipher the second enciphered session key with the first inherent key or the second inherent key for the creator of the enciphered file (step 332). A obtained session key is enciphered with the second public key for the decryptor (generation of a fourth enciphered session key: step 276), and the fourth enciphered session key is transmitted to the client from the key management server 10 (step 277).

When the creator ID is not registered in the decryption object ID column in the management data related to the decryptor (NO in step 331), it is judged whether or not the same ID as the obtained group ID is registered in the management data related to the decryptor (step 333).

When the same ID as the obtained group ID is registered in the management data related to the decryptor (YES in step 333), the second management database 16 is referred to, and a group key corresponding to the group ID is used, to decipher the group enciphered session key. A session key is obtained (step 334). The obtained session key is enciphered with the second public key for the decryptor (generation of a fourth enciphered session key: step 276), and the fourth enciphered session key is transmitted to the client from the key management server 10 (step 277).

When the same ID as the obtained group ID is not registered in the management data related to the decryptor (NO in step 333), it is judged whether or not the same ID as the decryptor ID is included as the designated decryptor ID in the header information (step 335).

When the same ID as the decryptor ID is included as the designated decryptor ID in the header information (YES in step 335), the decryptor is a designated deciphering person whom the creator of the enciphered file authorizes to decipher the enciphered file in the processing for creating the enciphered file. In this case, the sixth enciphered session key is deciphered with the second inherent key for the decryptor (the designated decryptor) (the sixth enciphered session key is enciphered with the second inherent key for the designated decryptor (FIG. 45: step 325)). A session key is obtained. The fourth enciphered session key is transmitted to the client from the key management server 10 (steps 276 and 277).

When the same ID as the decryptor ID is not included in the header information (NO in step 335), it is judged whether or not a group ID of a group to which the decryptor belongs is included as the designated group ID in the header information (step 337).

When the group ID of the group to which the decryptor belongs is included as the designated group ID in the header information (YES in step 337), the group key corresponding to the group ID is read out of the second management database 16, and a designated group enciphered key is deciphered with the group key (step 338). A session key is obtained. The fourth enciphered session key is transmitted to the client from the key management server 10 (steps 276 and 277).

When the session key has not been obtained yet through the processing (NO in step 337), an undecipherable flag (FD) is transmitted to the client from the key management server 10 (step 279).

In the client which has received the fourth enciphered session key from the key management server 10, the fourth enciphered session key is deciphered with the second secret key in the inherent data (FIG. 48: step 266). A session key is obtained. The enciphered data is deciphered with the obtained session key (step 267).

In the cryptographic system according to the fourth embodiment, authorization to decipher the enciphered file is given with respect to the user or the group designated by the user who creates the enciphered file.

Although in the above-mentioned embodiment (fourth embodiment), the decryption object ID and the group ID are registered in the management data in the first management database 15C, and the decryption authorization is given to the user having the decryption object ID and the user belonging to the group specified by the registered group ID, it goes without saying that the registrations (the decryption object ID and the group ID) need not be necessarily performed. In this case, the decryption authorization is given only to a user designated (a designated decryptor) and/or a group designated (a designated group) by the creator of the enciphered file.

Furthermore, in the fourth embodiment, the second inherent key is used for generating the second enciphered session key when the designated deciphering person or the designated group is designated, while the first inherent key is used for generating the second enciphered session key when the designated deciphering person or the designated group is not designated (FIG. 45: steps 323 and 327). In the processing based on the deciphering processing program performed by the key management server 10, it can be also judged whether or not there is a designated decryptor or a designated group by judging whether or not the second enciphered session key is generated using either the first inherent key or the second inherent key.

The invention claimed is:

1. A cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and a client comprising inherent data storing means for storing said inherent ID and an inherent secret key paired with said inherent public key, and session key generating means are connected to each other through a network, wherein said client comprises plaintext data entering means for accepting the entry of plaintext data, first transmitting means for transmitting to the key management server the inherent ID stored in the inherent data storing means when the plaintext data is accepted, enciphered data creating means for generating a session key by said session key generating means, and enciphering the accepted plaintext data with the generated session key, to create enciphered data, enciphered file creating means for deciphering an enciphered inherent key transmitted from the key management server with the inherent secret key stored in the inherent data storing means, to obtain an inherent key, enciphering said session key with the obtained inherent key, to generate a first enciphered session key, and using the inherent ID stored in the inherent data storing means as a creator ID, to add the creator ID and the generated first enciphered session key to the enciphered data, to create an enciphered file, enciphered file entering means for accepting the entry of the enciphered file, second transmitting means for using, when the enciphered file is accepted, the inherent ID stored in the inherent data storing means as a decryptor ID, to transmit to the key management server the decryptor ID, and the creator ID and the first enciphered session key in the accepted enciphered file, and deciphering means for deciphering a second enciphered session key transmitted from said key management server with the inherent secret key stored in the inherent data storing means, to obtain a session key, and deciphering the enciphered data in the accepted enciphered file with the obtained session key, to obtain plaintext data, and said key management server comprises first transmitting means for enciphering the inherent key stored in the management database in correspondence with said inherent ID transmitted from the client with the inherent public key stored in the management database in correspondence with said inherent ID, to generate an enciphered inherent key, and transmitting the generated enciphered inherent key to the client, judging means for judging whether or not the creator ID, together with the decryptor ID, transmitted from the client is stored as a decryption object ID in said management database in correspondence with the decryptor ID transmitted from said client, and second transmitting means for deciphering, when said judging means judges that said creator ID is stored as the decryption object ID in the management database, the first enciphered session key, together with said decryptor ID and said creator ID, transmitted from the client with the inherent key stored in the management database in correspondence with said creator ID, to obtain a session key, enciphering the obtained session key with the inherent public key stored in the management database in correspondence with said decryptor ID, to generate a second enciphered session key, and transmitting the generated second enciphered session key to the client.

2. A cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and a client comprising inherent data storing means for storing said inherent ID and an inherent secret key paired with said inherent public key, and session key generating means are connected to each other through a network, wherein said client comprises plaintext data entering means for accepting the entry of plaintext data, enciphered data creating means for generating, when the plaintext data is accepted, a session key by said session key generating means, and enciphering the entered plaintext data with the generated session key, to create enciphered data, first transmitting means for enciphering said session key with the inherent secret key stored in the inherent data storing means, to generate a first enciphered session key, and using the inherent ID stored in said inherent data storing means as a creator ID, to transmit to the key management server the creator ID and the generated first enciphered session key, enciphered file creating means for adding to said enciphered data the creator ID stored in the inherent data storing means and a second enciphered session key transmitted from the key management server, to create an enciphered file, enciphered file entering means for accepting the entry of the enciphered file, second transmitting means for using, when the enciphered file is accepted, the inherent ID stored in the inherent data storing means as a decryptor ID, to transmit to the key management server the decryptor ID, and the creator ID and the second enciphered session key in the accepted enciphered file, and deciphering means for deciphering a third enciphered session key transmitted from said key management server with the inherent secret key stored in the inherent data storing means, to obtain a session key, and deciphering the enciphered data in the accepted enciphered file with the obtained session key, to obtain plaintext data, and said key management server comprises first transmitting means for deciphering the first enciphered session key transmitted from the client with the inherent public key stored in the management database in correspondence with the creator ID, together with said first enciphered session key, transmitted from the client, to obtain a session key, enciphering the obtained session key with the inherent key stored in the management database in correspondence with said creator ID, to generate a second enciphered session key, and transmitting the generated second enciphered session key to the client, judging means for judging whether or not the creator ID, together with said decryptor ID, transmitted from the client is stored as a decryption object ID in said management database in correspondence with the decryptor ID transmitted from the client, and second transmitting means for deciphering, when said judging means judges that said creator ID is stored as the decryption object ID in the management database, the second enciphered session key, together with said decryptor ID and said creator ID, transmitted from the client with the inherent key stored in the management database in correspondence with said creator ID, to obtain a session key, enciphering the obtained session key with the inherent public key stored in the management database in correspondence with said decryptor ID, to generate a third enciphered session key, and transmitting the generated third enciphered session key to the client.

3. A cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and common key storing means for storing a pair of a common public key and a common secret key, and a client comprising inherent data storing means for storing said inherent ID and an inherent secret key paired with said inherent public key, common public key storing means for storing said common public key, and session key generating means are connected to each other through a network, wherein said client comprises plaintext data entering means for accepting the entry of plaintext data, enciphered data creating means for generating, when the plaintext data is accepted, a session key by said session key generating means, and enciphering the entered plaintext data with the generated session key, to create enciphered data, first transmitting means for enciphering said session key with the common public key stored in the common public key storing means, to generate a first enciphered session key, and using the inherent ID stored in the inherent data storing means as a creator ID, to transmit to the key management server the creator ID and the generated first enciphered session key, enciphered file creating means for adding to said enciphered data the creator ID stored in the inherent data storing means and a second enciphered session key transmitted from the key management server, to create an enciphered file, enciphered file entering means for accepting the entry of the enciphered file, second transmitting means for using, when the enciphered file is accepted, the inherent ID stored in the inherent data storing means as a decryptor ID, to transmit to the key management server the decryptor ID, and the creator ID and the second enciphered session key in the accepted enciphered file, and deciphering means for deciphering a third enciphered session key transmitted from said key management server with the inherent secret key stored in the inherent data storing means, to obtain a session key, and deciphering the enciphered data in the accepted enciphered file with the obtained session key, to obtain plaintext data, and said key management server comprises first transmitting means for deciphering the first enciphered session key transmitted from the client with the common secret key stored in the common key storing means, to obtain a session key, enciphering the obtained session key with the inherent key stored in the management database in correspondence with the creator ID, together with said first enciphered session key, transmitted from the client, to generate a second enciphered session key, and transmitting the generated second enciphered session key to the client, judging means for judging whether or not the creator ID, together with said decryptor ID, transmitted from the client is stored as a decryption object ID in said management database in correspondence with the decryptor ID transmitted from the client, and second transmitting means for deciphering, when said judging means judges that said creator ID is stored as the decryption object ID in the management database, the second enciphered session key, together with said decryptor ID and said creator ID, transmitted from the client with the inherent key stored in the management database in correspondence with said creator ID, to obtain a session key, enciphering the obtained session key with the inherent public key stored in the management database in correspondence with said decryptor ID, to generate a third enciphered session key, and transmitting the generated third enciphered session key to the client.

4. A cryptographic system in which a key management server comprising a first management database for storing, with respect to each of users, an inherent ID, and an inherent public key which are inherent in the user, and a group ID of a group to which the user belongs, and a second management database for storing, with respect to each of groups, a group ID and a group key which are inherent in the group, and a client comprising inherent data storing means for storing said inherent ID and an inherent secret key paired with said inherent public key,
and session key generating means are connected to each other through a network, wherein said client comprises plaintext data entering means for accepting the entry of plaintext data, enciphered data creating means for generating, when the plaintext data is accepted, a session key by said session key generating means, and enciphering the entered plaintext data with the generated session key, to create enciphered data, first transmitting means for enciphering said session key with the inherent secret key stored in the inherent data storing means, to generate a first enciphered session key, and using the inherent ID stored in said inherent data storing means as a creator ID, to transmit to the key management server the creator ID and the generated first enciphered session key, enciphered file creating means for adding to said enciphered data the group ID and a group enciphered session key which are transmitted from the key management server, to create an enciphered file, enciphered file entering means for accepting the entry of the enciphered file, second transmitting means for using, when the enciphered file is accepted, the inherent ID stored in the inherent data storing means as a decryptor ID, to transmit to the key management server the decryptor ID, and the group ID and the group enciphered session key in the accepted enciphered file, and deciphering means for deciphering a second enciphered session key transmitted from said key management server with the inherent secret key stored in the inherent data storing means, to obtain a session key, and deciphering the enciphered data in the accepted enciphered file with the obtained session key, to obtain plaintext data, and said key management server comprises first transmitting means for deciphering the first enciphered session key transmitted from the client with the inherent public key stored in the first management database in correspondence with the creator ID, together with said first enciphered session key, transmitted from the client, to obtain a session key, enciphering the obtained session key with the group key stored in said second management database in correspondence with the group ID stored in the first management database in correspondence with said creator ID, to generate the group enciphered session key, and transmitting the group ID and the generated group enciphered session key to the client, judging means for judging whether or not the group ID, together with said decryptor ID, transmitted from the client is registered ih the first management database in correspondence with the decryptor ID transmitted from the client, and second transmitting means for deciphering, when said judging means judges that said group ID is registered in the first management database, the group enciphered session key, together with said decryptor ID and said group ID, transmitted from the client with the group key stored in the second management database in correspondence with said group ID, to obtain a session key, enciphering the obtained session key with the inherent public key stored in the first management database in correspondence with said decryptor ID, to generate a second enciphered session key, and transmitting the generated second enciphered session key to the client.

5. A cryptographic system in which a key management server comprising a management database for storing, with respect to each of users, an inherent ID, an inherent key, and an inherent public key which are inherent in the user, and a client comprising inherent data storing means for storing said inherent ID and an inherent secret key paired with said inherent public key, and session key generating means are connected to each other through a network, wherein said client comprises plaintext data entering means for accepting the entry of plaintext data, enciphered data creating means for generating, when the plaintext data is accepted, a session key by said session key generating means, and enciphering the entered plaintext data with the generated session key, to create enciphered data, decryption authorized user designating means for,accepting the designation of a decryption authorized user, first transmitting means for enciphering said session key with the inherent secret key stored in the inherent data storing means, to generate a first enciphered session key, using an inherent ID of the designated decryption authorized user as a designated decryption authorized user ID, and using the inherent ID stored in said inherent data storing means as a creator ID, to transmit to the key management server the designated decryption authorized user ID, the creator ID, and the generated first enciphered session key, enciphered file creating means for adding to the enciphered data the designated decryption authorized user ID and a second enciphered session key transmitted from the key management server, to create an enciphered file, enciphered file entering means for accepting the entry of the enciphered file, second transmitting means for using, when the enciphered file is accepted, the inherent ID stored in the inherent data storing means as a decryptor ID, to transmit to the key management server the decryptor ID, and the designated decryption authorized user ID and the second enciphered session key in the accepted enciphered file, and deciphering means for deciphering a third enciphered session key transmitted from the key management server with the inherent secret key stored in the inherent data storing means, to obtain a session key, and deciphering the enciphered data in the accepted enciphered file with the obtained session key, to obtain plaintext data, and said key management server comprises first transmitting means for deciphering the first enciphered session key transmitted from the client with the inherent public key stored in the management database in correspondence with the creator ID, together with said first enciphered session key, transmitted from the client, to obtain a session key, enciphering the obtained session key with the inherent key stored in the management database in correspondence with the designated decryption authorized user ID, together with said first enciphered session key and said creator ID, transmitted from the client, to generate a second enciphered session key, and transmitting the generated second enciphered session key to the client, judging means for judging whether or not the decryptor ID transmitted from the client is the same as the designated decryption authorized user ID, together with said decryptor ID, transmitted from the client, and second transmitting means for deciphering, when said judging means judges that said decryptor ID is the same as said designated decryption authorized user ID, the second enciphered session key, together with said decryptor ID and said designated decryption authorized user ID, transmitted from the client with the inherent key stored in the management database in correspondence with said decryptor ID, to obtain a session key, enciphering the obtained session key with the inherent public key stored in the management database in correspondence with said decryptor ID, to generate a third enciphered session key, and transmitting the generated third enciphered session key to the client.

6. A cryptographic system in which a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, and a client comprising inherent data storing means for storing said inherent ID and an inherent secret key paired with said inherent public key, and session key generating means are connected to each other through a network, wherein said client comprises plaintext data entering means for accepting the entry of plaintext data, enciphered data creating means for generating, when the plaintext data is accepted, a session key by said session key generating means, and enciphering the entered plaintext data with the generated session key, to create enciphered data, decryption authorized group designating means for accepting the designation of a decryption authorized group, first transmitting means for enciphering said session key with the inherent secret key stored in the inherent data storing means, to generate a first enciphered session key, using a group ID of the designated decryption authorized group as a designated decryption authorized group ID, and using the inherent ID stored in said inherent data storing means as a creator ID, to transmit to the key management server the designated decryption authorized group ID, the creator ID, and the generated first enciphered session key, enciphered file creating means for adding to said enciphered data the designated decryption authorized group ID and a group enciphered session key transmitted from the key management server, to create an enciphered file, enciphered file entering means for accepting the entry of the enciphered file, second transmitting means for using, when the enciphered file is accepted, the inherent ID stored in the inherent data storing means as a decryptor ID, to transmit to the key management server the decryptor ID, and the designated decryption authorized group ID and the group enciphered session key in the accepted enciphered file, and deciphering means for deciphering a second enciphered session key transmitted from the key management server with the inherent secret key stored in the inherent data storing means, to obtain a session key, and deciphering the enciphered data in the accepted enciphered file with the obtained session key, to obtain plaintext data, and said key management server comprises first transmitting means for deciphering the first enciphered session key transmitted from the client with the inherent public key stored in the first management database in correspondence with the creator ID, together with said first enciphered session key, transmitted from the client, to obtain a session key, enciphering the obtained session key with the group key stored in the second management database in correspondence with the designated decryption authorized group ID, together with said first enciphered session key and said creator ID, transmitted from the client, to generate a group enciphered session key, and transmitting the generated group enciphered session key to the client, judging means for judging whether or not the same group ID as the designated decryption authorized group ID transmitted from the client is stored in the first management database in correspondence with the decryptor ID, together with said designated decryption authorized group ID, transmitted from the client, and second transmitting means for deciphering, when said judging means judges that the same group ID as said designated decryption authorized group ID is stored in the first management database, the group enciphered session key, together with said decryptor ID and said designated decryption authorized group ID, transmitted from the client with the group key stored in the second management database in correspondence with said group ID, to obtain a session key, enciphering the obtained session key with the inherent public key stored in the first management database in correspondence with said decryptor ID, to generate a second enciphered session key, and transmitting the generated second enciphered session key to the client.

7. A method of controlling a cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and a client comprising inherent data storing means for storing said inherent ID and an inherent secret key paired with said inherent public key, and session key generating means are connected to each other through a network, wherein said client accepts the entry of plaintext data or an enciphered file, the client transmits, when it accepts the plaintext data, the inherent ID stored in the inherent data storing means to the key management server, the key management server which has received the inherent ID enciphers the inherent key stored in the management database in correspondence with the received inherent ID with the inherent public key stored in the management database in correspondence with the inherent ID, to generate an enciphered inherent key, and transmits the generated enciphered inherent key to the client, the client which has received the enciphered inherent key deciphers the received enciphered inherent key with the inherent secret key stored in the inherent data storing means, to obtain an inherent key, generates a session key by the session key generating means, enciphers the accepted plaintext data with the generated session key, to create enciphered data, enciphers said session key with the inherent key, to generate a first enciphered session key, and uses the inherent ID stored in the inherent data storing means as a creator ID, to add the creator ID and the generated first enciphered session key to the enciphered data, to create an enciphered file, the client uses, when it accepts the enciphered file, an inherent ID of a decryptor stored in the inherent data storing means as a decryptor ID, to transmit to the key management server the decryptor ID, and the creator ID and the first enciphered session key in the accepted enciphered file, the key management server which has received the decryptor ID, and the creator ID and the first enciphered session key judges whether or not the received creator ID is stored as a decryption object ID in said management database in correspondence with the received decryptor ID, and deciphers, when the received creator ID is stored as the decryption object ID in the management database, the first enciphered session key with the inherent key stored in the management database in correspondence with said creator ID, to obtain a session key, enciphers the obtained session key with the inherent public key stored in the management database in correspondence with said decryptor ID, to generate a second enciphered session key, and transmits the generated second enciphered session key to the client, and the client which has received the second enciphered session key deciphers the received second enciphered session key with the inherent secret key stored in the inherent data storing means, to obtain a session key, and deciphers the enciphered data in the accepted enciphered file with the obtained session key, to obtain plaintext data.

8. A method of controlling a cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and a client comprising inherent data storing means for storing said inherent ID and an inherent secret key paired with said inherent public key, and session key generating means are connected to each other through a network, wherein said client accepts the entry of plaintext data or an enciphered file, the client generates, when it accepts the plaintext data, a session key by said session key generating means, enciphers the entered plaintext data with the generated session key, to create enciphered data, enciphers said session key with the inherent secret key stored in the inherent data storing means, to generate a first enciphered session key, and uses the inherent ID stored in said inherent data storing means as a creator ID, to transmit to the key management server the creator ID and the generated first enciphered session key, the key management server which has received the creator ID and the first enciphered session key deciphers the received first enciphered session key with the inherent public key stored in the management database in correspondence with the received creator ID, to obtain a session key, enciphers the obtained session key with the inherent key stored in the management database in correspondence with the received creator ID, to generate a second enciphered session key, and transmits the generated second enciphered session key to the client, the client which has received the second enciphered session key adds to said enciphered data the creator ID stored in the inherent data storing means and the received second enciphered session key, to create an enciphered file, the client uses, when it accepts the enciphered file, an inherent ID of a decryptor stored in the inherent data storing means as a decryptor ID, to transmit to the key management server the decryptor ID, and the creator ID and the second enciphered session key in the accepted enciphered file, the key management server which has received the decryptor ID, and the creator ID and the second enciphered session key judges whether or not the received creator ID is stored as a decryption object ID in said management database in correspondence with the received decryptor ID, deciphers, when the received creator ID is stored as the decryption object ID in the management database, the second enciphered session key with the inherent key stored in the management database in correspondence with said creator ID, to obtain a session key, enciphers the obtained session key with the inherent public key stored in the management database in correspondence with the received decryptor ID, to generate a third enciphered session key, and transmits the generated third enciphered session key to the client, and the client which has received the third enciphered session key deciphers the received third enciphered session key with the inherent secret key stored in the inherent data storing means, to obtain a session key, and deciphers the enciphered data in the accepted enciphered file with the obtained session key, to obtain plaintext data.

9. A method of controlling a cryptographic system in which a key management server comprising a management database for storing, with respect to each of users, an inherent ID, an inherent key, and an inherent public key which are inherent in the user, and a decryption object ID which is an inherent ID of a creator of an enciphered file decipherable by the user, and common key storing means for storing a pair of a common public key and a common secret key, and a client comprising inherent data storing means for storing said inherent ID and an inherent secret key paired with said inherent public key, common public key storing means for storing said common public key, and session key generating means are connected to each other through a network, wherein said client accepts the entry of plaintext data or an enciphered file, the client generates, when it accepts the plaintext data, a session key by said session key generating means, enciphers the entered plaintext data with the generated session key, to create enciphered data, enciphers said session key with the common public key stored in the common public key storing means, to generate a first enciphered session key, and uses the inherent ID stored in said inherent data storing means as a creator ID, to transmit to the key management server the creator ID and the generated first enciphered session key, the key management server which has received the creator ID and the first enciphered session key deciphers the received first enciphered session key with the common secret key stored in the common key storing means, to obtain a session key, enciphers the obtained session key with the inherent key stored in the management database in correspondence with the received creator ID, to generate a second enciphered session key, and transmits the generated second enciphered session key to the client, the client which has received the second enciphered session key adds to said enciphered data the creator ID stored in the inherent data storing means and the received second enciphered session key, to create an enciphered file, the client uses, when it accepts the enciphered file, an inherent ID of a decryptor stored in the inherent data storing means as a decryptor ID, to transmit to the key management server the decryptor ID, and the creator ID and the second enciphered session key in the accepted enciphered file, the key management server which has received the decryptor ID, and the creator ID and the second enciphered session key judges whether or not the received creator ID is stored as a decryption object ID in said management database in correspondence with the received decryptor ID, deciphers, when the received creator ID is stored as the decryption object ID in the management database, the second enciphered session key with the inherent key stored in the management database in correspondence with said creator ID, to obtain a session key, enciphers the obtained session key with the inherent public key stored in the management database in correspondence with the received decryptor ID, to generate a third enciphered session key, and transmits the generated third enciphered session key to the client, and the client which has received the third enciphered session key deciphers the received third enciphered session key with the inherent secret key stored in the inherent data storing means, to obtain a session key, and deciphers the enciphered data in the accepted enciphered file with the obtain session key, to obtain plaintext data.

10. A method of controlling a cryptographic system in which a key management server comprising a first management database for storing, with respect to each users, an inherent ID and an inherent public key which are inherent in the user, and a group ID of a group to which the user belongs, and a second management database for storing, with respect to each of groups, a group ID and a group key which are inherent in the group, and a client comprising inherent data storing means for storing said inherent ID and an inherent secret key paired with said inherent public key, and session key generating means are connected to each other through a network, wherein said client accepts the entry of plaintext data or an enciphered file, the client generates, when it accepts the plaintext data, a session key by said session key generating means, enciphers the entered plaintext data with the generated session key, to create enciphered data, enciphers said session key with the inherent secret key stored in the inherent data storing means, to generate a first enciphered session key, and uses the inherent ID stored in said inherent data storing means as a creator ID, to transmit to the key management server the creator ID and the generated first enciphered session key, the key management server which has received the creator ID and the first enciphered session key deciphers the received first enciphered session key with the inherent public key stored in the first management database in correspondence with the received creator ID, to obtain a session key, enciphers the obtained session key with the group key stored in the second management database in correspondence with the group ID stored in the first management database in correspondence with the received creator ID, to generate a group enciphered session key, and transmits said group ID and the generated group enciphered session key to the client, the client which has received the group ID and the group enciphered session key adds to said enciphered data the received group ID and group enciphered session key, to create an enciphered file, the client uses, when it accepts the enciphered file, an inherent ID of a decryptor stored in the inherent data storing means as a decryptor ID, to transmit to the key management server the decryptor ID, and the group ID and the group enciphered session key in the accepted enciphered file, the key management server which has received the decryptor ID, and the group ID and the group enciphered session key judges whether or not the received group ID is registered in the first management database in correspondence with the received decryptor ID, deciphers, when the received group ID is registered in the first management database, the group enciphered session key with the group key stored in the second management database in correspondence with said group ID, to obtain a session key, enciphers the obtained session key with the inherent public key stored in the first management database in correspondence with the decryptor ID, to generate a second enciphered session key, and transmits the generated second enciphered session key to the client, and the client which has received the second enciphered session key deciphers the received second enciphered session key with the inherent secret key stored in the inherent data storing means, to obtain a session key, and deciphers the enciphered data in the accepted enciphered file with the obtained session key, to obtain plaintext data.

11. A method of controlling a cryptographic system in which a key management server comprising a management database for storing, with respect to each of users, an inherent ID, an inherent key, and an inherent public key which are inherent in the user, and a client comprising inherent data storing means for storing said inherent ID and an inherent secret key paired with said inherent public key, and session key generating means are connected to each other through a network, wherein said client accepts the entry of plaintext data or an enciphered file, the client generates, when it accepts the plaintext data, a session key by the session key generating means, enciphers the entered plaintext data with the generated session key, to create enciphered data, enciphers said session key with the inherent secret key stored in the inherent data storing means, to generate a first enciphered session key, accepts the entry of the designation of a decryption authorized user, uses an inherent ID of the designated decryption authorized user as a designated decryption authorized user ID, and uses the inherent ID stored in said inherent data storing means as a creator ID, to transmit to the key management server the designated decryption authorized user ID, the creator ID, and the generated first enciphered session key, the key management server which has received the designated decryption authorized user ID, and the creator ID and the first enciphered session key deciphers the received first enciphered session key with the inherent public key stored in the management database in correspondence with the received creator ID, to obtain a session key, enciphers the obtained session key with the inherent key stored in the management database in correspondence with the received designated decryption authorized user ID, to generate a second enciphered session key, and transmits the generated second enciphered session key to the client, the client which has received the second enciphered session key adds to the enciphered data the designated decryption authorized user ID and the second enciphered session key, to create an enciphered file, the client uses, when it accepts the enciphered file, the inherent ID stored in the inherent data storing means as a decryptor ID, to transmit to the key management server the decryptor ID, and the designated decryption authorized user ID and the second enciphered session key in the accepted enciphered file, the key management server which has received the decryptor ID, and the designated decryption authorized user ID and the second enciphered session key judges whether or not the decryptor ID is the same as the designated decryption authorized user ID, deciphers, when the decryptor ID is the same as the designated decryption authorized user ID, the second enciphered session key with the inherent key stored in the management database in correspondence with the received decryptor ID, to obtain a session key, enciphers the obtained session key with the inherent public key stored in the management database in correspondence with the decryptor ID, to generate a third enciphered session key, and transmits the generated third enciphered session key to the client, and the client which has received the third enciphered session key deciphers the received third enciphered session key with the inherent secret key stored in the inherent data storing means, to obtain a session key, and deciphers the enciphered data in the accepted enciphered file with the obtained session key, to obtain plaintext data.

12. A method of controlling a cryptographic system in which a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, and a client comprising inherent data storing means for storing said inherent ID and an inherent secret key paired with said inherent public key, and session key generating means are connected to each other through a network, wherein said client accepts the entry of plaintext data or an enciphered file, the client generates, when it accepts the plaintext data, a session key by said session key generating means, enciphers the entered plaintext data with the generated session key, to create enciphered data, enciphers said session key with the inherent secret key stored in the inherent data storing means, to generate a first enciphered session key, accepts the entry of the designation of a decryption authorized group, uses a group ID of the designated decryption authorized group as a designated decryption authorized group ID, and uses the inherent ID stored in said inherent data storing means as a creator ID, to transmit to the key management server the designated decryption authorized group ID, the creator ID, and the generated first enciphered session key, the key management server which has received the designated decryption authorized group ID, the creator ID and the first enciphered session key deciphers the received first enciphered session key with the inherent public key stored in the first management database in correspondence with the received creator ID, to obtain a session key, enciphers the obtained session key with the group key stored in the second management database in correspondence with the received designated decryption authorized group ID, to generate a group enciphered session key, and transmits the generated group enciphered session key to the client, the client which has received the group enciphered session key adds to said enciphered data the designated decryption authorized group ID and the received group enciphered session key, to create an enciphered file, the client uses, when it accepts the enciphered file, an inherent ID of a decryptor stored in the inherent data storing means as a decryptor ID, to transmit to the key management server the decryptor ID, and the designated decryption authorized group ID and the group enciphered session key in the accepted enciphered file, the key management server which has received the decryptor ID, and the designated decryption authorized group ID and the group enciphered session key judges whether or not the same group ID as the received designated decryption authorized group ID is stored in the first management database in correspondence with the received decryptor ID, deciphers, when the same group ID as the received designated decryption authorized group ID is stored in the first management database in correspondence with the received decryptor ID, the group enciphered session key with the group key stored in the second management database in correspondence with the group ID, to obtain a session key, enciphers the obtained session key with the inherent public key stored in the first management database in correspondence with the decryptor ID, to generate a second enciphered session key, and transmits the generated second enciphered session key to the client, and the client which has received the second enciphered session key deciphers the received second enciphered session key with the inherent secret key stored in the inherent data storing means, to obtain a session key, and deciphers the enciphered data in the accepted enciphered file with the obtained session key, to obtain plaintext data.

13. A deciphering device connected through a network to a key management server comprising a management database for storing, with respect to each of users, an inherent ID, an inherent key, and an inherent public key which are inherent in the user, and a decryption object ID which is an inherent ID of a creator of an enciphered file decipherable by the user, comprising:

inherent data storing means for storing said inherent ID and an inherent secret key paired with said inherent public key; enciphered file entering means for accepting the entry of an enciphered file obtained by adding, to enciphered data obtained by enciphering plaintext data with a session key generated every time the plaintext data is enciphered, a creator ID which is an inherent ID of a creator of said enciphered data, and a first enciphered session key obtained by enciphering said session key with an inherent key for the creator of said enciphered data;

transmitting means for transmitting to the key management server a decryptor ID which is the inherent ID stored in the inherent data storing means in said deciphering device, and the creator ID and the first enciphered session key in the accepted enciphered file;

receiving means for receiving, from the key management server which has received the decryptor ID, and the creator ID and the first enciphered session key, a second enciphered session key obtained by enciphering a session key obtained by deciphering said first enciphered session key with the inherent key stored in the management database in correspondence with said creator ID with the inherent public key stored in the management database in correspondence with said decryptor ID; and deciphering means for deciphering the received second enciphered session key with the inherent secret key stored in the inherent data storing means, to obtain a session key, and deciphering the enciphered data in the accepted enciphered file with the obtained session key, to obtain plaintext data.

14. A deciphering device connected through a network to a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, comprising:

inherent data storing means for storing said inherent ID and an inherent secret key paired with said inherent public key;

enciphered file entering means for accepting the entry of an enciphered file obtained by adding, to enciphered data obtained by enciphering plaintext data with a session key generated every time the plaintext data is enciphered, a group ID of the group to which a creator of said enciphered data belongs, and a group enciphered session key obtained by enciphering said session key with a group key corresponding to said group ID;

transmitting means for transmitting to the key management server a decryptor ID which is the inherent ID stored in the inherent data storing means in said deciphering device, and the group ID and the group enciphered session key in the accepted enciphered file;

receiving means for receiving, from the key management server which has received the decryptor ID, and the group ID and the group enciphered session key, an enciphered session key obtained by enciphering a session key obtained by deciphering the enciphered group session key with the group key stored in the second management database in correspondence with said group ID with the inherent public key stored in the first management database in correspondence with said decryptor ID; and deciphering means for deciphering the received enciphered session key with the inherent secret key stored in the inherent data storing means, to obtain a session key, and deciphering the enciphered data in the accepted enciphered file with the obtained session key, to obtain plaintext data.

15. A deciphering device connected through a network to a key management server comprising a management database for storing, with respect to each of users, an inherent ID, an inherent key, and an inherent public key which are inherent in the user, comprising:

inherent data storing means for storing said inherent ID and an inherent secret key paired with said inherent public key;

enciphered file entering means for accepting the entry of an enciphered file obtained by adding, to enciphered data obtained by enciphering plaintext data with a session key generated every time the plaintext data is enciphered, a designated decryption authorized user ID which is an inherent ID of a decryption authorized user designated by a creator of said enciphered data, and a first enciphered session key obtained by enciphering said session key with the inherent key stored in the management database in correspondence with said designated decryption authorized user ID;

transmitting means for transmitting to the key management server a decryptor ID which is the inherent ID stored in the inherent data storing means in said deciphering device, and the designated decryption authorized user ID and the first enciphered session key in the accepted enciphered file;

receiving means for receiving, from the key management server which has received the decryptor ID, and the designated decryption authorized user ID and the second enciphered session key, a second enciphered session key obtained by enciphering a session key obtained by deciphering said first enciphered session key with the inherent key stored in the management database in correspondence with said decryptor ID with the inherent public key stored in the management database in correspondence with said decryptor ID; and deciphering means for deciphering the received second enciphered session key with the inherent secret key stored in the inherent data storing means, to obtain a session key, and deciphering the enciphered data in the accepted enciphered file with the obtained session key, to obtain plaintext data.

16. A deciphering device connected through a network to a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, comprising:

inherent data storing means for storing said inherent ID and an inherent secret key paired with said inherent public key; enciphered file entering means for accepting the entry of an enciphered file obtained by adding, to enciphered data obtained by enciphering plaintext data with a session key generated every time the plaintext data is enciphered, a designated decryption authorized group ID which is a group ID of a decryption authorized group designated by a creator of said enciphered data, and a group enciphered session key obtained by enciphering said session key with the group key stored in the second management database in correspondence with said designated decryption authorized group ID;

transmitting means for transmitting to the key management server a decryptor ID which is the inherent ID stored in the inherent data storing means in said deciphering device, and the designated decryption authorized group ID and the group enciphered session key in the accepted enciphered file;

receiving means for receiving, from the key management server which has received the decryptor ID, and the designated decryption authorized group ID and the group enciphered session key, a second enciphered session key obtained by enciphering a session key obtained by deciphering the group enciphered session key with the group key stored in the second management database in correspondence with said group ID with the inherent public key stored in the first management database in correspondence with said decryptor ID; and deciphering means for deciphering the received second enciphered session key with the inherent secret key stored in the inherent data storing means, to obtain a session key, and deciphering the enciphered data in the accepted enciphered file with the obtained session key, to obtain plaintext data.

17. A program for controlling a deciphering device connected through a network to a key management server comprising a management database for storing, with respect to each of users, an inherent ID, an inherent key, and an inherent public key which are inherent in the user, and a decryption object ID which is an inherent ID of a creator of a decipherable enciphered file, and comprising inherent data storing means for storing said inherent ID and an inherent secret key paired with said inherent public key, the program controlling the deciphering device so as to:

accept the entry of an enciphered file obtained by adding, to enciphered data obtained by enciphering plaintext data with a session key generated every time the plaintext data is enciphered, a creator ID which is an inherent ID of a creator of the enciphered data, and a first enciphered session key obtained by enciphering said session key with an inherent key for the creator of said enciphered data;

transmit to the key management server a decryptor ID which is the inherent ID stored in the inherent data storing means in said deciphering device, and the creator ID and the first enciphered session key in the accepted enciphered file; and in receiving, from the key management server which has received the decryptor ID, and the creator ID and the first enciphered session key, a second enciphered session key obtained by enciphering a session key obtained by deciphering the first enciphered session key with the inherent key stored in the management database in correspondence with said creator ID with the inherent public key stored in the management database in correspondence with said decryptor ID, decipher the received second enciphered session key with the inherent secret key stored in the inherent data storing means, to obtain a session key, and decipher the enciphered data in the accepted enciphered file with the obtained session key, to obtain plaintext data.

18. A recording medium having the program according to claim 17 recorded thereon.

19. A program for controlling a deciphering device connected through a network to a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, and comprising inherent data storing means for storing said inherent ID and an inherent secret key paired with said inherent public key, the program controlling the deciphering device so as to:

accept the entry of an enciphered file obtained by adding, to enciphered data obtained by enciphering plaintext data with a session key generated every time the plaintext data is enciphered, a group ID of the group to which a creator of said enciphered data belongs, and a group enciphered session key obtained by enciphering said session key with a group key corresponding to said group ID;

transmit to the key management server a decryptor ID which is the inherent ID stored in the inherent data storing means in said deciphering device, and the group ID and the group enciphered session key in the accepted enciphered file; and in receiving, from the key management server which has received the decryptor ID, and the group ID and the group enciphered session key, an enciphered session key obtained by enciphering a session key obtained by deciphering the group enciphered session key with the group key stored in the second management database in correspondence with said group ID with the inherent public key stored in the first management database in correspondence with said decryptor ID, decipher the received enciphered session key with the inherent secret key stored in the inherent data storing means, to obtain a session key, and decipher the enciphered data in the accepted enciphered file with the obtained session key, to obtain plaintext data.

20. A recording medium having the program according to claim 18 recorded thereon.

21. A program for controlling a deciphering device connected through a network to a key management server comprising a management database for storing, with respect to each of users, an inherent ID, an inherent key, and an inherent public key which are inherent in the user, and comprising inherent data storing means for storing said inherent ID and an inherent secret key paired with said inherent public key, the program controlling the deciphering device so as to:

accept the entry of an enciphered file obtained by adding, to enciphered data obtained by enciphering plaintext data with a session key generated every time the plaintext data is enciphered, a designated decryption authorizer ID which is an inherent ID of a decryption authorizer designated by a creator of the enciphered data, and a first enciphered session key obtained by enciphering the session key with the inherent key stored in the management database in correspondence with said designated decryption authorizer ID;

transmit to the key management server a decryptor ID which is the inherent ID stored in the inherent data storing means in said deciphering device, and the designated decryption authorized user ID and the first enciphered session key in the accepted enciphered file; and in receiving, from the key management server which has received the decryptor ID, and the designated decryption authorized user ID and the second enciphered session key, a second enciphered session key obtained by enciphering a session key obtained by deciphering the first enciphered session key with the inherent key stored in the management database in correspondence with said decryptor ID with the inherent public key stored in the management database in correspondence with said decryptor ID, decipher the received second enciphered session key with the inherent secret key stored in the inherent data storing means, to obtain a session key, and decipher the enciphered data in the accepted enciphered file with the obtained session key, to obtain plaintext data.

22. A recording medium having the program according to claim 21 recorded thereon.

23. A program for controlling a deciphering device connected through a network to a key management server comprising a first management database for storing, with respect to each of users, an inherent ID and an inherent public key which are inherent in the user, and a group ID of a group to which the user belongs, and a second management database for storing, with respect to each of groups, a group ID and a group key which are inherent in the group, and comprising inherent data storing means for storing said inherent ID and an inherent secret key paired with said inherent public key, the program controlling the deciphering device so as to:

accept the entry of an enciphered file obtained by adding, to enciphered data obtained by enciphering plaintext data with a session key generated every time the plaintext data is enciphered, a designated decryption authorized group ID which is a group ID of a decryption authorized group designated by a creator of the enciphered data, and a group enciphered session key obtained by enciphering said session key with the group key stored in the second management database in correspondence with said designated decryption authorized group ID;

transmit to the key management server a decryptor ID which is the inherent ID stored in the inherent data storing means in said deciphering device, and the designated decryption authorized group ID and the group enciphered session key in the accepted enciphered file; and in receiving, from the key management server which has received the decryptor ID, and the designated decryption authorized group ID and the group enciphered session key, a second enciphered session key obtained by enciphering a session key obtained by deciphering a group enciphered session key with the group key stored in the second management database in correspondence with said group ID with the inherent public key stored in the first management database in correspondence with said decryptor ID, decipher the received second enciphered session key with the inherent secret key stored in the inherent data storing means, to obtain a session key, and decipher the enciphered data in the accepted enciphered file with the obtained session key, to obtain plaintext data.

24. A recording medium having the program according to claim 23 recorded thereon.

* * * * *